(12) United States Patent
Gao et al.

(10) Patent No.: US 8,060,340 B2
(45) Date of Patent: Nov. 15, 2011

(54) CONTROLLERS, OBSERVERS, AND APPLICATIONS THEREOF

(75) Inventors: Zhiqiang Gao, Westlake, OH (US);
Robert Miklosovic, Strongsville, OH (US); Aaron Radke, Westlake, OH (US); Wankun Zhou, Cleveland, OH (US); Qing Zheng, Cleveland, OH (US)

(73) Assignee: Cleveland State University, Cleveland, OH (US)

( * ) Notice: Subject to any disclaimer, the term of this patent is extended or adjusted under 35 U.S.C. 154(b) by 510 days.

(21) Appl. No.: 12/067,141

(22) PCT Filed: Sep. 18, 2006

(86) PCT No.: PCT/US2006/036156
§ 371 (c)(1),
(2), (4) Date: Sep. 10, 2008

(87) PCT Pub. No.: WO2007/035559
PCT Pub. Date: Mar. 29, 2007

(65) Prior Publication Data
US 2009/0143871 A1  Jun. 4, 2009

Related U.S. Application Data

(63) Continuation-in-part of application No. 10/351,664, filed on Jan. 27, 2003.

(60) Provisional application No. 60/373,404, filed on Apr. 18, 2002, provisional application No. 60/718,393, filed on Sep. 19, 2005, provisional application No. 60/718,581, filed on Sep. 19, 2005, provisional application No. 60/718,899, filed on Sep. 20, 2005, provisional application No. 60/728,928, filed on Oct. 20, 2005, provisional application No. 60/728,929, filed on Oct. 20, 2005.

(51) Int. Cl.
*G06F 11/30* (2006.01)
(52) U.S. Cl. ........................................................ 702/182
(58) Field of Classification Search .................... 702/75, 702/85, 87, 88, 90, 107, 109, 111, 182
See application file for complete search history.

(56) References Cited

U.S. PATENT DOCUMENTS 6,122,555 A  9/2000 Lu
6,195,982 B1 *  3/2001 Gysling et al. .................. 60/204
(Continued)

OTHER PUBLICATIONS

International Search Report and Opinion for application PCT/US06/036156, dated Mar. 17, 2009.

(Continued)

*Primary Examiner* — Mohamed Charioui
(74) *Attorney, Agent, or Firm* — Thompson Hine LLP

(57) ABSTRACT

Controller scaling and parameterization are described. Techniques that can be improved by employing the scaling and parameterization include, but are not limited to, controller design, tuning and optimization. The scaling and parameterization methods described here apply to transfer function based controllers, including PID controllers. The parameterization methods also apply to state feedback and state observer based controllers, as well as linear active disturbance rejection (ADRC) controllers. Parameterization simplifies the use of ADRC. A discrete extended state observer (DESO) and a generalized extended state observer (GESO) are described. They improve the performance of the ESO and therefore ADRC. A tracking control algorithm is also described that improves the performance of the ADRC controller. A general algorithm is described for applying ADRC to multi-input multi-output systems. Several specific applications of the control systems and processes are disclosed.

28 Claims, 52 Drawing Sheets

U.S. PATENT DOCUMENTS

| | | | |
|---|---|---|---|
| 6,445,962 | B1 | 9/2002 | Blevins et al. |
| 6,510,353 | B1 | 1/2003 | Gudaz et al. |
| 6,546,295 | B1 | 4/2003 | Pyotsia et al. |
| 6,658,305 | B1 | 12/2003 | Gudmundsson et al. |
| 6,980,869 | B1 | 12/2005 | Chandhoke |
| 7,024,253 | B2 | 4/2006 | Gaikwad et al. |
| 2003/0199997 | A1* | 10/2003 | Gao .............................. 700/18 |
| 2007/0073422 | A1 | 3/2007 | Gaikwad et al. |
| 2007/0088448 | A1 | 4/2007 | Mylaraswamy et al. |

OTHER PUBLICATIONS

Ghanekar et al., "Scaling Laws for Frequency Domain Controllers of Dynamically Equivalent Single Flexible Link Manipulators", IEEE, vol. 1, pp. 919-924, Proceedings of Int'l. conf. on Robotics and Automation, Nagoya, Japan, May 21-27, 1995, 6 pages.

Ghanekar et al., "Scaling Laws for Linear Controllers of Flexible Link Manipulators Characterized by Nondimensional Groups", IEEE, Transactions on Robotics and automation, IEEE Inc., NY vol. 13, No. 1, pp. 117-127, 1997, 11 pages.

Suh et al., "New PID Identification Algorithm Based on Frequency Scaling", IEEE, Proc. of 40th Midwest Symposium, Sacramento, CA, pp. 654-658, 1997.

* cited by examiner

CONTROLLERS, OBSERVERS, AND APPLICATIONS THEREOF

CROSS REFERENCE TO RELATED APPLICATIONS

This application is a continuation-in-part (CIP) application and claims the benefit of U.S. Utility application Ser. No. 10/351,664 filed Jan. 27, 2003 published as 2003/0199997. This application also claims the benefit of U.S. Provisional Application 60/373,404 filed Apr. 8, 2002; U.S. Provisional Application 60/718,393 filed Sep. 19, 2005; U.S. Provisional Application 60/718,581 filed Sep. 19, 2005; U.S. Provisional Application 60/718,899 filed Sep. 20, 2005; U.S. Provisional Application 60/728,928 filed Oct. 20, 2005; and U.S. Provisional Application 60/728,929 filed Oct. 20, 2005, all of which are incorporated herein by reference.

This work was supported at least in part by NASA under government contract number NGT3-52387. Accordingly, the U.S. government may have certain rights herein.

TECHNICAL FIELD

The systems, methods, application programming interfaces (API), graphical user interfaces (GUI), computer readable media, and so on described herein relate generally to controllers and more particularly to scaling and parameterizing controllers, and the use of observers and tracking which facilitates improving controller design, tuning, and optimizing.

BACKGROUND

A feedback (closed-loop) control system 10, as shown in Prior Art FIG. 1, is widely used to modify the behavior of a physical process, denoted as the plant 110, so it behaves in a specific desirable way over time. For example, it may be desirable to maintain the speed of a car on a highway as close as possible to 60 miles per hour in spite of possible hills or adverse wind; or it may be desirable to have an aircraft follow a desired altitude, heading and velocity profile independently of wind gusts; or it may be desirable to have the temperature and pressure in a reactor vessel in a chemical process plant maintained at desired levels. All these are being accomplished today by using feedback control, and the above are examples of what automatic control systems are designed to do, without human intervention.

The key component in a feedback control system is the controller 120, which determines the difference between the output of the plant 110, (e.g. the temperature) and its desired value and produces a corresponding control signal u (e.g., turning a heater on or off). The goal of controller design is usually to make this difference as small as possible as soon as possible. Today, controllers are employed in a large number of industrial control applications and in areas like robotics, aeronautics, astronautics, motors, motion control, thermal control, and so on.

Classic Controllers

Classic Control Theory provides a number of techniques an engineer can use in controller design. Existing controllers for linear, time invariant, and single-input single output plants can be categorized into three forms: the proportional/integral/derivative (PID) controllers, transfer function based (TFB) controllers, and state feedback (SF) controllers. The PID controller is defined by the equation $$u = K_P e + K_I \int e + K_D \dot{e} \quad (1)$$

where u is the control signal and e is the error between the set point and the process output being controlled. This type of controller has been employed in engineering and other applications since the early 1920s. It is an error based controller that does not require an explicit mathematical model of the plant. The TFB controller is given in the form of $$U(s) = G_c(s)E(s), \quad G_c(s) = \frac{n(s)}{d(s)} \quad (2)$$

where U(s) and E(s) are Laplace Transforms of u and e defined above, and n(s) and d(s) are polynomials in s. The TFB controller can be designed using methods in control theory based on the transfer function model of the plant, Gp(s). A PID controller can be considered a special case of a TFB controller because it has an equivalent transfer function of $$G_c(s) = k_p + \frac{k_i}{s} + k_d s \quad (3)$$

The State Feedback (SF) Controller
The SF controller can be defined by $$u = r + K\hat{x} \quad (4)$$

and is based on the state space model of the plant:

$$\dot{x}(t) = Ax(t) + Bu(t), y(t) = Cx(t) + Du(t) \quad (5)$$

When the state x is not accessible, a state observer (SO):

$$\dot{\hat{x}} = A\hat{x} + Bu + L(y - \hat{y}) \quad (6)$$

is often used to find its estimate, $\hat{x}$. Here r is the set point for the output to follow.

Controller Tuning

Over the years, the advances in control theory provided a number of useful analysis and design tools. As a result, controller design moved from empirical methods (e.g., ad hoc tuning via Ziegler and Nichols tuning tables for PID) to analytical methods (e.g., pole placement). The frequency response method (Bode and Nyquist plots) also facilitated analytical control design.

Conventionally, controllers are individually designed according to design criteria and then individually tuned until they exhibit an acceptable performance. Practicing engineers may design controllers, (e.g., PID) using look-up tables and then tune the controllers using trial and error techniques. But each controller is typically individually designed, tuned, and tested.

Tuning controllers has perplexed engineers. Controllers that are developed based on a mathematical model of the plant usually need their parameters to be adjusted, or "tuned" as they are implemented in hardware and tested. This is because the mathematical model often does not accurately reflect the dynamics of the plant. Determining appropriate control parameters under such circumstances is often problematic, leading to control solutions that are functional but ill-tuned, yielding lost performance and wasted control energy.

Additionally, and/or alternatively, engineers design using analytical (e.g., pole placement) techniques, but once again tune with trial and error techniques. Since many industrial machines and engineering applications are built to be inherently stable, acceptable controllers can be designed and tuned using these conventional techniques, however, acceptable performance may not approach optimal performance.

One example conventional technique for designing a PID controller included obtaining an open-loop response and determining what, if anything, needed to be improved. By way of illustration, the designer would build a candidate system with a feedback loop, guess the initial values of the three gains (e.g., kp, kd, ki) in PID and observe the performance in terms of rise time, steady state error and so on. Then, the designer might modify the proportional gain to improve rise time. Similarly, the designer might add or modify a derivative controller to improve overshoot and an integral controller to eliminate steady state error. Each component would have its own gain that would be individually tuned. Thus, conventional designers often faced choosing three components in a PID controller and individually tuning each component. Furthermore, there could be many more parameters that the design engineer must tune if a TFB or a state feedback state observer (SFSOB) controller is employed.

Another observation of control design is that it is not portable. That is, each control problem is solved individually and its solution cannot be easily modified for another control problem. This means that the tedious design and tuning process must be repeated for each control problem. The use of state observers is useful in not only system monitoring and regulation but also detecting as well as identifying failures in dynamical systems. Since almost all observer designs are based on the mathematical model of the plant, the presence of disturbances, dynamic uncertainties, and nonlinearities pose great challenges in practical applications. Toward this end, the high-performance robust observer design problem has been topic of considerable interest recently, and several advanced observer designs have been proposed. Although satisfactory in certain respects, a need remains for an improved strategy for an observer and incorporation and use of such in a control system.

State Observers

Observers extract real-time information of a plant's internal state from its input-output data. The observer usually presumes precise model information of the plant, since performance is largely based on its mathematical accuracy. Closed loop controllers require both types of information. This relationship is depicted in 3200 of FIG. 32. Such presumptions, however, often make the method impractical in engineering applications, since the challenge for industry remains in constructing these models as part of the design process. Another level of complexity is added when gain scheduling and adaptive techniques are used to deal with nonlinearity and time variance, respectively.

Disturbance Estimation Observes and Disturbance Rejection

Recently, disturbance rejection techniques have been used to account for uncertainties in the real world and successfully control complex nonlinear systems. The premise is to solve the problem of model accuracy in reverse by modeling a system with an equivalent input disturbance d that represents any difference between the actual plant P and a derived/selected model $P_n$ of the plant, including external disturbances w. An observer is then designed to estimate the disturbance in real time and provide feedback to cancel it. As a result, the augmented system acts like the model $P_n$ at low frequencies, making the system accurate to $P_n$ and allowing a controller to be designed for $P_n$. This concept is illustrated in 3900 of FIG. 39.

The most common of these techniques is the disturbance observer (DOB) structure (Endo, S., H. Kobayashi, C. J. Kempf, S. Kobayashi, M. Tomizuka and Y. Hori (1996). "Robust Digital Tracking Controller Design for High-Speed Positioning Systems." *Control Eng. Practice*, 4:4, 527-536; Kim, B. K., H.-T. Choi, W. K. Chung and I. H. Suh (2002). "Analysis and Design of Robust Motion Controllers in the Unified Framework." *J. of Dynamic Systems, Measurement, and Control*, 124, 313-321; Lee, H. S. and M. Tomizuka (1996). "Robust Motion Controller Design for High-Accuracy Positioning Systems." *IEEE Trans. Ind. Electron.*, 43:1, 48-55; Tesfaye, A., H. S. Lee and M. Tomizuka (2000). "A Sensitivity Optimization Approach to Design of a Disturbance Observer in Digital Motion Control." *IEEE/ASME Trans. on Mechatronics*, 5:1, 32-38; Umeno, T. and Y. Hori (1991). "Robust Speed Control of DC Servomotors Using Modern Two Degrees of Freedom Controller Design". *IEEE Trans. Ind. Electron.*, 38:5, 363-368). It uses simple binomial Q-filters, allowing the observer to be parameterized, i.e. tuned by a single bandwidth parameter. A model deliberately different from P is also suggested in E. Schrijver and J. van Dijk, "Disturbance Observers for Rigid Mechanical Systems: Equivalence, Stability, and Design," *Journal of Dynamic Systems, Measurement, and Control, vol.* 124, no. 4, pp. 539-548, 2002 to facilitate design, but no guidelines are given other than it should be as simple as possible, cautioning stability and performance may be in danger. Another obstacle is that a separate observer must be designed to provide state feedback to the controller. In existing research, derivative approximates are used in this way but their effect on performance and stability has yet to be analyzed. Furthermore, the controller design is dependent on the DOB design, meaning that derivative approximates can not be arbitrarily selected.

Multiple DOBs were used to control a multivariable robot by treating it as a set of decoupled single-input single-output (SISO) systems, each with disturbances that included the coupled dynamics (Bickel, R. and M. Tomizuka (1999). "Passivity-Based Versus Disturbance Observer Based Robot Control: Equivalence and Stability." *J. of Dynamic Systems, Measurement, and Control*, 121, 41-47; Hori, Y., K. Shimura and M. Tomizuka (1992). "Position/Force Control of Multi-Axis Robot Manipulator Based on the TDOF Robust Servo Controller For Each Joint." *Proc. of ACC*, 753-757; Kwon, S. J. and W. K. Chung (2002). "Robust Performance of the Multiloop Perturbation Compensator." *IEEE/ASME Trans. Mechatronics*, 7:2, 190-200; Schrijver, E. and J. Van Dijk (2002) Disturbance Observers for Rigid Mechanical Systems: Equivalence, Stability, and Design." *J. of Dynamic Systems, Measurement, and Control*, 124, 539-548.

Another technique, referred to as the unknown input observer (UIO), estimates the states of both the plant and the disturbance by augmenting a linear plant model with a linear disturbance model (Burl, J. B. (1999). *Linear Optimal Control, pp.* 308-314. Addison Wesley Longman, Inc., Calif.; Franklin, G. F., J. D. Powell and M. Workman (1998). *Digital Control of Dynamic Systems*, Third Edition, Addison Wesley Longman, Calif.; Johnson, C. D. (1971). "Accommodation of External Disturbances in Linear Regulator and Servomechanism Problems." *IEEE Trans. Automatic Control*, AC-16:6, 635-644; Liu, C.-S., and H. Peng (2002). "Inverse-Dynamics Based State and Disturbance Observer for Linear Time-Invariant Systems." *J. of Dynamic Systems, Measurement, and Control*, 124, 375-381; Profeta, J. A. III, W. G. Vogt and M. H. Mickle (1990). "Disturbance Estimation and Compensation in Linear Systems." *IEEE Trans. Aerospace and Electronic Systems*, 26:2, 225-231; Schrijver, E. and J. van Dijk (2002) "Disturbance Observers for Rigid Mechanical Systems: Equivalence, Stability, and Design." J. *of Dynamic Systems, Measurement, and Control*, 124, 539-548). Unlike the DOB structure, the controller and observer can be designed independently, like a Luenberger observer. However, it still relies on a good mathematical model and a design procedure to determine observer gains. An external disturbance w is generally modeled using cascaded integrators ($1/s^h$). When they are assumed to be piece-wise constant, the observer is simply extended by one state and still demonstrates a high degree of performance.

Extended State Observer (ESO)

In this regard, the extended state observer (ESO) is quite different. Originally proposed by Han, J. (1999). "Nonlinear Design Methods for Control Systems." *Proc.* 14*th IFAC World Congress*, in the form of a nonlinear UIO and later simplified to a linear version with one tuning parameter by Gao, Z. (2003). "Scaling and Parameterization Based Controller Tuning." *Proc. of ACC*, 4989-4996, the ESO combines the state and disturbance estimation power of a UIO with the tuning simplicity of a DOB. One finds a decisive shift in the underlying design concept as well. The traditional observer is based on a linear time-invariant model that often describes a nonlinear time-varying process. Although the DOB and UIO reject input disturbances for such nominal plants, they leave the question of dynamic uncertainty mostly unanswered in direct form. The ESO, on the other hand, addresses both issues in one simple framework by formulating the simplest possible design model $P_d=1/s^n$ for a large class of uncertain systems. $P_d$ is selected to simplify controller and observer design, forcing P to behave like it at low frequencies rather than $P_n$. As a result, the effects of most plant dynamics and external disturbances are concentrated into a single unknown quantity. The ESO estimates this quantity along with derivatives of the output, giving way to the straightforward design of a high performance controller.

Active Disturbance Rejection Control (ADRC)

Originally proposed by Han, J. (1999). "Nonlinear Design Methods for Control Systems." *Proc.* 14*th IFAC World Congress*, a nonlinear, non-parameterized active disturbance rejection control (ADRC) is a method that uses an ESO. A linear version of the ADRC controller and ESO were parameterized for transparent tuning by Gao, Z. (2003). "Scaling and Parameterization Based Controller Tuning." *Proc. of ACC*, 4989-4996. Its practical usefulness is seen in a number of benchmark applications already implemented throughout industry with promising results (Gao, Z., S. Hu and F. Jiang (2001). "A Novel Motion Control Design Approach Based on Active Disturbance Rejection." *Proc. of* 40*th IEEE Conference on Decision and Control*; Goforth, F. (2004). "On Motion Control Design and Tuning Techniques." Proc. of ACC; Hu, S. (2001). "On High Performance Servo Control Solutions for Hard Disk Drive." *Doctoral Dissertation*, Department of Electrical and Computer Engineering, Cleveland State University; Hou, Y., Z. Gao, F. Jiang and B. T. Boulter (2001). "Active Disturbance Rejection Control for Web Tension Regulation." *Proc. of* 40*th IEEE Conf. on Decision and Control*; Huang, Y., K. Xu and J. Han (2001). "Flight Control Design Using Extended State Observer and Nonsmooth Feedback." Proc. of 40th IEEE Conf. on Decision and Control; Sun, B and Z. Gao (2004). "A DSP-Based Active Disturbance Rejection Control Design for a 1 KW H-Bridge DC-DC Power Converter." To appear in: *IEEE Trans. on Ind. Electronics*; Xia, Y., L. Wu, K. Xu, and J. Han (2004). "Active Disturbance Rejection Control for Uncertain Multivariable Systems With Time-Delay, 2004 *Chinese Control Conference*). It was also applied to a fairly complex multivariable aircraft control problem (Huang, Y., K. Xu and J. Han (2001). "Flight Control Design Using Extended State Observer and Nonsmooth Feedback." *Proc. of* 40*th IEEE Conf. on Decision and Control*).

What is needed is a control framework for application to systems throughout industry that are complex and largely unknown to the personnel often responsible for controlling them. In the absence of required expertise, less tuning parameters are needed than current approaches, such as multi-loop PID, while maintaining or even improving performance and robustness.

Linear Active Disturbance Rejection Controller (LADRC)

In addition to the above controllers, a more practical controller is the recently developed from Active Disturbance Rejection Controller (ADRC). Its linear form (LADRC) for a second order plant is introduced below as an illustration. The unique distinction of ADRC is that it is largely independent of the mathematical model of the plant and is therefore better than most controllers in performance and robustness in practical applications.

Consider an example of controlling a second order plant $$\ddot{y}=-a\dot{y}-by+w+bu \quad (7)$$

where y and u are output and input, respectively, and w is an input disturbance. Here both parameters, a and b, are unknown, although there is some knowledge of b, (e.g., $b_0 \approx b$, derived from the initial acceleration of y in step response). Rewrite (7) as $$\ddot{y}=-a\dot{y}-by+w+(b-b_0)u+b_0u=f+b_0u \quad (8)$$

where $f=-a\dot{y}-by+w+(b-b_0)u$. Here $f$ is referred to as the generalized disturbance, or disturbance, because it represents both the unknown internal dynamics, $-a\dot{y}-by+(b-b_0)u$ and the external disturbance w(t).

$$u = \frac{-\hat{f} + u_0}{b_0}$$

If an estimate of $f$, $\hat{f}$ can be obtained, then the control law reduces the plant to $\ddot{y}=(f-\hat{f})+u_0$ which is a unit-gain double integrator control problem with a disturbance $(f-\hat{f})$.

Thus, rewrite the plant in (8) in state space form as $$\begin{cases} \dot{x}_1 = x_2 \\ \dot{x}_2 = x_3 + b_0 u \\ \dot{x}_3 = h \\ y = x_1 \end{cases} \quad (9)$$

with $x_3=f$ added as an augmented state, and $h=\dot{f}$ is seen as an unknown disturbance. Now $f$ can be estimated using a state observer based on the state space model $$\dot{x} = Ax + Bu + Eh \quad (10)$$

$$y = Cz$$

where $$A = \begin{bmatrix} 0 & 1 & 0 \\ 0 & 0 & 1 \\ 0 & 0 & 0 \end{bmatrix}, B = \begin{bmatrix} 0 \\ b_0 \\ 0 \end{bmatrix}, C = [1 \ 0 \ 0], E = \begin{bmatrix} 0 \\ 0 \\ 1 \end{bmatrix}$$

Now the state space observer, denoted as the linear extended state observer (LESO), of (10) can be constructed as $$\dot{z}=Az+Bu+L(y-\hat{y})$$

$$\hat{y}=Cz$$

and if $f$ is known or partially known, it can be used in the observer by taking $h=\dot{f}$ to improve estimation accuracy.

$$\dot{z}=Az+Bu+L(y-\hat{y})+Eh$$

$$\hat{y}=Cz \qquad (11a)$$

The observer can be reconstructed in software, for example, and L is the observer gain vector, which can be obtained using various methods known in the art like pole placement, $$L=[\beta_1\beta_2\beta_3]^T \qquad (12)$$

where $[\ ]^T$ denotes transpose. With the given state observer, the control law can be given as:

$$u = \frac{-z_3 + u_0}{b_0} \qquad (13)$$

Ignoring the inaccuracy of the observer, $$\ddot{y}=(f-z_3)+u_0 \approx u_0 \qquad (14)$$

which is an unit gain double integrator that can be implemented with a PD controller $$u_0 = k_p(r-z_1) - k_d z_2 \qquad (15)$$

Tracking Control

Command following refers to the output of a controlled system meeting design requirements when a specified reference trajectory is applied. Oftentimes, it refers to how closely the output y compares to the reference input r at any given point in time. This measurement is known as the error e=r−y.

Control problems can be categorized in two major groups; point-to-point control and tracking control. Point-to-point applications call for a smooth step response with minimal overshoot and zero steady state error, such as when controlling linear motion from one position to the next and then stopping. Since the importance is placed on destination accuracy and not on the trajectory between points, conventional design methods produce a controller with inherent phase lag in order to produce a smooth output. Tracking applications require precise tracking of a reference input by keeping the error as small as possible, such as when controlling a process that does not stop. Since the importance is placed on accurately following a changing reference trajectory between points, the problem here is that any phase lag produces unacceptably large errors in the transient response, which lasts for the duration of the process. Although it does not produce a response without overshoot, it does produce a much smaller error signal than the point-to-point controller. The significance is in its ability to reduce the error by orders of magnitude. A step input may be used in point-to-point applications, but a motion profile should be used in tracking applications.

Various methods have been used to remove phase lag from conventional control systems. All of them essentially modify the control law to create a desired closed loop transfer function equal to one. As a result, the output tracks the reference input without any phase lag and the effective bandwidth of the overall system is improved. The most common method is model inversion where the inverse of the desired closed loop transfer function is added as a prefilter. Another method proposed a zero Phase Error Tracking Controller (ZPETC) that cancels poles and stable zeros of the closed loop system and compensates for phase error introduced by un-cancelable zeros. Although it is referred to as a tracking controller, it is really a prefilter that reduces to the inverse of the desired closed loop transfer function when unstable zeros are not present. Other methods consist of a single tracking control law with feed forward terms in place of the conventional feedback controller and prefilter, but they are application specific. However, all of these and other previous methods apply to systems where the model is known.

Model inaccuracy can also create tracking problems. The performance of model-based controllers is largely dependent on the accuracy of the model. When linear time-invariant (LTI) models are used to characterize nonlinear time-varying (NTV) systems, the information becomes inaccurate over time. As a result, gain scheduling and adaptive techniques are developed to deal with nonlinearity and time variance, respectively. However, the complexity added to the design process leads to an impractical solution for industry because of the time and level of expertise involved in constructing accurate mathematical models and designing, tuning, and maintaining each control system.

There have been a number of high performance tracking algorithms that consist of three primary components: disturbance rejection, feedback control, and phase error compensation implemented as a prefilter. First, disturbance rejection techniques are applied to eliminate model inaccuracy with an inner feedback loop. Next, a stabilizing controller is constructed based on a nominal model and implemented in an outer feedback loop. Finally, the inverse of the desired closed loop transfer function is added as a prefilter to eliminate phase lag. Many studies have concentrated on unifying the disturbance rejection and control part, but not on combining the control and phase error compensation part, such as the RIC framework. Internal model control (IMC) cancels an equivalent output disturbance. B. Francis and W. Wonham, "The Internal Model Principal of Control Theory," *Automatica*, vol 12, 1976, pp. 457-465. E. Schrijver and J. van Dijk, "Disturbance Observers for Rigid Mechanical Systems Equivalence, Stability, and Design," *Journal of Dynamic Systems, Measurement, and Control*, vol. 124, December 2002, pp. 539-548 uses a basic tracking controller with a DOB to control a multivariable robot. The ZPETC has been widely used in combination with the DOB framework and model based controllers.

Thus, having reviewed controllers and observers, the application now describes example systems and methods related to controllers and observers.

Web Processing Applications

Web tension regulation is a challenging industrial control problem. Many types of material, such as paper, plastic film, cloth fabrics, and even strip steel are manufactured or processed in a web form. The quality of the end product is often greatly affected by the web tension, making it a crucial variable for feedback control design, together with the velocities at the various stages in the manufacturing process. The ever-increasing demands on the quality and efficiency in industry motivate researchers and engineers alike to explore better methods for tension and velocity control. However, the highly nonlinear nature of the web handling process and changes in operating conditions (temperature, humidity, machine wear, and variations in raw materials) make the control problem challenging.

Accumulators in web processing lines are important elements in web handling machines as they are primarily responsible for continuous operation of web processing lines. For this reason, the study and control of accumulator dynamics is an important concern that involves a particular class of problems. The characteristics of an accumulator and its operation as well as the dynamic behavior and control of the accumulator carriage, web spans, and tension are known in the art.

Both open-loop and closed-loop methods are commonly used in web processing industries for tension control purposes. In the open-loop control case, the tension in a web span is controlled indirectly by regulating the velocities of the rollers at either end of the web span. An inherent drawback of this method is its dependency on an accurate mathematical model between the velocities and tension, which is highly nonlinear and highly sensitive to velocity variations. Nevertheless, simplicity of the controller outweighs this drawback in many applications. Closing the tension loop with tension feedback is an obvious solution to improve accuracy and to reduce sensitivity to modeling errors. It requires tension measurement, for example, through a load cell, but is typically justified by the resulting improvements in tension regulation.

Most control systems will unavoidably encounter disturbances, both internal and external, and such disturbances have been the obstacles to the development of high performance controller. This is particularly true for tension control applications and, therefore, a good tension regulation scheme must be able to deal with unknown disturbances. In particular, tension dynamics are highly nonlinear and sensitive to velocity variations. Further, process control variables are highly dependent on the operating conditions and web material characteristics. Thus, what are needed are systems and methods for control that are not only overly dependent on the accuracy of the plant model, but also suitable for the rejection of significant internal and external disturbances.

Jet Engine Control Applications

A great deal of research has been conducted towards the application of modern multivariable control techniques on aircraft engines. The majority of this research has been to control the engine at a single operating point. Among these methods are a multivariable integrator windup protection scheme (Watts, S. R. and S. Garg (1996). "An Optimized Integrator Windup Protection Technique Applied to a Turbofan Engine Control," *AIAA Guidance Navigation and Control Conf.*), a tracking filter and a control mode selection for model based control (Adibhatla S. and Z. Gastineau (1994). "Tracking Filter Selection And Control Mode Selection For Model Based Control." *AIAA 30th Joint Propulsion Conference and Exhibit*), an $H_\infty$ method and linear quadratic Gaussian with loop transfer recovery method (Watts, S. R. and S. Garg (1995). "A Comparison Of Multivariable Control Design Techniques For A Turbofan Engine Control." *International Gas Turbine and Aeroengine Congress and Expo.*), and a performance seeking control method (Adibhatla, S. and K. L. Johnson (1993). "Evaluation of a Nonlinear Psc Algorithm on a Variable Cycle Engine." *AIAA/SAE/ASME/ASEE 29th Joint Propulsion Conference and Exhibit*). Various schemes have been developed to reduce gain scheduling (Garg, S. (1997). "A Simplified Scheme for Scheduling Multivariable Controllers." *IEEE Control Systems*) and have even been combined with integrator windup protection and $H_\infty$ (Frederick, D. K., S. Garg and S. Adibhatla (2000). "Turbofan Engine Control Design Using Robust Multivariable Control Technologies. *IEEE Trans. on Control Systems Technology*).

Conventionally, there have been a limited number of control techniques for full flight operation (Garg, S. (1997). "A Simplified Scheme for Scheduling Multivariable Controllers." IEEE Control Systems; and Polley, J. A., S. Adibhatla and P. J. Hoffman (1988). "Multivariable Turbofan Engine Control for Full Conference on Decision and Control Flight Operation." *Gas Turbine and Expo*). However, there has been no development of tuning a controller for satisfactory performance when applied to an engine. Generally, at any given operating point, models can become inaccurate from one engine to another. This accuracy increases with model complexity, and subsequently design and tuning complexity. As a result, very few of these or similar aircraft design studies have led to implementation on an operational vehicle.

The current method for controlling high performance jet engines remains multivariable proportional-integral (PI) control (Edmunds, J. M. (1979). "Control System Design Using Closed-Loop Nyquist and Bode Arrays." *Int. J on Control*, 30:5, 773-802, and Polley, J. A., S. Adibhatla and P. J. Hoffman (1988). "Multivariable Turbofan Engine Control for Full Conference on Decision and Control. Flight Operation." *Gas Turbine and Expo*). Although the controller is designed by implementing Bode and Nyquist techniques and is tunable, a problem remains due to the sheer number of tuning parameters compounded by scheduling.

Health Monitoring and Fault Detection

The terms "health", "fault", "diagnosis", and "tolerance" are used in broad terms. Some literature defines a fault as an unpermitted deviation of at least one characteristic property or variable by L. H. Chiang, E. Russell, and R. D. Braatz, *Fault Detection and Diagnosis in Industrial Systems*, Springer-Verlag, February 2001. Others define it more generally as the indication that something is going wrong with the system by J. J. Gertler, "Survey of model-based failure detection and isolation in complex plants," *IEEE Control Systems Magazine, December* 1988.

Industry is increasingly interested in actively diagnosing faults in complex systems. The importance of fault diagnosis can be seen by the amount of literature associated with it. There are a number of good survey papers by (J. J. Gertler, "Survey of model-based failure detection and isolation in complex plants," *IEEE Control Systems Magazine*, December 1988. V. Venkatasubramanian, R. Rengaswamy, K. Yin, and S. N. Kavuri, "A review of process fault detection and diagnosis part i: Quantitative model-based methods," *Computers and Chemical Engineering, vol.* 27, pp. 293-311, April 2003, (P. M. Frank, "Fault diagnosis in dynamic systems using analytical and knowledge-based redundancy: a survey and some new results," *Automatica, vol.* 26, no. 3, pp. 459-474, 1990, K. Madani, "A survey of artificial neural networks based fault detection and fault diagnosis techniques," *International Joint Conference on Neural Networks*, vol. 5, pp. 3442-3446, July 1999, P. M. Frank, "Analytical and qualitative model-based fault diagnosis-a survey and some new results," *European Journal of Control*, 1996, P. M. Frank and X. Ding, "Survey of robust residual generation and evaluation methods in observer-based fault detection," *Journal of Process Control*, 1997, J. Riedesel, "A survey of fault diagnosis technology [for space power systems]," in Proceedings of the 24th *Intersociety IECEC-89. Conversion Engineering Conference*, 1989, pp. 183-188, A. Willsky, "A survey of design methods for failure detection in dynamic systems," *NASA STI/Recon Technical Report* N, vol. 76, pp. 11 347-+, 1975, M. Kinnaert, "Fault diagnosis based on analytical models for linear and nonlinear systems—a tutorial," Department of Control Engineering and System Analysis, Université Libre de Bruxelles, Tech. Rep., 2004.) and books by (L. H. Chiang, E. Russell, and R. D. Braatz, *Fault Detection and Diagnosis in Industrial Systems*, Springer-Verlag, February 2001, M. Blanke, M. Kinnaert, J. Junze, M. Staroswiecki, J. Schroder, and J. Lunze, *Diagnosis and Fault-Tolerant Control*, Springer-Verlag, August 2003, R. Patton, P. M. Frank, and R. N. Clark, *Issues of Fault Diagnosis for Dynamic Systems*, Springer-Verlag Telos, 2000, S. Simani, C. Fantuzzi, and R. Patton, *Model-based Fault Diagnosis in Dynamic Systems Using Identification Techniques*. Springer-Verlag, January 2003, E. Russell, L. H. Chiang, and R. D. Braatz, *Data-Driven Methods for Fault Detection and Diagnosis in Chemical Processes (Advances in Industrial Control)*. Springer-Verlag, 2000, M. Basseville and I. V. Nikiforov, *Detection of*

*Abrupt Changes: Theory and Application.* Prentice-Hall, Inc, April 1993.) which collect many of the issues and solutions for faults.

There are four main categories of fault diagnosis. Fault detection is the indication that something is going wrong with the system. Fault isolation determines the location of the failure. Failure identification is the determination of the size of the failure. Fault accommodation and remediation is the act or process of correcting a fault. Most fault solutions deal with the first three categories and do not make adjustments to closed loop systems. The common solutions can be categorized into a six major areas:

1. Analytical redundancy by (J. J. Gertler, "Survey of model-based failure detection and isolation in complex plants," *IEEE Control Systems Magazine*, December 1988, A. Willsky, "A survey of design methods for failure detection in dynamic systems," *NASA STI/Recon Technical Report N*, vol. 76, pp. 11 347-+, 1975, E. Y. Chow and A. S. Willsky, "Analytical redundancy and the design of robust failure detection systems," *IEEE Transactions on Automatic Control*, October 1982.)
2. Statistical analysis by (L. H. Chiang, E. Russell, and R. D. Braatz, *Fault Detection and Diagnosis in industrial Systems*, Springer-Verlag, February 2001, E. Russell, L. H. Chiang, and R. D. Braatz, *Data-Driven Methods for Fault Detection and Diagnosis in Chemical Processes (Advances in Industrial Control)*. Springer-Verlag, 2000, M. Basseville and I. V. Nikiforov, *Detection of Abrupt Changes: Theory and Application.* Prentice-Hall, Inc, April 1993.)
3. Knowledge/fuzzy logic systems
4. Neural networks by (K. Madani, "A survey of artificial neural networks based fault detection and fault diagnosis techniques," *International Joint Conference on Neural Networks*, vol. 5, pp. 3442-3446, July 1999, J. W. Hines, D. W. Miller, and B. K. Hajek, "Fault detection and isolation: A hybrid approach," in *American Nuclear Society Annual Meeting and Embedded Topical Meeting on Computer-Based Human Support Systems Technology, Methods and Future*, Philadelphia, Pa., Oct. 29-Nov. 2 1995.)
5. Hybrid solutions by (J. W. Hines, D. W. Miller, and B. K. Hajek, "Fault detection and isolation: A hybrid approach," in *American Nuclear Society Annual Meeting and Embedded Topical Meeting on Computer-Based Human Support Systems: Technology, Methods and Future*, Philadelphia, Pa., Oct. 29-Nov. 2 1995.)
6. Fault tolerant control by (M. Kinnaert, "Fault diagnosis based on analytical models for linear and nonlinear systems—a tutorial," Department of Control Engineering and System Analysis, Université Libre de Bruxelles, Tech. Rep., 2004, M. Blanke, M. Kinnaert, J. Junze, M. Staroswiecki, J. Schroder, and J. Lunze, *Diagnosis and Fault-Tolerant Control*, Springer-Verlag, August 2003)

Some of these methods attempt to remove the need for accurate mathematical models yet require other implicit models. Analytical redundancy by (E. Y. Chow and A. S. Willsky, "Analytical redundancy and the design of robust failure detection systems," *IEEE Transactions on Automatic Control*, October 1982.), the most popular method, relies heavily on mathematical models.

Often detailed model information is not available although diagnostics of the dynamic control system are still important. A less developed but important problem is characterizing what can be determined from input output data with few assumptions about the plant.

Without adequate knowledge of the plant, disturbances, faults, and modeling errors, it is difficult to build an effective estimator. For the most part, each of these issues has been approached independently.

SUMMARY

This section presents a simplified summary of methods, systems, and computer readable media and so on for scaling and parameterizing controllers to facilitate providing a basic understanding of these items. This summary is not an extensive overview and is not intended to identify key or critical elements of the methods, systems, computer readable media, and so on or to delineate the scope of these items. This summary provides a conceptual introduction in a simplified form as a prelude to the more detailed description that is presented later.

The application describes scaling and parameterizing controllers. With these two techniques, controller designing, tuning, and optimizing can be improved. In one example, systems, methods, and so on described herein facilitate reusing a controller design by scaling a controller from one application to another. This scaling may be available, for example, for applications whose plant differences can be detailed through frequency scale and/or gain scale. While PID controllers are used as examples, it is to be appreciated that other controllers can benefit from scaling and parameterization as described herein.

Those familiar with filter design understand that filters may be designed and then scaled for use in analogous applications. Filter designers are versed in the concept of the unit filter which facilitates scaling filters. In example controller scaling techniques, a plant transfer function is first reduced to a unit gain and unit bandwidth (UGUB) form. Then, a known controller for an appropriate UGUB plant is scaled for an analogous plant. Since certain plants share certain characteristics, classes of UGUB plants can be designed for which corresponding classes of scaleable, parameterizable controllers can be designed.

Since certain classes of plants have similar properties, it is possible to frequency scale controllers within classes. For example, an anti-lock brake plant for a passenger car that weighs 2000 pounds may share a number of characteristics with an anti-lock brake plant for a passenger car that weighs 2500 pounds. Thus, if a UGUB plant can be designed for this class of cars, then a frequency scaleable controller can also be designed for the class of plants. Then, once a controller has been selected and engineered for a member of the class (e.g., the 2000 pound car), it becomes a known controller from which other analogous controllers can be designed for other similar cars (e.g., the 2500 pound car) using frequency scaling.

This scaling method makes a controller "portable". That is a single controller can be used as the "seed" to generate controllers for a large number of different plants that are similar in nature. The remaining question concerns how to account for differences in design requirements. Controller parameterization addresses this issue. The example parameterization techniques described herein make controller coefficients functions of a single design parameter, namely the crossover frequency (also known as the bandwidth). In doing so, the controller can be tuned for different design requirements, which is primarily reflected in the bandwidth requirement.

The combination of scaling and parameterization methods means that an existing controller (including PID, TFB, and SFSOB) can be scaled for different plants and then, through the adjustment of one parameter, changed to meet different performance requirements that are unique in different applications.

Certain illustrative example methods, systems, computer readable media and so on are described herein in connection with the following description and the annexed drawings. These examples are indicative, however, of but a few of the various ways in which the principles of the methods, systems, computer readable media and so on may be employed and thus are intended to be inclusive of equivalents. Other advantages and novel features may become apparent from the following detailed description when considered in conjunction with the drawings.

BRIEF DESCRIPTION OF THE DRAWINGS

Prior Art

LEXICON

Figure 1:
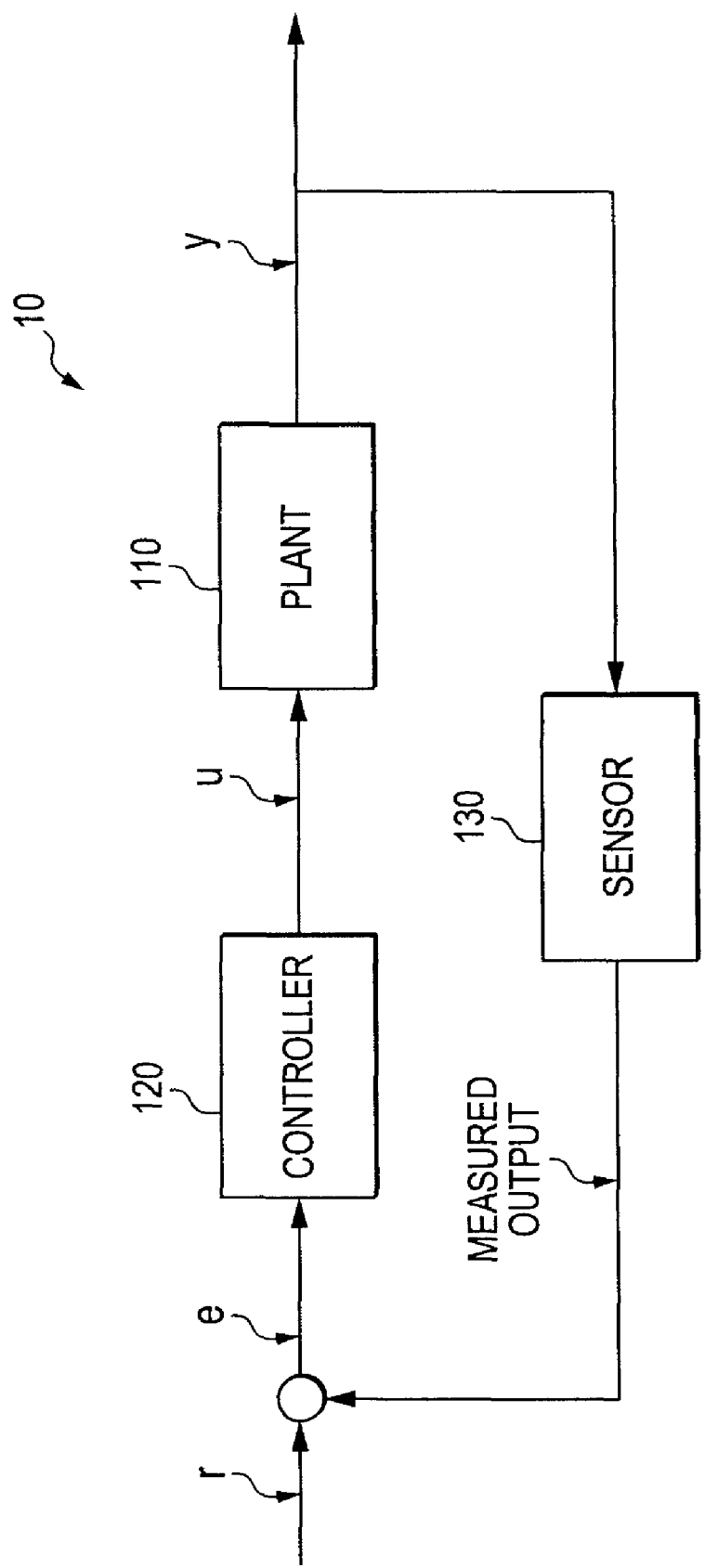
FIG. 1 illustrates the configuration of an output feedback control system.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program and a computer. By way of illustration, both an application running on a server and the server can be computer components. One or more computer components can reside within a process and/or thread of execution and a computer component can be localized on one computer and/or distributed between two or more computers.

"Computer communications", as used herein, refers to a communication between two or more computers and can be, for example, a network transfer, a file transfer, an applet transfer, an email, a hypertext transfer protocol (HTTP) message, a datagram, an object transfer, a binary large object (BLOB) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Logic", as used herein, includes but is not limited to hardware, firmware, software and/or combinations of each to perform a function(s) or an action(s). For example, based on a desired application or needs, logic may include a software controlled microprocessor, discrete logic such as an application specific integrated circuit (ASIC), or other programmed logic device. Logic may also be fully embodied as software.

An "operable connection" is one in which signals and/or actual communication flow and/or logical communication flow may be sent and/or received. Usually, an operable connection includes a physical interface, an electrical interface, and/or a data interface, but it is to be noted that an operable connection may consist of differing combinations of these or other types of connections sufficient to allow operable control.

"Signal", as used herein, includes but is not limited to one or more electrical or optical signals, analog or digital, one or more computer instructions, a bit or bit stream, or the like.

"Software", as used herein, includes but is not limited to, one or more computer readable and/or executable instructions that cause a computer or other electronic device to perform functions, actions and/or behave in a desired manner. The instructions may be embodied in various forms like routines, algorithms, modules, methods, threads, and/or programs. Software may also be implemented in a variety of executable and/or loadable forms including, but not limited to, a stand-alone program, a function call (local and/or remote), a servelet, an applet, instructions stored in a memory, part of an operating system or browser, and the like. It is to be appreciated that the computer readable and/or executable instructions can be located in one computer component and/or distributed between two or more communicating, co-operating, and/or parallel processing computer components and thus can be loaded and/or executed in serial, parallel, massively parallel and other manners. It will be appreciated by one of ordinary skill in the art that the form of software may be dependent on, for example, requirements of a desired application, the environment in which it runs, and/or the desires of a designer/programmer or the like.

"Data store", as used herein, refers to a physical and/or logical entity that can store data. A data store may be, for example, a database, a table, a file, a list, a queue, a heap, and so on. A data store may reside in one logical and/or physical entity and/or may be distributed between two or more logical and/or physical entities.

To the extent that the term "includes" is employed in the detailed description or the claims, it is intended to be inclusive in a manner similar to the term "comprising" as that term is interpreted when employed as a transitional word in a claim.

To the extent that the term "or" is employed in the claims (e.g., A or B) it is intended to mean "A or B or both". When the author intends to indicate "only A or B but not both", then the author will employ the term "A or B but not both". Thus, use of the term "or" in the claims is the inclusive, and not the exclusive, use. See Bryan A. Garner, A Dictionary of Modern Legal Usage 624 (2d Ed. 1995).

DETAILED DESCRIPTION

Example methods, systems, computer media, and so on are now described with reference to the drawings, where like reference numerals are used to refer to like elements throughout. In the following description for purposes of explanation, numerous specific details are set forth in order to facilitate thoroughly understanding the methods, systems, computer readable media, and so on. It may be evident, however, that the methods, systems and so on can be practiced without these specific details. In other instances, well-known structures and devices are shown in block diagram form in order to simplify description.

Scaling

Controllers typically are not scalable and thus are not portable between applications. However, controllers can be made portable via scaling as described in the example systems and methods provided herein. In general, a plant mathematically represented by a transfer function $G_p(s)$, (where s is the Laplace Transform variable) can be scaled according to:

$$\overline{G}_p(s) = kG_p(s/\omega_p) \qquad (16)$$

where $\omega_p$ is the plant frequency scale and k is the gain scale, to represent a large number of plants that differ from the original plant by a frequency scale, $\omega_p$, and a gain scale, k.

Then, a corresponding controller $\overline{G}_c(s)$ for the plant $\overline{G}_p(s)$ can be scaled according to:

$$\overline{G}_c(s) = (1/k)G_c(s/\omega_p). \qquad (17)$$

Figure 2:
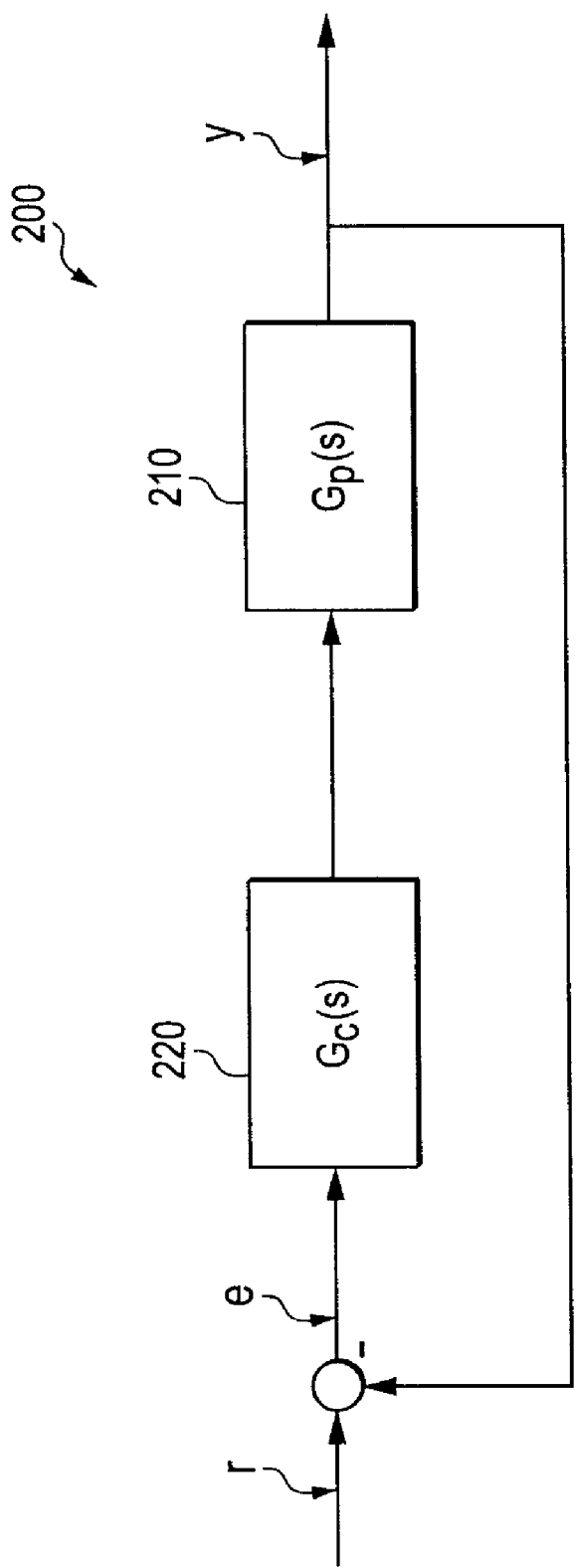
FIG. 2 illustrates a feedback control configuration.

Consider a unit feedback control system 200 with the plant $G_p(s)$ 210 and controller $G_c(s)$ 220, as shown in FIG. 2. Assume that $G_c(s)$ 220 was designed with desired command following, disturbance rejection, noise rejection, and stability robustness. Now, consider a similar class of plants $kG_p(s/\omega_p)$. For given $\omega_p$, using example systems and methods described herein, a suitable controller can be produced through frequency scaling. Thus define $\omega_p$ as the frequency scale and k as the gain scale of the plant $\overline{G}_p(s/\omega_p)$ with respect to $G_p(s)$. Then $$\overline{G}_c(s) = (1/k)G_c(s/\omega_p). \qquad (18)$$

Figure 3:
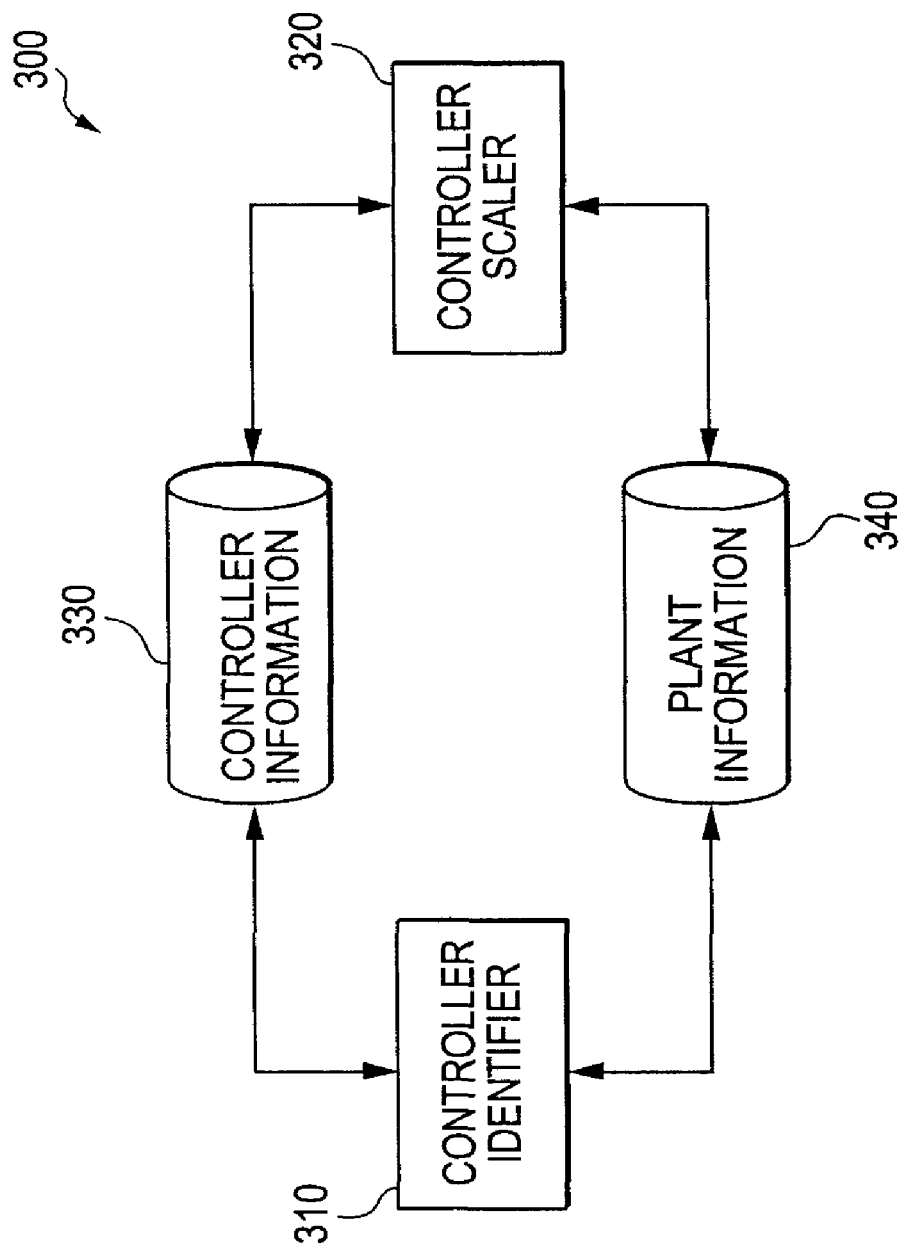
FIG. 3 illustrates an example controller production system.

Referring to FIG. 3, an example system 300 that employs frequency scaling is illustrated. The system 300 includes a controller identifier 310 that can identify a known controller associated with controlling a known plant. The controller may have one or more scaleable parameters (e.g., frequency, gains) that facilitate scaling the controller. The controller identifier 310 may access a controller information data store 330 and/or a plant information data store 340 to facilitate characterizing one or more properties of the known controller. By way of illustration, the controller identifier 310 may identify the frequency scale of the controller ($\omega_c$) and/or the frequency scale ($\omega_p$) and transfer function (s) of a plant controlled by the known controller.

The controller information data store 330 may store, for example, controller class information and/or information concerning scaleable controller parameters. Similarly, the plant data store 340 may store, for example, plant information like transfer function shape, frequency scale, and so on.

The system 300 may also include a controller scaler 320 that produces a scaled controller from the identified scaleable parameter. The scaler 320 may make scaling decisions based, for example, on information in the controller information data store 330 (e.g., controller class, scaleable parameters, frequency scale), information in the plant information data store 340 (e.g. plant class, plant transfer function, frequency scale), and so on.

While illustrated as two separate entities, it is to be appreciated that the identifier 310 and scaler 320 could be implemented in a single computer component and/or as two or more distributed, communicating, co-operating computer components. Thus, the entities illustrated in FIG. 3 may communicate through computer communications using signals, carrier waves, data packets, and so on. Similarly, while illustrated as two separate data stores, the controller information data store 330 and the plant information data store 340 may be implemented as a single data store and/or distributed between two or more communicating, co-operating data stores.

Aspects of controller scaling can be related to filter design. In filter design, with the bandwidth, the pass band, and stop band requirements given, filter design is straight forward. An example filter design method includes finding a unit bandwidth filter, such as an nth order Chebeshev filter H(s), that meets the pass band and stop band specifications and then frequency scaling the filter as $H(s/\omega_0)$ to achieve a bandwidth of $\omega_0$.

Revisiting the system 200 in FIG. 2, to facilitate understanding frequency scaling and time scaling as related to controllers, denote $\omega_p$ as the frequency scale of the plant $Gp(s/\omega_p)$ with respect to $G_p(s)$ 210, and $\tau_p=1/\omega_p$, the corresponding time scale. Then denote k as the gain scale of the plant $kGp(s)$ with respect to $Gp(s)$ 210. With these definitions in hand, differences in example industrial control problems can be described in terms of the frequency and gain scales. For example, temperature processes with different time constants (in first order transfer functions), motion control problems with different inertias, motor sizes, frictions, and the like can be described in terms of the defined frequency and gain scales.

These scales facilitate paying less attention to differences between controllers and applications and more attention to a generic solution for a class of problems because using the scales facilitates reducing linear time invariant plants, proper and without a finite zero, to one of the following example forms:

$$\frac{1}{s+1}, \frac{1}{s}, \frac{1}{s^2+2\xi s+1}, \frac{1}{s(s+1)}, \frac{1}{s^2}, \frac{1}{s^3+\xi_1 s^2+\xi_2 s+1}, \ldots \quad (19)$$

through gain and frequency scaling. For example, the motion control plant of $Gp(s)=23.2/s(s+1.41)$ is a variation of a generic motion control plant $Gp(s)=1/s(s+1)$ with a gain factor of $k=11.67$ and $\omega_p=1.41$.

$$\frac{23.2}{s(s+1.41)} = \frac{11.67}{\frac{s}{1.41}\left(\frac{s}{1.41}+1\right)} \quad (20)$$

Equation (19) describes many example industrial control problems that can be approximated by a first order or a second order transfer function response. Additionally, equation (19) can be appended by terms like:

$$\frac{s+1}{s^2+2\xi s+1}, \frac{s^2+2\xi_z s+1}{s^3+\xi_1 s^2+\xi_2 s+1}, \ldots \quad (21)$$

to include systems with finite zeros. Thus, while a set of examples is provided in equations (19) and (21), it is to be appreciated that a greater and/or lesser number of forms can be employed in accordance with the systems and methods described herein. Furthermore, in some examples, scaling can be applied to reflect the unique characteristics of certain problems. For example, a motion control system with significant resonant problems can be modeled and scaled as $$\frac{k\left(\left(\frac{s}{\omega_{rz}}\right)^2+2\xi_z\frac{s}{\omega_{rz}}+1\right)}{\frac{s}{\omega_p}\left(\frac{s}{\omega_p}+1\right)\left(\left(\frac{s}{\omega_{rp}}\right)^2+2\xi_p\frac{s}{\omega_{rp}}+1\right)} \quad (22)$$

scaling⇓

$$\frac{1}{s(s+1)}\frac{\left(\frac{s}{m}\right)^2+2\xi_z\frac{s}{m}+1}{\left(\frac{s}{n}\right)^2+2\xi_p\frac{s}{n}+1}$$

where the resonant frequencies satisfy $\omega_{rp}=n\omega_p$, $\omega_{rz}=m\omega_p$. Problems with multiple frequency scales, $\omega_p$, $n\omega_p$, and $m\omega_p$, can be referred to as multi-scale problems. With these definitions in hand, an example controller scaling technique is now described.

Assume $G_c(s)$ is a stabilizing controller for plant $G_p(s)$, and the loop gain crossover frequency is $\omega_c(s)$, then the controller $$\overline{G}_c(s)=G_c(s/\omega_p)/k \quad (23)$$

will stabilize the plant $\overline{G}_p(s)=kG_{p1}(s/\omega_p)$. The new controller new loop gain $$\overline{L}(s)=\overline{G}_p(s)\overline{G}_c(s) \quad (24)$$

will have a bandwidth of $\omega_c\omega_p$, and substantially the same stability margins of $$L(s)=G_p(s)G_c(s)$$

since $$\overline{L}(s)=L(s/\omega_p).$$

Note that the new closed-loop system has substantially the same frequency response shape as the original system except that it is shifted by $\omega_p$. Thus, feedback control properties like bandwidth, disturbance and noise rejection are retained, as is the stability robustness, from the previous design, except that frequency ranges are shifted by $\omega_p$.

Now that controller scaling has been described, PID scaling can be addressed. According to the frequency scale principle discussed above, and assuming the original controller for $G_p(s)$ is a PID, e.g., $$G_c(s) = k_p + \frac{k_i}{s} + k_d s \quad (25)$$

then the new controller for the plant $kG_p(s/\omega_p)$ is obtained from (25) as $$G_c(s) = \left(k_p + k_i \frac{\omega_p}{s} + k_d \frac{s}{\omega_p}\right) / k \qquad (26)$$

That is, the new PID gains, $\bar{k}_p$, $\bar{k}_i$, an $\bar{k}_d$ are obtained from the original ones as $$\bar{k}_p = \frac{k_p}{k}, \bar{k}_i = \frac{k_i \omega_p}{k}, \bar{k}_d = \frac{k_d}{k \omega_p} \qquad (27)$$

To demonstrate the practical application and tangible results possible from the method described above, in the following example, consider a plant that has a transfer function of $$G_p(s) = \frac{1}{s^2 + s + 1}$$

and the PID control gains of $k_p=3$, $k_i=1$, and $k_d=2$. Now, assume the plant has changed to $$G_p(s) \frac{1}{\left(\frac{s}{10}\right)^2 + \frac{s}{10} + 1}$$

The new gains are calculated from equation (30) as $\bar{k}_p=3$, $\bar{k}_i=10$, $\bar{k}_d=0.2$. Thus, rather than having to build, design, and tune the controller for the plant $$G_p(s) = \frac{1}{\left(\frac{s}{10}\right)^2 + \frac{s}{10} + 1}$$

from scratch, the PID designer was able to select an existing PID appropriate for the PID class and scale the PID. Thus, frequency scaling facilitates new systems and methods for controller design that take advantage of previously designed controllers and the relationships between controllers in related applications.

In one example, the controller is a PID controller. The PID controller may have a plant frequency scale $\omega_p$ as a scaleable parameter. In another example, the method includes producing the scaled controller. For example, a computer component may be programmed to perform the frequency scaled controlling. Additionally, computer executable portions of the method may be stored on a computer readable medium and/or be transmitted between computer components by, for example, carrier waves encoding computer executable instructions.

In view of the exemplary systems shown and described below, example methodologies that are implemented will be better appreciated with reference to the flow diagrams of FIGS. 4, 5 and 13. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Furthermore, additional and/or alternative methodologies can employ additional, not illustrated blocks. In one example, methodologies are implemented as computer executable instructions and/or operations, stored on computer readable media including, but not limited to an application specific integrated circuit (ASIC), a compact disc (CD), a digital versatile disk (DVD), a random access memory (RAM), a read only memory (ROM), a programmable read only memory (PROM), an electronically erasable programmable read only memory (EEPROM), a disk, a carrier wave, and a memory stick.

In the flow diagrams, rectangular blocks denote "processing blocks" that may be implemented, for example, in software. Similarly, the diamond shaped blocks denote "decision blocks" or "flow control blocks" that may also be implemented, for example, in software. Alternatively, and/or additionally, the processing and decision blocks can be implemented in functionally equivalent circuits like a digital signal processor (DSP), an ASIC, and the like.

A flow diagram does not depict syntax for any particular programming language, methodology, or style (e.g., procedural, object-oriented). Rather, a flow diagram illustrates functional information one skilled in the art may employ to program software, design circuits, and so on. It is to be appreciated that in some examples, program elements like temporary variables, initialization of loops and variables, routine loops, and so on are not shown.

Figure 5:
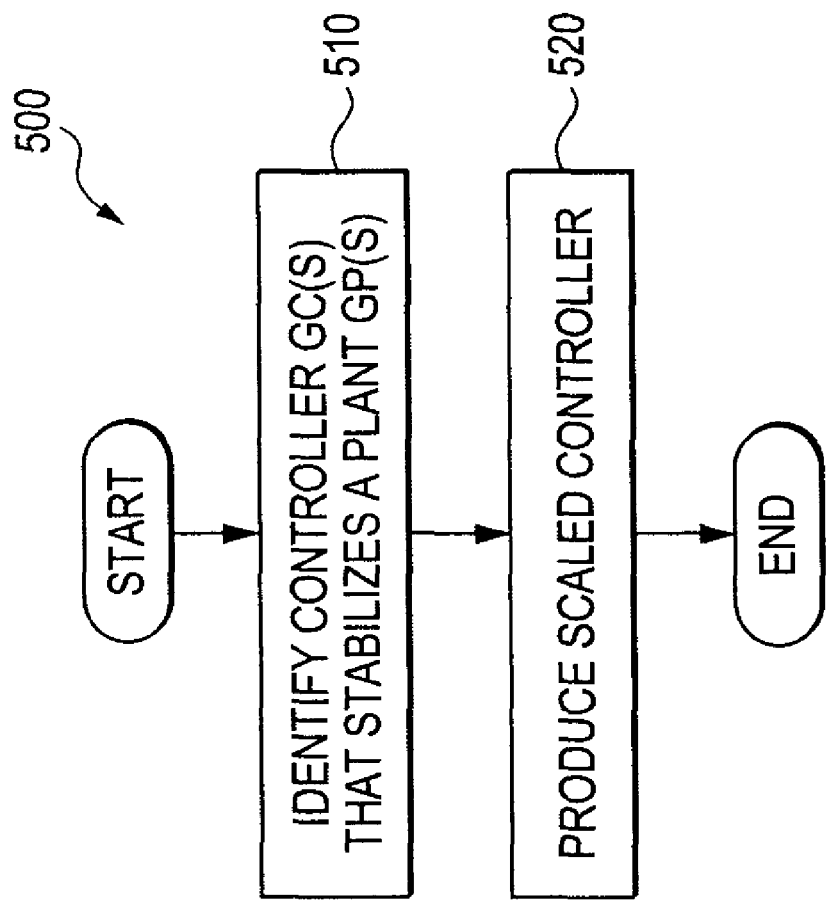
FIG. 5 illustrates an example controller scaling method.

Turning to FIG. 5, a flowchart for an example method 500 for producing a controller is illustrated. The method 500 includes, at 510, identifying a controller $G_c(s)$ that stabilizes a plant $G_p(s)$ where the controller has a frequency $\omega_c$ and, at 520, producing a controller $\bar{G}_c(s)$ by scaling the controller $G_c(s)$ according to $\bar{G}_c(s) = G_c(s/\omega_p)/k$, where the controller $\bar{G}_c(s)$ will stabilize the plant $\bar{G}_p(s) = k G_{p1}(s/\omega_p)$, where $\omega_p$ is the frequency scale of the plant $G_p(s/\omega_p)$, and where k is the gain scale of the plant $kG_p(s)$. In one example, the controller is a PID controller of the form $$G_c(s) = k_p + \frac{k_i}{s} + k_d s,$$

where $k_p$ is a proportional gain, $k_i$ is an integral gain, and $k_d$ is a derivative gain. In another example, $$G_c(s) = \left(k_p + k_i \frac{\omega_p}{s} + k_d \frac{s}{\omega_p}\right) / k.$$

In yet another example, the PID gains $\bar{k}_p$, $\bar{k}_i$, and $\bar{k}_d$ are obtained from the $k_p$, $k_i$ and $k_d$ according to $$\bar{k}_p = \frac{k_p}{k}, \bar{k}_i = \frac{k_i \omega_p}{k}, \bar{k}_d = \frac{k_d}{k \omega_p}.$$

It is to be appreciated that this example method can be employed with linear and/or non-linear PIDs.

Figure 6:
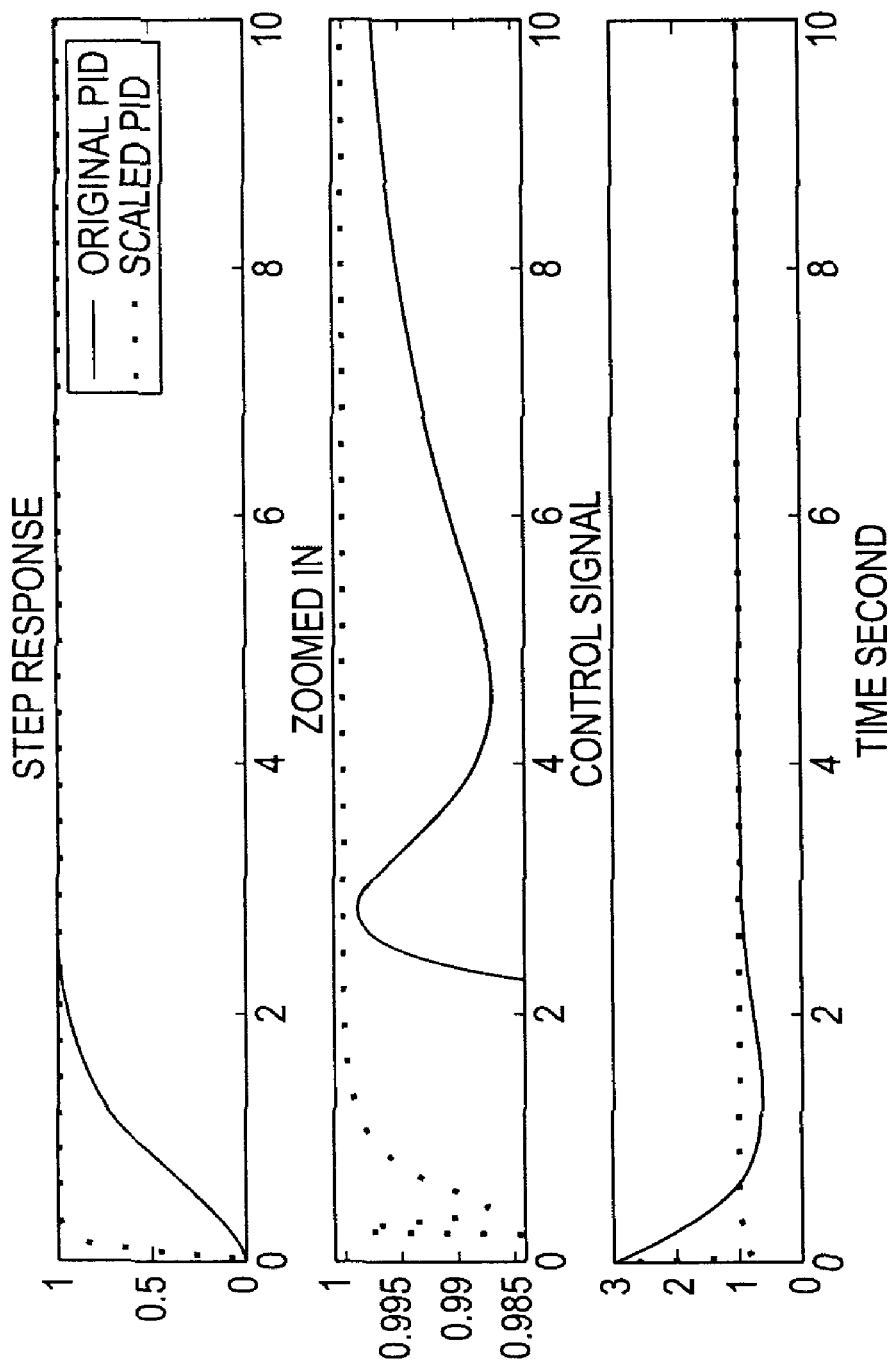
FIG. 6 compares controller responses.

Applying a unit step function as the set point, the responses of an original controller and a scaled controller are shown in FIG. 6, demonstrating that the response of the scaled controller is substantially the same as the response of the original controller, but scaled by $\tau = 1/\omega_0$. The gain margins of both systems are substantially infinite and the phase margins are both approximately 82.372 degrees. The 0 dB crossover frequency for both systems are 2.3935 and 23.935 r/s, respectively. Thus, the PID scaled by the example method is demonstrably appropriate for the application.

While the method described above concerned linear PIDs, it is to be appreciated that the method can also be applied to scaling nonlinear PIDs. For example, PID performance can be improved by using nonlinear gains in place of the linear ones. For example, $$u = k_p g_p(e) + k_i \int g_i(e) dt + k_d g_d(\dot{e}) \qquad (28)$$

where $g_p(e)$, $g_i(e)$, and $g_d(e)$ are nonlinear functions. The non-linear PIDs can be denoted NPID. Nonlinearities are selected so that the proportional control is more sensitive to small errors, the integral control is limited to the small error region—which leads to significant reduction in the associate phase lag—and the differential control is limited to a large error region, which reduces its sensitivity to the poor signal to noise ratio when the response reaches steady state and the error is small.

The NPID retains the simplicity of PID and the intuitive tuning. The same gain scaling formula (30) will also apply to the NPID controller when the plant changes from $G_p(s)$ to $kG_p(s/\omega_p)$.

Scaling facilitates concentrating on normalized control problems like those defined in (22). This facilitates selecting an appropriate controller for an individual problem by using the scaling formula in (26) and the related systems and methods that produce tangible, results (e.g., scaled controller). This further facilitates focusing on the fundamentals of control, like basic assumptions, requirements, and limitations. Thus, the example systems, methods, and so on described herein concerning scaling and parameterization can be employed to facilitate optimizing individual solutions given the physical constraints of a problem.

Parameterization

Working with controllers can be simplified if they can be described in terms of a smaller set of parameters than is conventionally possible. Typically, a controller (and possibly an observer) may have many (e.g. 15) parameters. The systems and methods described herein concerning parameterization facilitate describing a controller in terms of a single parameter. In one example, controller parameterization concerns making controller parameters functions of a single variable, the controller bandwidth $\omega_c$.

Considering the normalized plants in (19) and assuming desired closed-loop transfer functions are:

$$\frac{\omega_c}{s+\omega_c}, \frac{\omega_c^2}{(s+\omega_c)^2}, \frac{\omega_c^3}{(s+\omega_c)^3}, \ldots \qquad (29)$$

then for second order plants, the damping ratio can be set to unity, resulting in two repeated poles at $-\omega_c$. The same technique can also be applied to higher order plants.

Applying pole-placement design to the first and second order plants in (22), a set of example $\omega_c$ parameterized controllers are obtained and shown in Table I. Information concerning the plants and the related controllers can be stored, for example, in a data store.

TABLE I

EXAMPLES OF $\omega_c$-PARAMETERIZED CONTROLLERS

| Gp(s) | $\frac{1}{s+1}$ | $\frac{1}{s}$ | $\frac{1}{s^2+2\xi s+1}$ | $\frac{1}{s(s+1)}$ | $\frac{1}{s^2}$ |
|---|---|---|---|---|---|

TABLE I-continued

EXAMPLES OF $\omega_c$-PARAMETERIZED CONTROLLERS

| Gc(s, $\omega_c$) | $\frac{\omega_c(s+1)}{s}$ | $\omega_c$ | $\omega_c^2 \frac{s^2+2\xi s+1}{s(s+2\omega_c)}$ | $\frac{\omega_c^2(s+1)}{s+2\omega_c}$ | $\frac{\omega_c^2 s}{s+2\omega_c}$ |
|---|---|---|---|---|---|

Loop shaping design can also be parameterized. Loop-shaping refers to manipulating the loop gain frequency response, $L(j\omega) = G_p(j\omega)G_c(j\omega)$, as a control design tool. One example loop-shaping method includes converting design specifications to loop gain constraints, as shown in FIG. 7 and finding a controller $G_c(j\omega)$ to meet the specifications.

Figure 7:
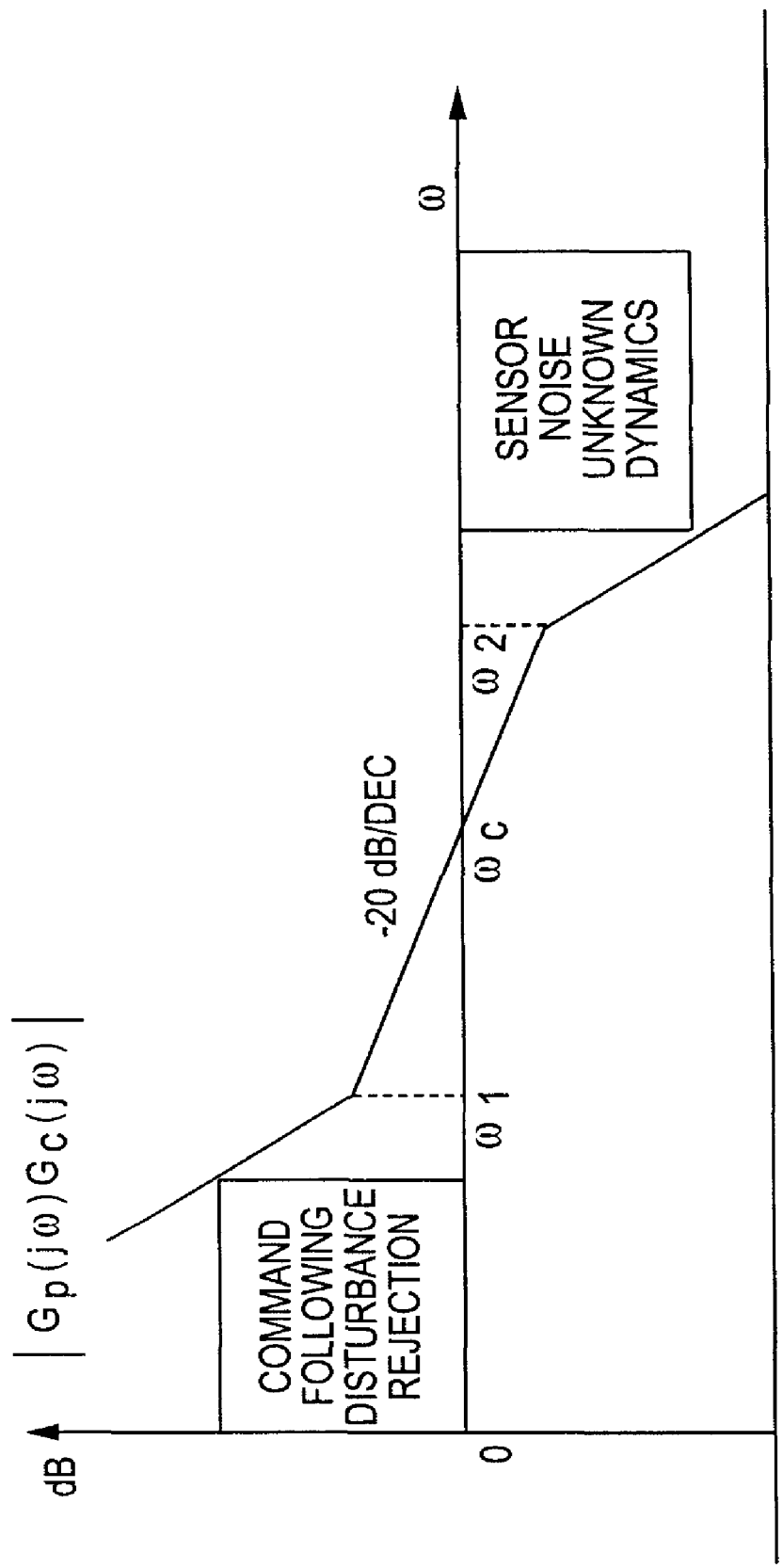
FIG. 7 illustrates loop shaping.

As an example of loop shaping, considering the plants of the form $G_p(s)$, in Table I, the desired loop gain can be characterized as $$L(s) = G_p(s)G_c(s) = \left(\frac{s+\omega_1}{s}\right)^m \frac{1}{\frac{s}{\omega_c}+1} \frac{1}{\left(\frac{s}{\omega_2}+1\right)^n} \qquad (30)$$

where $\omega_c$ is the bandwidth, and $$\omega_1 < \omega_c, \omega_2 < \omega_c, m \geq 0, \text{ and } n \geq 0 \qquad (31)$$

are selected to meet constrains shown in FIG. 7. In the example, both m and n are integers. In one example, default values for $\omega_1$ and $\omega_2$ are $$\omega_1 = \omega_c/10 \text{ and } \omega_2 = 10\omega_c \qquad (32)$$

which yield a phase margin greater than forty-five degrees.

Once appropriate loop gain constraints are derived and the corresponding lowest order L(s) in (33) is selected, the controller can be determined from $$G_c(s) = \left(\frac{s+\omega_1}{s}\right)^m \frac{1}{\frac{s}{\omega_c}+1} \frac{1}{\left(\frac{s}{\omega_2}+1\right)^n} G_p^{-1}(s) \qquad (33)$$

An additional constraint on n is that $$\frac{1}{\frac{s}{\omega_c}+1} \frac{1}{\left(\frac{s}{\omega_2}+1\right)^n} G_p^{-1}(s) \qquad (34)$$

is proper

This design is valid for plants with a minimum phase. For a non-minimum phase plant, a minimum phase approximation of $G_p^{-1}(s)$ can be employed.

A compromise between $\omega_1$ and the phase margin can be made by adjusting $\omega_1$ upwards, which will improve the low frequency properties at the cost of reducing phase margin. A similar compromise can be made between phase margin and $\omega_2$.

Figure 4:
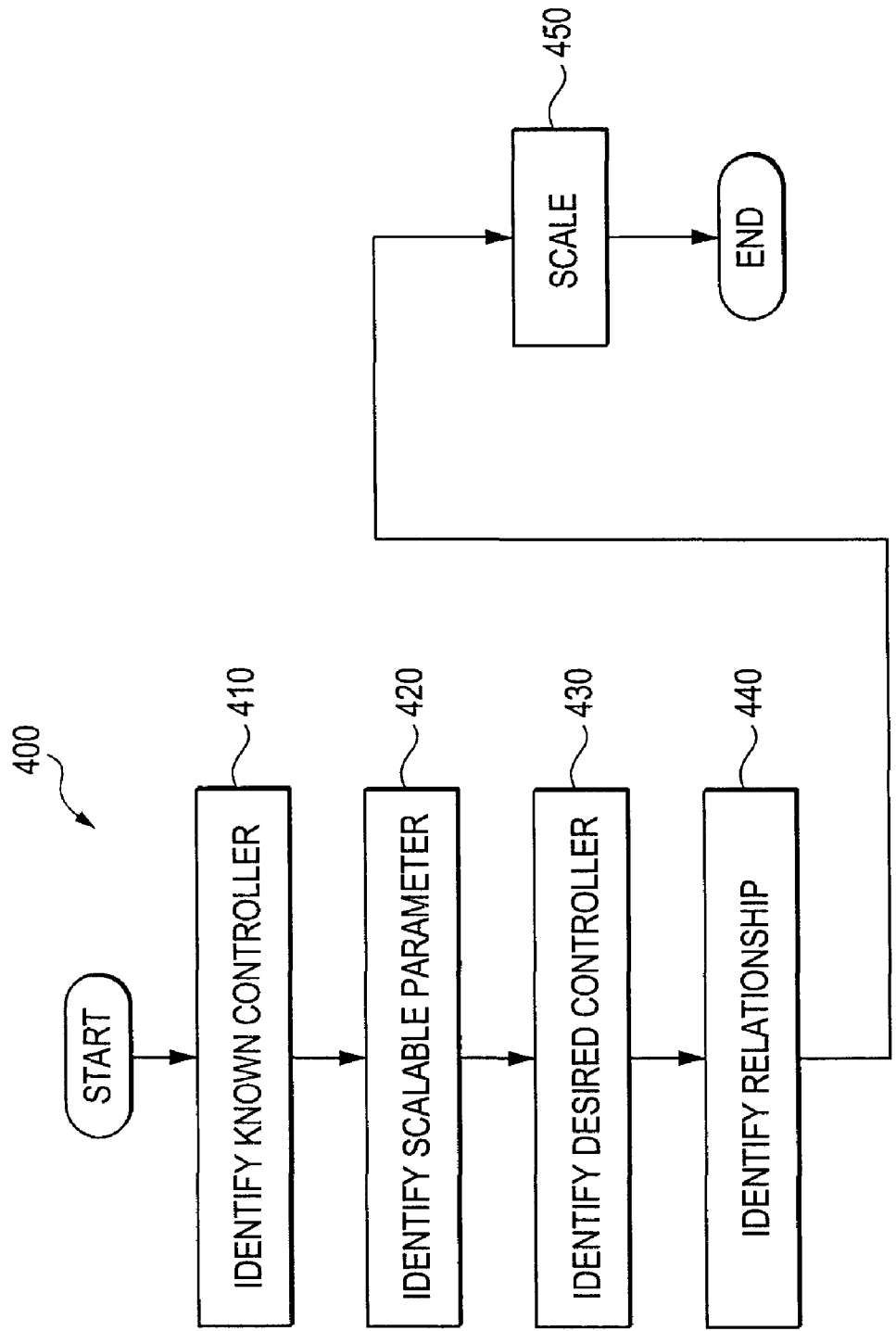
FIG. 4 illustrates an example controller scaling method.

Turning to FIG. 4, an example method 400 for scaling a controller is illustrated. The method 400 includes, at 410, identifying a known controller in a controller class where the known controller controls a first plant. The method 400 also includes, at 420, identifying a scaleable parameter for the known controller. At 430, the method 400 includes identifying a desired controller in the controller class, where the desired controller controls a second, frequency related plant and at 440, establishing the frequency relation between the known controller and the desired controller. At 450, the method 400 scales the known controller to the desired controller by scaling the scaleable parameter based, at least in part, on the relation between the known controller and the desired controller.

Practical Optimization Based on a Hybrid Scaling and Parameterization Method

Practical controller optimization concerns obtaining optimal performance out of existing hardware and software given physical constraints. Practical controller optimization is measured by performance measurements including, but not limited to, command following quickness (a.k.a. settling time), accuracy (transient and steady state errors), and disturbance rejection ability (e.g., attenuation magnitude and frequency range). Example physical constraints include, but are not limited to, sampling and loop update rate, sensor noise, plant dynamic uncertainties, saturation limit, and actuation signal smoothness requirements.

Conventional tuning relies, for example, on minimizing a cost function like $H_2$ and $H_{2\delta}$. However, conventional cost functions may not comprehensively reflect the realities of control engineering, and may, therefore, lead to suboptimal tuning. For example, one common cost function is mathematically attractive but can lead to suboptimal controller tuning. Thus, optimizing other criteria, like $\omega_c$ are considered.

A typical industrial control application involves a stable single-input single-output (SISO) plant, where the output represents a measurable process variable to be regulated and the input represents the control actuation that has a certain dynamic relationship to the output. This relationship is usually nonlinear and unknown, although a linear approximation can be obtained at an operating point via the plant response to a particular input excitation, like a step change.

Evaluating performance measurements in light of physical limitations yields the fact that they benefit from maximum controller bandwidth $\omega_c$. If poles are placed in the same location, then $\omega_c$ can become the single item to tune. Thus, practical PID optimization can be achieved with single parameter tuning. For example, in manufacturing, a design objective for an assembly line may be to make it run as fast as possible while minimizing the down time for maintenance and trouble shooting. Similarly, in servo design for a computer hard disk drive, a design objective may be to make the read/write head position follow the setpoint as fast as possible while maintaining extremely high accuracy. In automobile anti-lock brake control design, a design objective may be to have the wheel speed follow a desired speed as closely as possible to achieve minimum braking distance.

In the three examples, the design goal can be translated to maximizing controller bandwidth $\omega_c$. There are other industrial control examples that lead to the same conclusion. Thus, $\omega_c$ maximization appears to be a useful criterion for practical optimality. Furthermore, unlike purely mathematical optimization techniques, $\omega_c$ optimization has real world applicability because it is limited by physical constraints. For example, sending $\omega_c$ to infinity may be impractical because it may cause a resulting signal to vary unacceptably.

As an example of how physical limitations may affect $\omega_c$ optimization, consider digital control apparatus that have a maximum sampling rate and a maximum loop update rate. The maximum sampling rate is a hardware limit associated with the Analog to Digital Converter (ADC) and the maximum loop update rate is software limit related to central processing unit (CPU) speed and the control algorithm complexity. Typically, computation speeds outpace sampling rates and therefore only the sampling rate limitation is considered.

As another example, measurement noise may also be considered when examining the physical limitations of $\omega_c$ optimization. For example, the $\omega_c$ is limited to the frequency range where the accurate measurement of the process variable can be obtained. Outside of this range, the noise can be filtered using either analog or digital filters.

Plant dynamic uncertainty may also be considered when examining the physical limitations of $\omega_c$ optimization. Conventional control design is based on a mathematical description of the plant, which may only be reliable in a low frequency range. Some physical plants exhibit erratic phase distortions and nonlinear behaviors at a relative high frequency range. The controller bandwidth is therefore limited to the low frequency range where the plant is well behaved and predictable. To safeguard the system from instability, the loop gain is reduced where the plant is uncertain. Thus, maximizing the bandwidth safely amounts to expanding the effective (high gain) control to the edge of frequency range where the behavior of the plant is well known.

Similarly, actuator saturation and smoothness may also affect design. Although using transient profile helps to decouple bandwidth design and the transient requirement, limitations in the actuator like saturation, nonlinearities like backlash and hysteresis, limits on rate of change, smoothness requirements based on wear and tear considerations, and so on may affect the design. For example, in a motion control application with a significant backlash problem in the gearbox, excessively high bandwidth will result in a chattering gearbox and, very likely, premature breakdown. Thus, $\omega_c$ optimization, because it considers physical limitations like sampling rate, loop update rate, plant uncertainty, actuator saturation, and so on, may produce improved performance.

Figure 8:
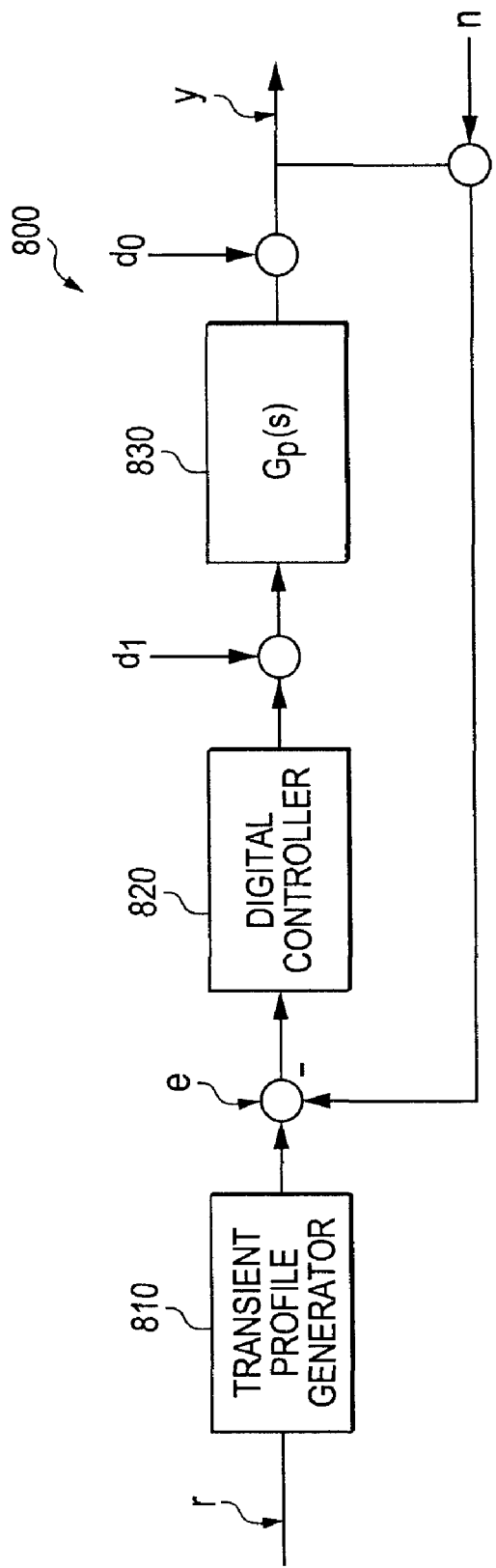
FIG. 8 illustrates a closed loop simulator setup.

In one controller optimization example, assume that the plant is minimum phase, (e.g., its poles and zeros are in the left half plane), that the plant transfer function is given, that the $\omega_c$ parameterized controllers are known and available in form of Table I, that a transient profile is defined according to the transient response specifications, and that a simulator 800 of closed-loop control system as shown in FIG. 8 is available. It is to be appreciated that the closed loop control system simulator 800 can be, for example, hardware, software or a combination of both. In one example, the simulator incorporates limiting factors including, but not limited to, sensor and quantization noises, sampling disturbances, actuator limits, and the like.

With these assumptions, one example design method then includes, determining frequency and gain scales, $\omega_p$ and k from the given plant transfer function. The method also includes, based on the design specification, determining the type of controller required from, for example, Table I. The method also includes selecting the $G_c(s, \omega_c)$ corresponding to the scaled plant in the form of Table I. The method also includes scaling the controller to $$\frac{1}{k} G_c\left(\frac{s}{\omega_p}, \omega_c\right),$$

digitalizing $G_c(s/\omega_p, \omega_c)/k$ and implementing the controller in the simulator. The method may also include setting an initial value of $\omega_c$ based on the bandwidth requirement from the transient response and increasing $\omega_c$ while performing tests on the simulator, until either one of the following is observed:

a. Control signal becomes too noisy and/or too uneven, or
b. Indication of instability (oscillatory behavior)

Consider an example motion control test bed for which the mathematical model of the motion system is $$\ddot{y}=(-1.41\dot{y}+23.2T_d)+23.2u \tag{35}$$

where y is the output position, u is the control voltage sent to the power amplifier that drives the motor, and $T_d$ is the torque disturbance. An example design objective for the example system could be rotating the load one revolution in one second with no overshoot. Thus, the physical characteristics of the example control problem are:
1) |u|<3.5 volt,
2) sampling rate=1 kHz,
3) sensor noise is 0.1% white noise,
4) torque disturbance up to 10% of the maximum torque,
5) smooth control signal.

The plant transfer function is $$G_p(s) = \frac{k}{\frac{s}{\omega_p}\left(\frac{s}{\omega_p}+1\right)}, k = 11.67 \text{ and } \omega_p = 1.41.$$

Now consider the corresponding UGUB plant $$\bar{G}_p(s) = \frac{1}{s(s+1)}.$$

A PD design of $$u=k_p(r-y)+k_d(-\dot{y})$$

with $$k_p=\omega_c^2 \text{ and } k_d=2\omega_c-1$$

makes the closed-loop transfer function $$G_{cl}(s) = \frac{\omega_c^2}{(s+\omega_c)^2}.$$

Considering the plant gain scale of k and the frequency scale of $\omega_p$, the PD gains are then scaled as $$k_p = \frac{\omega_c^2}{k} = .086 \, \omega_c^2 \text{ and } k_d = \frac{2\omega_c-1}{k\omega_p} = .061(2\omega_c-1).$$

Figure 9:
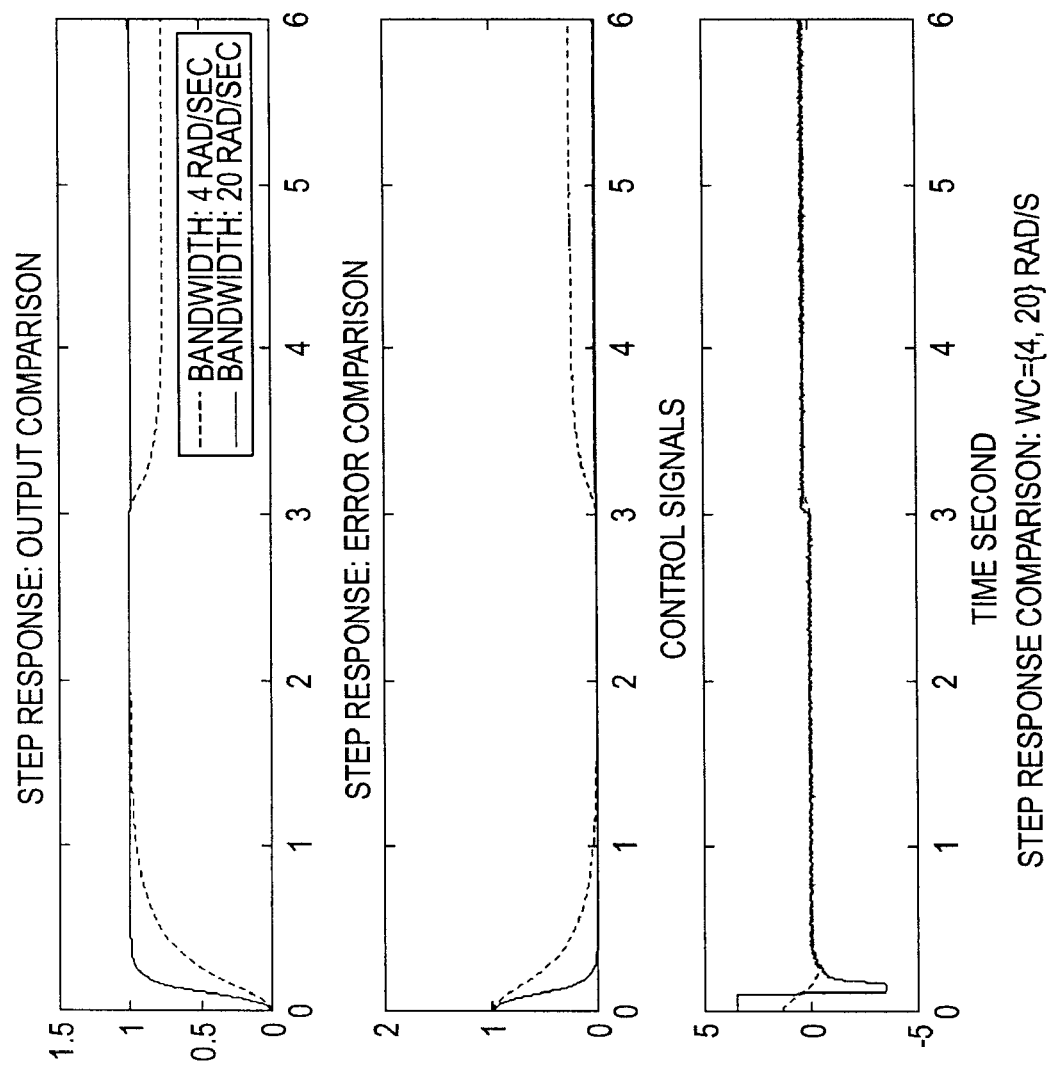
FIG. 9 compares step responses.
Figure 10:
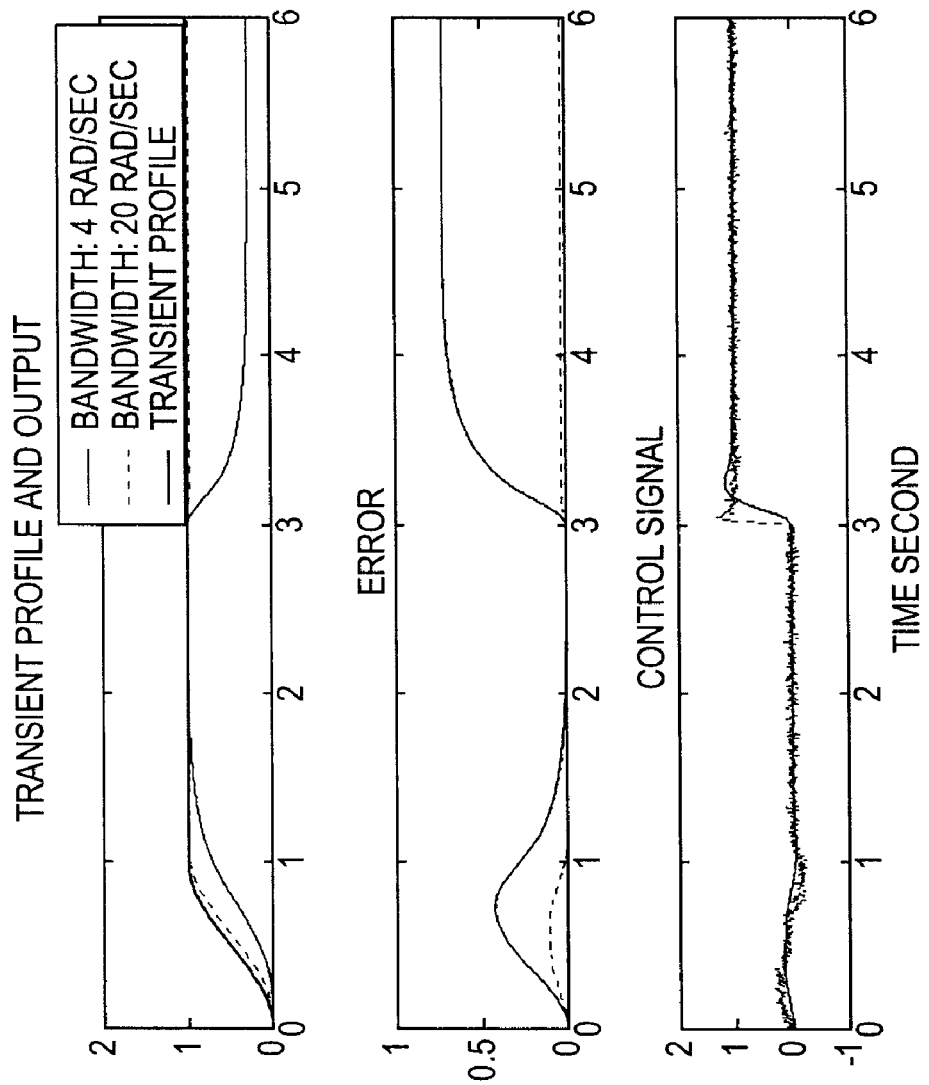
FIG. 10 illustrates transient profile effects.

To avoid noise corruptions of the control signal, an approximate differentiator $$\frac{s}{\left(\frac{s}{10\omega_c}+1\right)^2}$$

is used where the corner frequency $10\omega_c$ is selected so that the differentiator approximation does not introduce problematic phase delays at the crossover frequency. Using a conventional root locus method, the one second settling time would require a closed-loop bandwidth of 4 rad/sec. The example single parameter design and tuning methods described herein facilitate determining that an $\omega_c$ of 20 rad/sec yields optimal performance under the given conditions. A comparison of the two designs is shown in FIG. 9. Note that a step disturbance of 1 volt is added at t=3 seconds to test disturbance rejection. Finally, a trapezoidal transient profile is used in place of the step command. The results are shown in FIG. 10.

Parameterization of State Feedback and State Observer Gains

As described in the Background section, the State Feedback (SF) controller $$u=r+K\hat{x} \tag{36}$$

is based on the state space model of the plant:

$$\dot{x}(t)=Ax(t)+Bu(t), y(t)=Cx(t)+Du(t) \tag{37}$$

When the state x is not accessible, a state observer (SO):

$$\dot{\hat{x}}=A\hat{x}+Bu+L(y-\hat{y}) \tag{38}$$

is often used to find its estimate, $\hat{x}$. Here r is the setpoint for the output to follow. The state feedback gain K and the observer gain L are determined from the equations:

$$\text{eig}(A+BK)=\lambda_c(s) \text{ and } \text{eig}(A+LC)=\lambda_o(s)$$

where $\lambda_c(s)$ and $\lambda_o(s)$ are polynomials of s that are chosen by the designer. Usually the K and L have many parameters and are hard to tune.

The parameterization of state feedback and state observer gains are achieved by making $$\lambda_c(s)=(s+\omega_c)^n \text{ and } \lambda_o(s)=(s+\omega_o)^n$$

where $\omega_c$ and $\omega_o$ are bandwidth of the state feedback system and the state observer, respectively, and n is the order of the system. This simplifies tuning since parameters in K and L are now functions of $\omega_c$ and $\omega_o$, respectively.

Parameterization of Linear Active Disturbance Rejection Controller (LADRC) for a Second Order Plant Some controllers are associated with observers. Conventionally, second order systems with controllers and observers may have a large number (e.g., 15) of tunable features in each of the controller and observer. Thus, while a design method like the Han method is conceptually viable, its practical implementation is difficult because of tuning issues. As a consequence of the scaling and parameterization described herein, observer based systems can be constructed and tuned using two parameters, observer bandwidth ($\omega_0$) and controller bandwidth ($\omega_c$).

State observers provide information on the internal states of plants. State observers also function as noise filters. A state observer design principle concerns how fast the observer should track the states, (e.g., what should its bandwidth be). The closed-loop observer, or the correction term $L(y-\hat{y})$ in particular, accommodates unknown initial states, uncertainties in parameters, and disturbances. Whether an observer can meet the control requirements is largely dependent on how fast the observer can track the states and, in case of ESO, the disturbance f(t,x1,x2,w). Generally speaking, faster observers are preferred. Common limiting factors in observer design include, but are not limited to dependency on the state space model of the plant, sensor noise, and fixed sampling rate.

Dependency on the state space model can limit an application to situations where a model is available. It also makes the observer sensitive to the inaccuracies of the model and the plant dynamic changes. The sensor noise level is hardware dependent, but it is reasonable to assume it is a white noise with the peak value 0.1% to 1% of the output. The observer bandwidth can be selected so that there is no significant oscillation in its states due to noises. A state observer is a closed-loop system by itself and the sampling rate has similar effects on the state observer performance as it does on feedback control. Thus, an example model independent state observer system is described.

Figure 18:
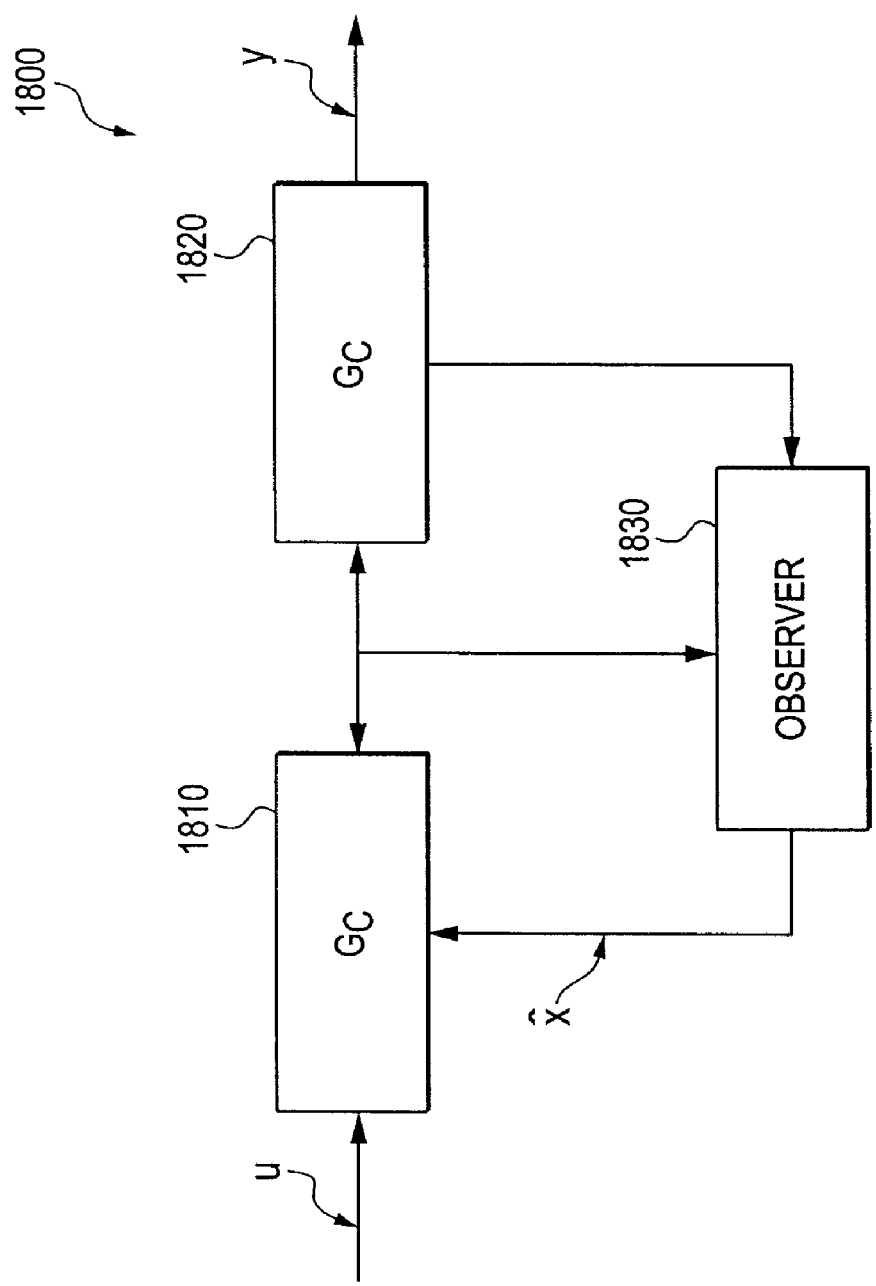
FIG. 18 illustrates an example observer based system.

Observers are typically based on mathematical models. Example systems and methods described herein can employ a "model independent" observer as illustrated in FIG. 18. For example a plant 1820 may have a controller 1810 and an observer 1830. The controller 1810 may be implemented as a computer component and thus may be programmatically tunable. Similarly, the observer 1830 may be implemented as a computer component and thus may have scaleable parameters that can be scaled programmatically. Furthermore, using analogous scaling and parameterizing as described herein, the parameters of the observer 1830 can be reduced to $\omega_o$. Therefore, overall optimizing of the system 1800 reduces to tuning $\omega_c$, and $\omega_o$.

Consider a simple example for controlling a second order plant $$\ddot{y}=-a\dot{y}-by+w+b \quad (39)$$

where y and u are output and input, respectively, and w is an input disturbance. Here both parameters, a and b, are unknown, although there is some knowledge of b, (e.g., $b_0 \approx b$ derived from the initial acceleration of y in step response). Rewrite (39) as $$\ddot{y}=-a\dot{y}-by+w+(b-b_0)u+b_0u=f+b_0u \quad (40)$$

where $f=-a\dot{y}-by+w+(b-b_0)u$. Here $f$ is referred to as the generalized disturbance, or disturbance, because it represents both the unknown internal dynamics, $-a\dot{y}-by+(b-b_0)u$ and the external disturbance w(t).

If an estimate of $f$, $\hat{f}$ can be obtained, then the control law $$u = \frac{-\hat{f} + u_0}{b_0}$$

reduces the plant to $\ddot{y}=(f-\hat{f})+u_0$ which is a unit-gain double integrator control problem with a disturbance $(f-\hat{f})$.

Thus, rewrite the plant in (40) in state space form as $$\begin{cases} \dot{x}_1 = x_2 \\ \dot{x}_2 = x_3 + b_0 u \\ \dot{x}_3 = h \\ y = x_1 \end{cases} \quad (41)$$

with $x_3=f$ added as an augmented state, and $h=\dot{f}$ is seen as an unknown disturbance. Now $f$ can be estimated using a state observer based on the state space model $$\dot{x} = Ax + Bu + Eh \quad (42)$$
$$y = Cz$$

where $$A = \begin{bmatrix} 0 & 1 & 0 \\ 0 & 0 & 1 \\ 0 & 0 & 0 \end{bmatrix}, B = \begin{bmatrix} 0 \\ b_0 \\ 0 \end{bmatrix}, C = [1 \ 0 \ 0], E = \begin{bmatrix} 0 \\ 0 \\ 1 \end{bmatrix}$$

Now the state space observer, denoted as the linear extended state observer (LESO), of (42) can be constructed as $$\dot{z}=Az+Bu+L(y-\hat{y})$$

$$\hat{y}=Cz \quad (43)$$

and if $f$ is known or partially known, it can be used in the observer by taking $h=\dot{f}$ to improve estimation accuracy.

$$\dot{z}=Az+Bu+L(y-\hat{y})+Eh$$

$$\hat{t}=Cz \quad (43b)$$

The observer can be reconstructed in software, for example, and L is the observer gain vector, which can be obtained using various methods known in the art like pole placement, $$L=[\beta_1 \beta_2 \beta_3]^T \quad (44)$$

where $[\ ]^T$ denotes transpose. With the given state observer, the control law can be given as:

$$u = \frac{-z_3 + u_0}{b_0} \quad (45)$$

Ignoring the inaccuracy of the observer, $$\ddot{y}=(f-z_3)+u_0 \approx u_0 \quad (46)$$

which is an unit gain double integrator that can be implemented with a PD controller $$u_0=k_p(r-z_1)-k_d z_2 \quad (47)$$

where r is the setpoint. This results in a pure second order closed-loop transfer function of $$G_{cl} = \frac{1}{s^2 + k_d s + k_p} \quad (48)$$

Thus, the gains can be selected as $$k_d=2\xi_c \text{ and } k_p=\omega_c^2 \quad (49)$$

where $\omega_c$ and $\zeta$ are the desired closed loop natural frequency and damping ratio. $\zeta$ can be chosen to avoid oscillations. Note that $-k_d z_2$, instead of $k_d(\dot{r}-z_2)$, is used to avoid differentiating the set point and to make the closed-loop transfer function a pure second order one without a zero.

Figure 11:
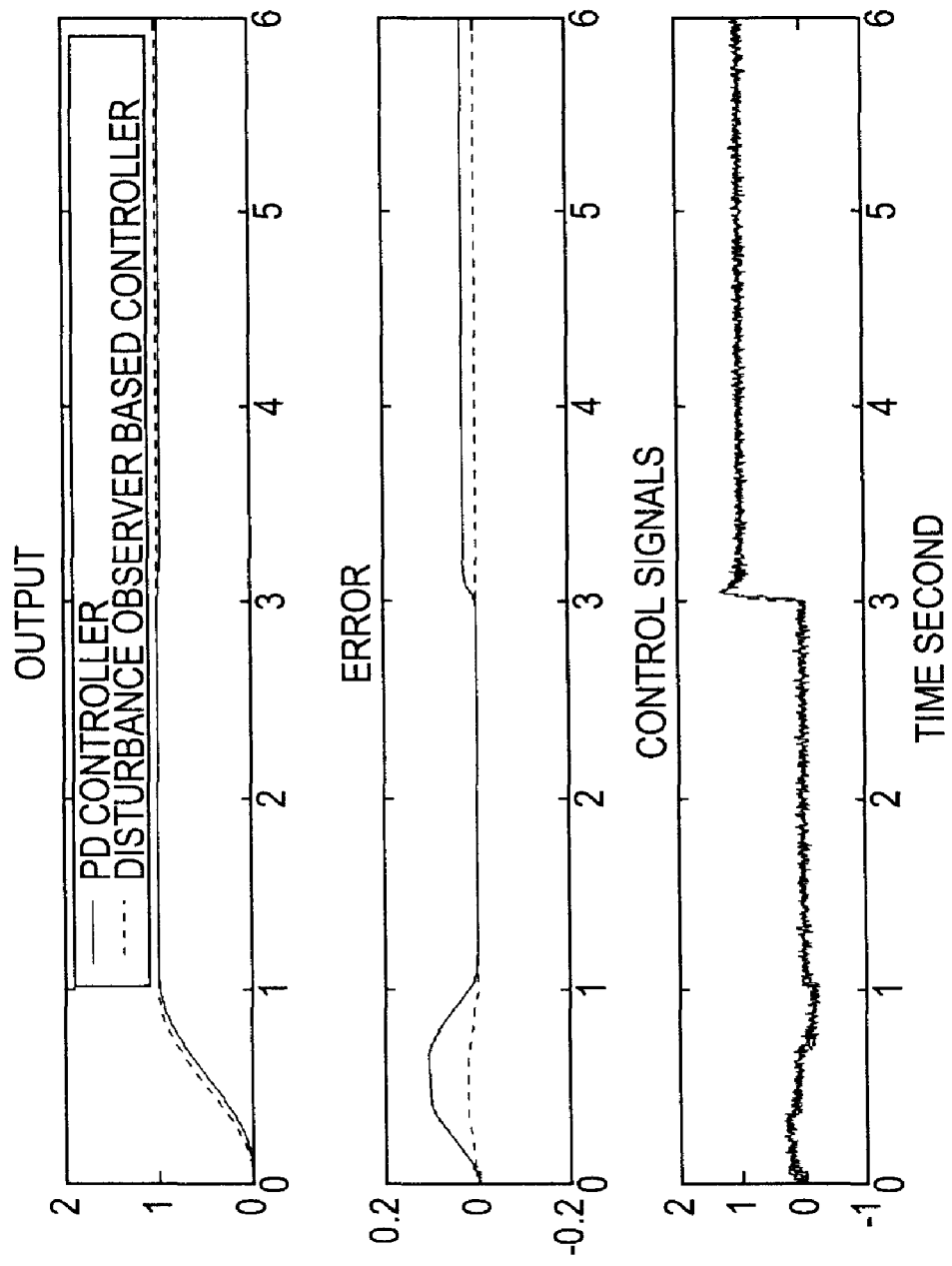
FIG. 11 compares PD and LADRC controllers.

This example, illustrated in FIG. 11, shows that disturbance observer based PD control achieves zero steady state error without using the integral part of a PID controller. This example illustrates that disturbance observer based PD control achieves zero steady state error without using the integral part of a PID controller. The example also illustrates that the design is model independent in that the design relies on the approximate value of b in (39). The example also illustrates that the combined effects of the unknown disturbance and the internal dynamics are treated as a generalized disturbance. By augmenting the observer to include an extra state, it is actively estimated and canceled out, thereby achieving active disturbance rejection. This LESO based control scheme is referred to as linear active disturbance rejection control (LADRC) because the disturbance, both internal and external, represented by $f$, is actively estimated and eliminated.

The stability of controllers can also be examined. Let $e_i=x_i-z_i$, i=1, 2, 3. Combine equation (43) and (44) and subtract the combination from (42). Thus, the error equation can be written:

$$\dot{e} = A_e e + Eh \tag{50}$$

where $$A_e = A - LC = \begin{bmatrix} -\beta_1 & 1 & 0 \\ -\beta_2 & 0 & 1 \\ -\beta_3 & 0 & 0 \end{bmatrix}$$

and E is defined in (42). The LESO is bounded input, bounded output (BIBO) stable if the roots of the characteristic polynomial of $A_e$ $$\lambda(s) = s^3 + \beta_1 s^2 + \beta_2 s + \beta_3 \tag{51}$$

are in the left half plane (LHP) and h is bounded. This separation principle also applies to LADRC.

The LADRC design from (43) to (46) yields a BIBO stable closed-loop system if the observer in (43) and (44) and the feedback control law (46) for the double integrator are stable, respectively. This is shown by combing equations (45) and (47) into a state feedback form of $u=(1/b_0)[-k_p-k_d-1]z=Fz$, where $F=(1/b_0)[-k_p-k_d-1]$. Thus, the closed-loop system can be represented by the state-space equation of:

$$\begin{bmatrix} \dot{x} \\ \dot{z} \end{bmatrix} = \begin{bmatrix} A & \overline{B}F \\ LC & A-LC+\overline{B}F \end{bmatrix} \begin{bmatrix} x \\ z \end{bmatrix} + \begin{bmatrix} [\overline{B} & E] \\ [\overline{B} & 0] \end{bmatrix} \begin{bmatrix} r \\ h \end{bmatrix} \tag{52}$$

where $\overline{B}=B/b_0$, and which is BIBO stable if its eigenvalues are in the LHP. By applying row and column operations, the closed-loop eigenvalues $$eig\left(\begin{bmatrix} A & \overline{B}F \\ LC & A-LC+\overline{B}F \end{bmatrix}\right) = eig\left(\begin{bmatrix} A+\overline{B}F & \overline{B}F \\ 0 & A-LC \end{bmatrix}\right)$$

$$= eig(A+\overline{B}F) \cup eig(A-LC)$$

$$= \{\text{roots of } s^2 + k_d s + k_p\} \cup$$

$$\{\text{roots of } s^3 + \beta_1 s^2 + \beta_2 s + \beta_3\}$$

Since r is the bounded reference signal, a nontrivial condition on the plant is that $h=\dot{f}$ is bounded. In other words, the disturbance $f$ must be differentiable.

ESO Bandwidth Parameterization $\omega_o$ parameterization refers to parameterizing the ESO on observer bandwidth $\omega_o$. Consider a plant (42) that has three poles at the origin. The related observer will be less sensitive to noises if the observer gains in (44) are small for a given $\omega_o$. But observer gains are proportional to the distance for the plant poles to those of the observer. Thus the three observer poles should be placed at $-\omega_o$, or equivalently, $$\lambda(s) = s^3 + \beta_1 s^2 + \beta_2 s + \beta_3 = (s+\omega_o)^3 \tag{53}$$

That is $$\beta_1 = 3\omega_o, \beta_2 = 3\omega_o^2, \beta_3 = \omega_o^3 \tag{54}$$

It is to be appreciated that equations (53) and (54) are extendable to nth order ESO. Similarly, the parameterization method can be extended to the Luenberger Observer for arbitrary A, B, and C matrices, by obtaining $\{\overline{A},\overline{B},\overline{C}\}$ as observable canonical form of $\{A,B,C\}$, determining the observer gain, $\overline{L}$, so that the poles of the observer are at $-\omega_o$ and using the inverse state transformation to obtain the observer gain, L, for $\{A,B,C\}$. The parameters in L are functions of $\omega_o$. One example procedure for $\omega_o$ optimization based design is now described.

Given tolerable noise thresholds in the observer states, increase $\omega_o$ until at least one of the thresholds is about to be reached or the observer states become oscillatory due to sampling delay. In general, the faster the ESO, the faster the disturbance is observed and cancelled by the control law.

A relationship between $\omega_o$ and $\omega_c$ can be examined. One example relationship is $$\omega_o \approx 3 \sim 5\omega_c \tag{55}$$

Equation (55) applies to a state feedback control system where $\omega_c$ is determined based on transient response requirements like the settling time specification. Using a transient profile instead of a step command facilitates more aggressive control design. In this example there are two bandwidths to consider, the actual control loop bandwidth $\omega_c$ and the equivalent bandwidth of the transient profile, $\overline{\omega}_c$. Part of the design procedure concerns selecting which of the two to use in (55). Since the observer is evaluated on how closely it tracks the states and $\overline{\omega}_c$ more indicative than $\omega_c$, on how fast the plant states move, $\overline{\omega}_c$ is the better choice although it is to be appreciated that either can be employed. Furthermore, taking other design issues like the sampling delay into consideration, a more appropriate minimum $\omega_o$ is found through simulation and experimentation as $$\omega_o \approx 5 \sim 10\overline{\omega}_c \tag{56}$$

An example for optimizing LADRC is now presented. One example LADRC design and optimization method includes designing a parameterized LESO and feedback control law where $\omega_o$ and $\omega_c$ are the design parameters. The method also includes designing a transient profile with the equivalent bandwidth of $\overline{\omega}_c$ and selecting an $\omega_o$ from (56). The method then includes setting $\omega_c = \omega_o$ and simulating and/or testing the LADRC in a simulator. The method also includes incrementally increasing $\omega_c$ and $\omega_o$ by the same amount until the noise levels and/or oscillations in the control signal and output exceed the tolerance. The method also includes incrementally increasing or decreasing $\omega_c$ and $\omega_o$ individually, if necessary, to make trade-offs between different design considerations like the maximum error during the transient period, the disturbance attenuation, and the magnitude and smoothness of the controller.

In one example, the simulation and/or testing may not yield satisfactory results if the transient design specification described by $\overline{\omega}_c$ is untenable due to noise and/or sampling limitations. In this case, control goals can be lowered by reducing $\overline{\omega}_c$ and therefore $\omega_c$ and $\omega_o$. It will be appreciated by one skilled in the art that this approach can be extended to Luenberg state observer based state feedback design.

By way of illustration, reconsider the control problem example associated with equations (32), but apply the LADRC in (43) to (48). Note that b=23.2 for this problem, but to make the design realistic, assume the designer's estimate of b is $b_0=40$. Now rewrite the plant differential equation (38) as $$\ddot{y} = (-1.41\dot{y} + 23.2T_d) + (23.2 - 40)u + 40u = f + 40u$$

Figure 12:
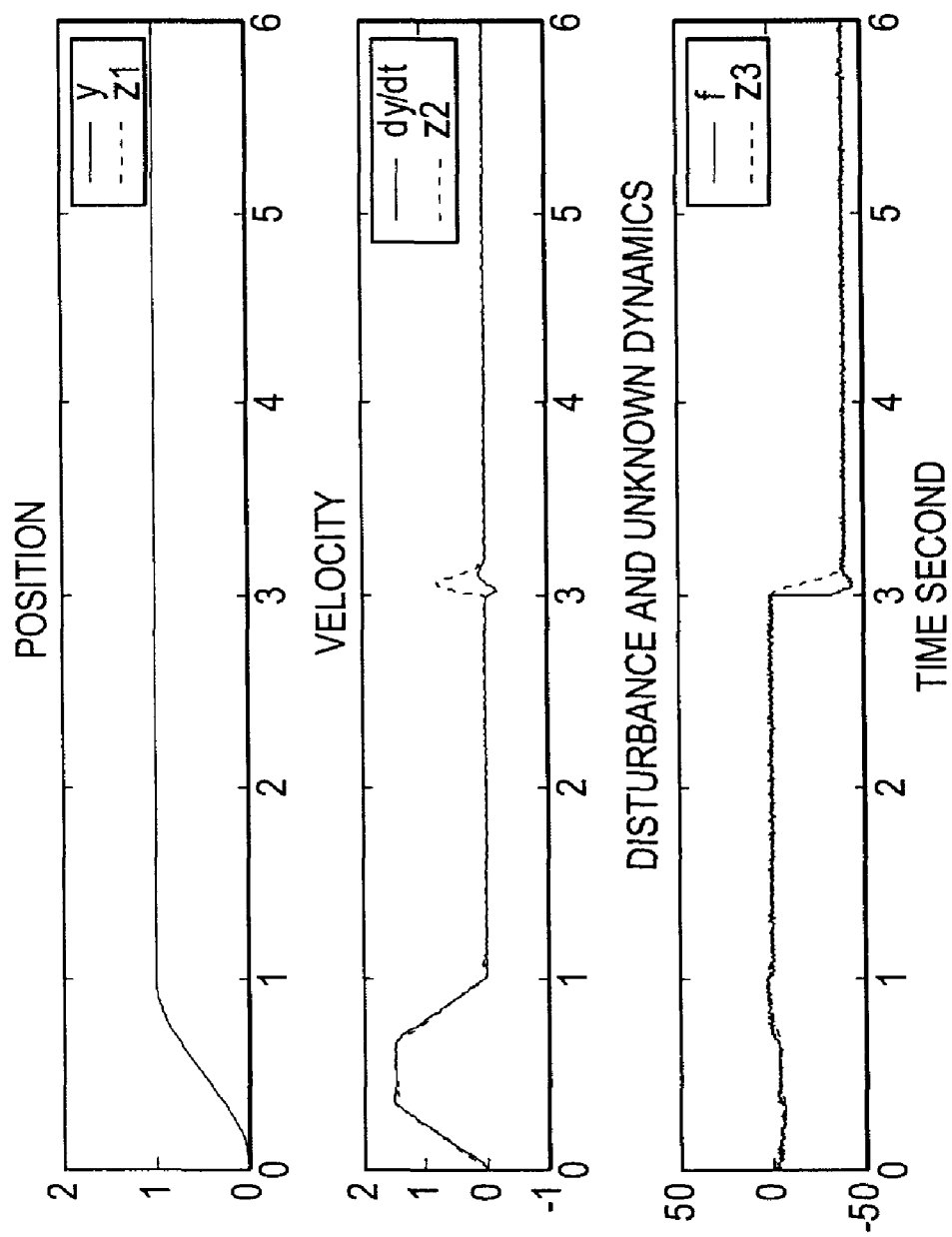
FIG. 12 illustrates LESO performance.

The LESO is $$\dot{z} = \begin{bmatrix} -3\omega_o & 1 & 0 \\ -3\omega_o^2 & 0 & 1 \\ -\omega_o^3 & 0 & 0 \end{bmatrix} z + \begin{bmatrix} 0 & 3\omega_o \\ 40 & 3\omega_o^2 \\ 0 & \omega_o^3 \end{bmatrix} \begin{bmatrix} u \\ y \end{bmatrix}$$

and $z_1 \to y$, $z_2 \to \dot{y}$, and $z_3 \to f = -1.41\dot{y} + 23.2T_d + (23.2-40)u$, as $t \to \infty$ The control law is defined as $$u = \frac{u_0 - z_3}{40} \text{ and } u_0 = k_p(r - z_1) - k_d z_2$$

with $$k_d = 2\xi\omega_c, \xi = 1, \text{ and } k_p = \omega_c^2$$

where $\omega_c$ is the sole design parameter to be tuned. A trapezoidal transient profile is used with a settling time of one second, or $\overline{\omega}_c=4$. From (56), $\omega_o$ is selected to be 40 rad/sec. The LADRC facilitates design where a detailed mathematical model is not required, where zero steady state error is achieved without using the integrator term in PID, where there is better command following during the transient stage and where the controller is robust. This performance is achieved by using a extended state observer. Example performance is illustrated in FIG. 12.

Parameterization of LADRC for nth Order Plant

It will be appreciated by one skilled in the art that observer based design and tuning techniques can be scaled to plants of arbitrary orders. For a general nth order plant with unknown dynamics and external disturbances, $$y^{(n)}=f(t,y,\dot{y},\ldots,y^{(n-1)},u,\dot{u},\ldots u^{(n-1)},w)+bu \quad (57)$$

the observer can be similarly derived, starting from the state space equation $$\begin{cases} \dot{x}_1 = x_2 \\ \dot{x}_2 = x_3 \\ \ldots \\ \dot{x}_n = x_{n+1} + b_0 u \\ \dot{x}_{n+1} = h \\ y = x_1 \end{cases} \quad (58)$$

with $x_{n+1}=f$ added as an augmented state, and $h=\dot{f}$ mostly unknown. The observer of (43) in its linear form with the observer gain $$L=[\beta_1 \beta_2 \ldots \beta_{n+1}]^T \quad (59)$$

has the form $$\begin{cases} \dot{z}_1 = z_2 - \beta_1(z_1 - y(t)) \\ \dot{z}_2 = z_3 - \beta_2(z_1 - y(t)) \\ \ldots \\ \dot{z}_n = z_{n+1} - \beta_n(z_1 - y(t)) + b_0 u \\ \dot{z}_{n+1} = -\beta_{n+1}(z_1 - y(t)) \end{cases} \quad (60)$$

and if $f$ is known or partially known, it can be used in the observer by taking $h=\dot{f}$ to improve estimation accuracy.

$$\dot{z}_1 = z_2 - \beta_1(z_1 - y(t)) \quad (60a)$$
$$\dot{z}_2 = z_3 - \beta_2(z_1 - y(t))$$
$$\vdots$$
$$\dot{z}_n = z_{n+1} - \beta_n(z_1 - y(t)) + b_0 u,$$
$$\dot{z}_{n+1} = -\beta_{n+1}(z_1 - y(t)) + h,$$

With the gains properly selected, the observer will track the states and yield $$z_1(t) \to y(t), z_2(t) \to \dot{y}(t), \ldots, z_n(t) \to y^{(n-1)}(t)$$

$$z_{n+1}(t) \to f(t,y,\dot{y},\ldots,y^{(n-1)},u,\dot{u},\ldots u^{(n-1)},w) \quad (61)$$

The control law can also be similarly designed as in (45) and (47), with $$u = -\frac{z_{n+1} + u_0}{b_0} \quad (62)$$

which reduces the plant to approximately a unit gain cascaded integrator plant $$y^{(n)}=(f-z_{n+1})+u_0 \approx u_0 \quad (63)$$

and $$u_0=k_p(r-z_1)-k_{d_1}z_2-\ldots-k_{d_{n-1}}z_n \quad (64)$$

where the gains are selected so that the closed-loop characteristic polynomial has n poles at $-\omega_c$, $$s^n+k_{d_{n-1}}s^{n-1}+\ldots+k_{d_1}s+k_p=(s+\omega_c)^n \quad (65)$$

$\omega_c$ is the closed-loop bandwidth to be optimized in tuning. The $\omega_o$ optimization can similarly be applied using $$s^n+\beta_1 s^{n-1}+\ldots+\beta_{n-1}s+\beta_n=(s+\omega_o)^n \quad (66)$$

The following example method can be employed to identify a plant order and $b_0$. Given a "black box" plant with input u and output y, the order, n, and $b_0$ can be estimated by allowing the plant to discharge energy stored internally so that it has a zero initial condition, (e.g., $y(0)=\dot{y}(0)=\ldots y^{(n-1)}(0)=0$) and then assuming $f(0)=0$. The method includes applying a set of input signals and determining the initial slope of the response: $\dot{y}(0^+)$, $\ddot{y}(0^+)$, . . . . The method also includes determining the slope $y^{(i)}(0^+)$ that is proportional to u(0) under various tests, (e.g., $y^{(i)}(0^+)=ku(0)$). Then the method includes setting n=i+1 and $b_0$=k.

Auto-Tuning Based on the New Scaling, Parameterization and Optimization Techniques Auto-tuning concerns a "press button function" in digital control equipment that automatically selects control parameters. Auto-tuning is conventionally realized using an algorithm to calculate the PID parameters based on the step response characteristics like overshoot and settling time. Auto-tuning has application in, for example, the start up procedure of closed-loop control (e.g., commissioning an assembly line in a factory). Auto-tuning can benefit from scaling and parameterization.

In some applications, dynamic changes in the plant during operations are so severe that controller parameters are varied from one operating point to another. Conventionally, gain-scheduling is employed to handle these situations. In gain-scheduling, the controller gains are predetermined for different operating points and switched during operations. Additionally, and/or alternatively, self-tuning that actively adjusts control parameters based on real time data identifying dynamic plant changes is employed.

Common goals of these techniques are to make the controller parameter determination automatic, given the plant response to a certain input excitation, say a step function and to maintain a consistent controller performance over a wide range of operations, (e.g. making the controller robust).

Example systems, methods and so on described herein concerning scaling and parameterization facilitate auto-scaling model based controllers. When a transfer function model of a plant is available, the controller can be designed using either pole placement or loop shaping techniques. Thus, example scaling techniques described herein facilitate automating controller design and tuning for problems including, but not limited to, motion control, where plants are similar, differing only in dc gain and the bandwidth, and adjusting controller parameters to maintain high control performance as the bandwidth and the gain of the plant change during the operation.

In the examples, the plant transfer functions can be represented as $\bar{G}_p(s)=kG_p(s/\omega_p)$, where $G_p(s)$ is given and known as the "mother" plant and k and $\omega_p$ are obtained from the plant response or transfer function. Assuming the design criteria are similar in nature, differing only in terms of the loop gain bandwidth, $\omega_c$, the controller for similar plants can be automatically obtained by scaling the given controller, $G_c(s, \omega_c)$, for $G_p(s)$. This is achieved by combining the controller scaling, defined in equation (26), and $\omega_c$-parameterization to obtain the controller for $\bar{G}_p(s)=kG_p(s/\omega_p)$ as $$\bar{G}_c(s,\omega_c)=G_c(s/\omega_p,\omega_c)/k \qquad (67)$$

There are three parameters in (67) that are subject to tuning. The first two parameters, k and $\omega_p$, represent plant changes or variations that are determined. The third parameter, $\omega_c$, is tuned to maximize performance of the control system subject to practical constraints.

An example method for auto-tuning is now described. The auto-tuning method includes examining a plant $G_p(s)$ and the nominal controller $G_c(s, \omega_c)$. Given the plant $G_p(s)$ and the nominal controller $G_c(s, \omega_c)$, the method includes performing off-line tests to determine k and $\omega_p$ for the plant. The method also includes using equation (67) to determine a new controller for the plant, $\bar{G}_p(s)=kG_p(s/\omega_p)$, obtained in the previous act. The method also includes optimizing $\omega_c$ for the new plant.

An example method for adaptive self-tuning is now described. The adaptive self-tuning procedure includes examining a plant $\bar{G}_p(s)=kG_p(s/\omega_p)$, where k and $\omega_p$ are subject to change during plant operation. Given the plant $\bar{G}_p(s)=kG_p(s/\omega_p)$, the method includes performing real time parameter estimation to determine k and $\omega_p$ as they change. The method also includes determining when the performance of the control system is degraded beyond a pre-determined, configurable threshold and updating the controller using (67). The method also includes selectively decreasing $\omega_c$ if the plant dynamics deviate significantly from the model $kG_p(s/\omega_p)$, which causes performance and stability problems. The method also includes selectively increasing $\omega_c$ subject to $\omega_c$-optimization constraints if the plant model can be updated to reflect the changes of the plant beyond k and $\omega_p$.

The LADRC technique does not require the mathematical model of the plant. Instead, it employs a rough estimate of the single parameter b in the differential equation of the plant (57). This estimation is denoted as $b_0$ and is the sole plant parameter in LADRC. As the dynamics of the plant changes, so does b. Thus, $b_0$ can be estimated by rewriting (57) as $$y^{(n)}=f(t)+bu \qquad (69)$$

and assuming the zero initial condition, (e.g., $y^{(i)}(0)=0$, $i=1, 2, \ldots n-1$ and $f(0)=0$). Then $b_0 \approx b$ can be estimated by using $$b_0=y^{(n)}(0^+)/u(0) \qquad (70)$$

where u(0) is the initial value of the input. It is to be appreciated that this method can be applied to both open loop and closed-loop configurations. For the auto-tuning purposes, the test can be performed off-line and a step input, u(t)=constant can be applied. The LADRC does not require $b_0$ to be highly accurate because the difference, $b-b_0$, is treated as one of the sources of the disturbance estimated by LESO and cancelled by control law.

The $b_0$ obtained from the off-line estimation of b described above can be adapted for auto-tuning LADRC. An auto-tuning method includes, performing off-line tests to determine the order of the plant and $b_0$, selecting the order and the $b_0$ parameter of the LADRC using the results of the off-line tests, and performing a computerized auto-optimization.

Figure 13:
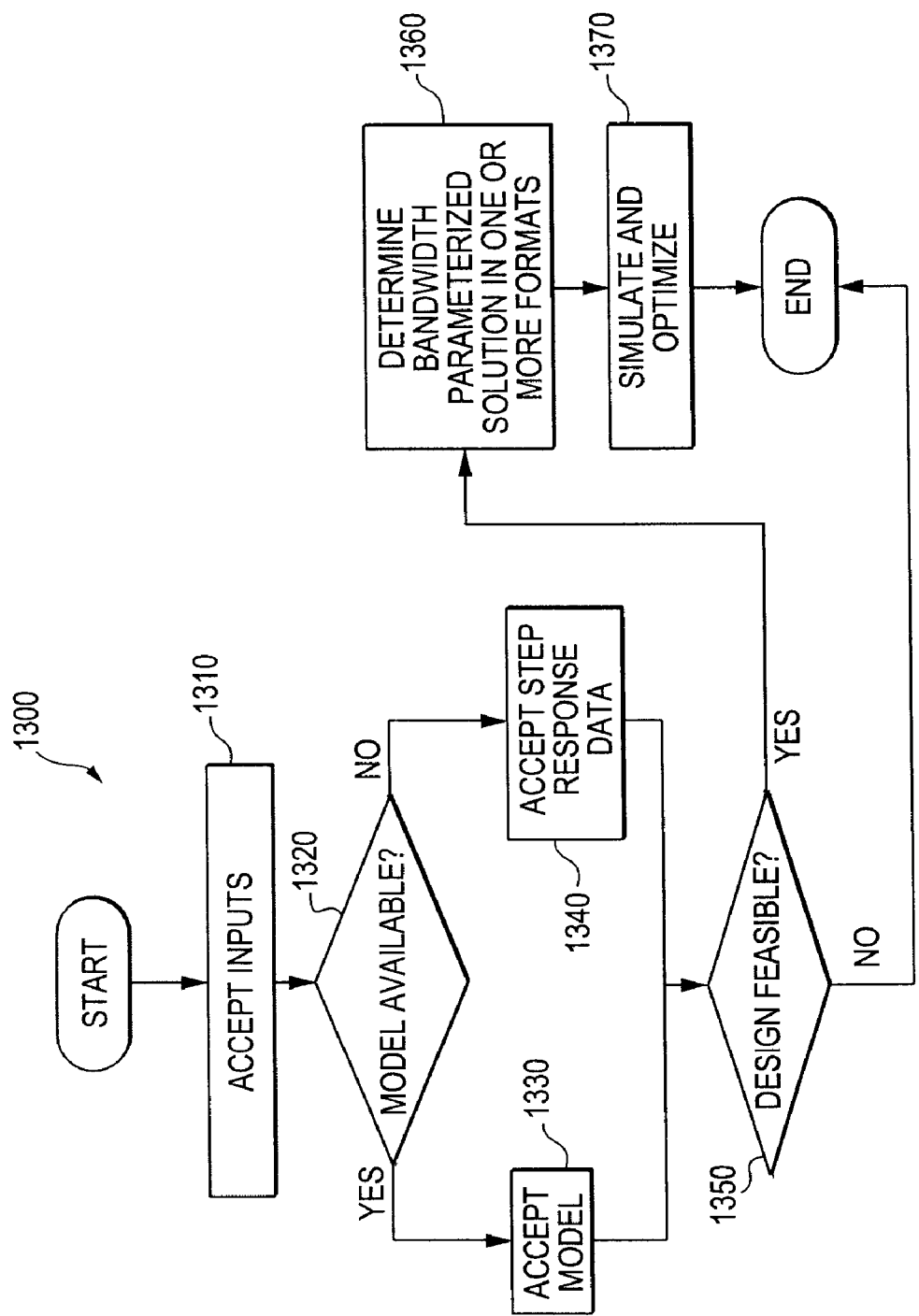
FIG. 13 is a flowchart of an example design method.

Using the controller scaling, parameterization and optimization techniques presented herein, an example computer implemented method 1300 as shown in FIG. 13 can be employed to facilitate automatically designing and optimizing the automatic controls (ADOAC) for various applications. The applications include, but are not limited to, motion control, thermal control, pH control, aeronautics, avionics, astronautics, servo control, and so on.

The method 1300, at 1310, accepts inputs including, but not limited to, information concerning hardware and software limitations like the actuator saturation limit, noise tolerance, sampling rate limit, noise levels from sensors, quantization, finite word length, and the like. The method also accepts input design requirements like settling time, overshoot, accuracy, disturbance attenuation, and so on. Furthermore, the method also accepts as input the preferred control law form like, PID form, model based controller in a transfer function form, and model independent LADRC form. In one example, the method can indicate if the control law should be provided in a difference equation form. At 1320, a determination is made concerning whether a model is available. If a model is available, then at 1330 the model is accepted either in transfer function, differential equations, or state space form. If a model is not available, then the method may accept step response data at 1340. Information on significant dynamics that is not modeled, such as the resonant modes, can also be accepted.

Once the method has received information input, the method can check design feasibility by evaluating the specification against the limitations. For example, in order to see whether transient specifications are achievable given the limitations on the actuator, various transient profiles can be used to determine maximum values of the derivatives of the output base on which the maximum control signal can be estimated. Thus, at 1350, a determination is made concerning whether the design is feasible. In one example, if the design is not feasible, processing can conclude. Otherwise, processing can proceed to 1360.

If the input information passes the feasibility test, then at 1360, the method 1300 can determine an $\omega_c$ parameterized solution in one or more formats. In one example, the $\omega_c$ solution can then be simulated at 1370 to facilitate optimizing the solution.

In one example, to assist an engineer or other user, the ADOAC method provides parameterized solutions of different kind, order, and/or forms, as references. The references can then be ranked separately according to simplicity, command following quality, disturbance rejection, and so on to facilitate comparison.

Computer Processing of Control Algorithms

Figure 14:
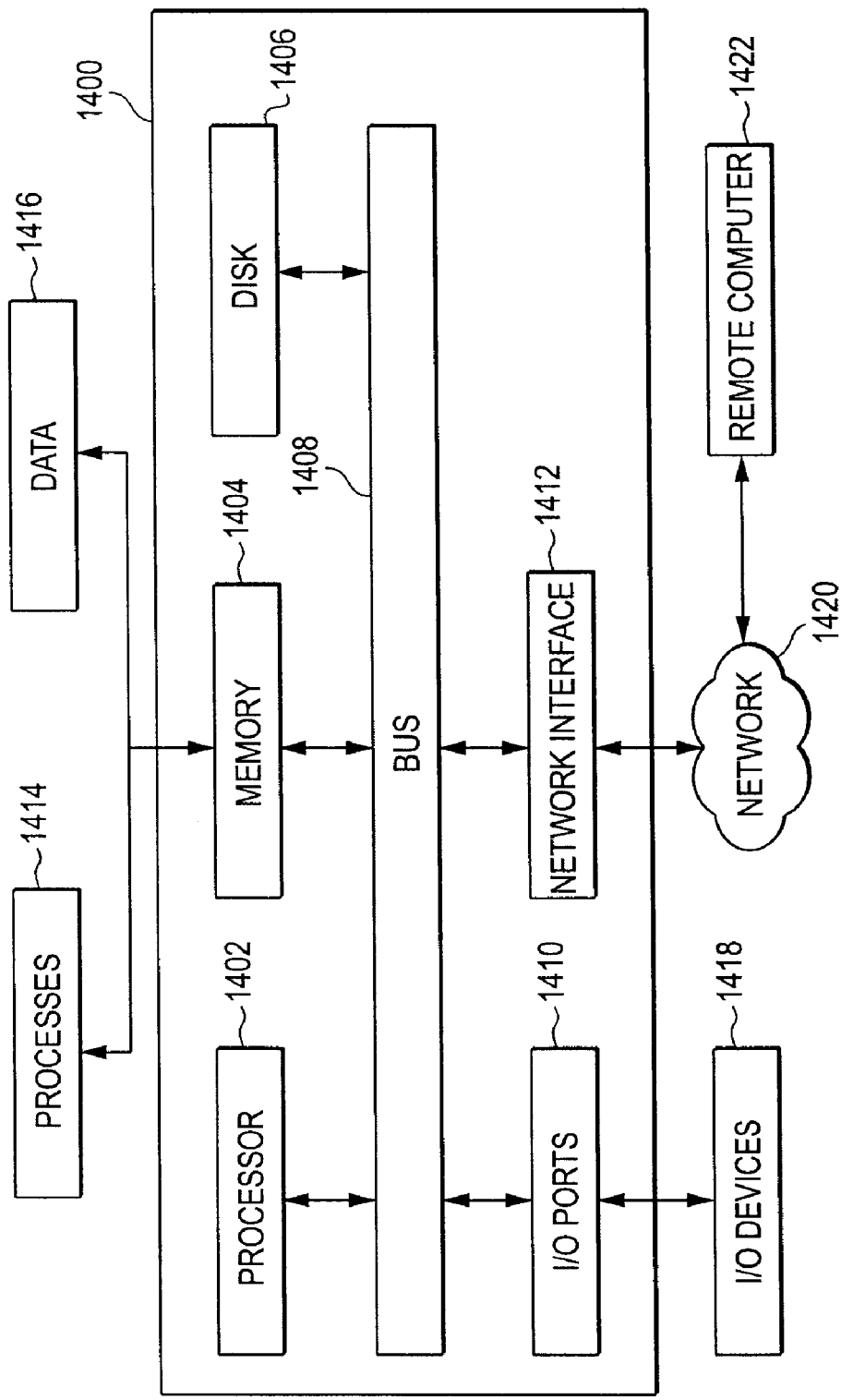
FIG. 14 is a schematic block diagram of an example computing environment.

FIG. 14 illustrates a computer 1400 that includes a processor 1402, a memory 1404, a disk 1406, input/output ports 1410, and a network interface 1412 operably connected by a bus 1408. Executable components of the systems described herein may be located on a computer like computer 1400. Similarly, computer executable methods described herein may be performed on a computer like computer 1400. It is to be appreciated that other computers may also be employed with the systems and methods described herein. The processor 1402 can be a variety of various processors including dual microprocessor and other multi-processor architectures. The memory 1404 can include volatile memory and/or non-volatile memory. The non-volatile memory can include, but is not limited to, read only memory (ROM), programmable read only memory (PROM), electrically programmable read only memory (EPROM), electrically erasable programmable read only memory (EEPROM), and the like. Volatile memory can include, for example, random access memory (RAM), synchronous RAM (SRAM), dynamic RAM (DRAM), synchronous DRAM (SDRAM), double data rate SDRAM (DDR SDRAM), and direct RAM bus RAM (DRRAM). The disk 1406 can include, but is not limited to, devices like a magnetic disk drive, a floppy disk drive, a tape drive, a Zip drive, a flash memory card, and/or a memory stick. Furthermore, the disk 1406 can include optical drives like, compact disk ROM (CD-ROM), a CD recordable drive (CD-R drive), a CD rewriteable drive (CD-RW drive) and/or a digital versatile ROM drive (DVD ROM). The memory 1404 can store processes 1414 and/or data 1416, for example. The disk 1406 and/or memory 1404 can store an operating system that controls and allocates resources of the computer 1400.

The bus 1408 can be a single internal bus interconnect architecture and/or other bus architectures. The bus 1408 can be of a variety of types including, but not limited to, a memory bus or memory controller, a peripheral bus or external bus, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 1400 interacts with input/output devices 1418 via input/output ports 1410. Input/output devices 1418 can include, but are not limited to, a keyboard, a microphone, a pointing and selection device, cameras, video cards, displays, and the like. The input/output ports 1410 can include but are not limited to, serial ports, parallel ports, and USB ports.

The computer 1400 can operate in a network environment and thus is connected to a network 1420 by a network interface 1412. Through the network 1420, the computer 1400 may be logically connected to a remote computer 1422. The network 1420 can include, but is not limited to, local area networks (LAN), wide area networks (WAN), and other networks. The network interface 1412 can connect to local area network technologies including, but not limited to, fiber distributed data interface (FDDI), copper distributed data interface (CDDI), Ethernet/IEEE 802.3, token ring/IEEE 802.5, and the like. Similarly, the network interface 1412 can connect to wide area network technologies including, but not limited to, point to point links, and circuit switching networks like integrated services digital networks (ISDN), packet switching networks, and digital subscriber lines (DSL).

Figure 15:
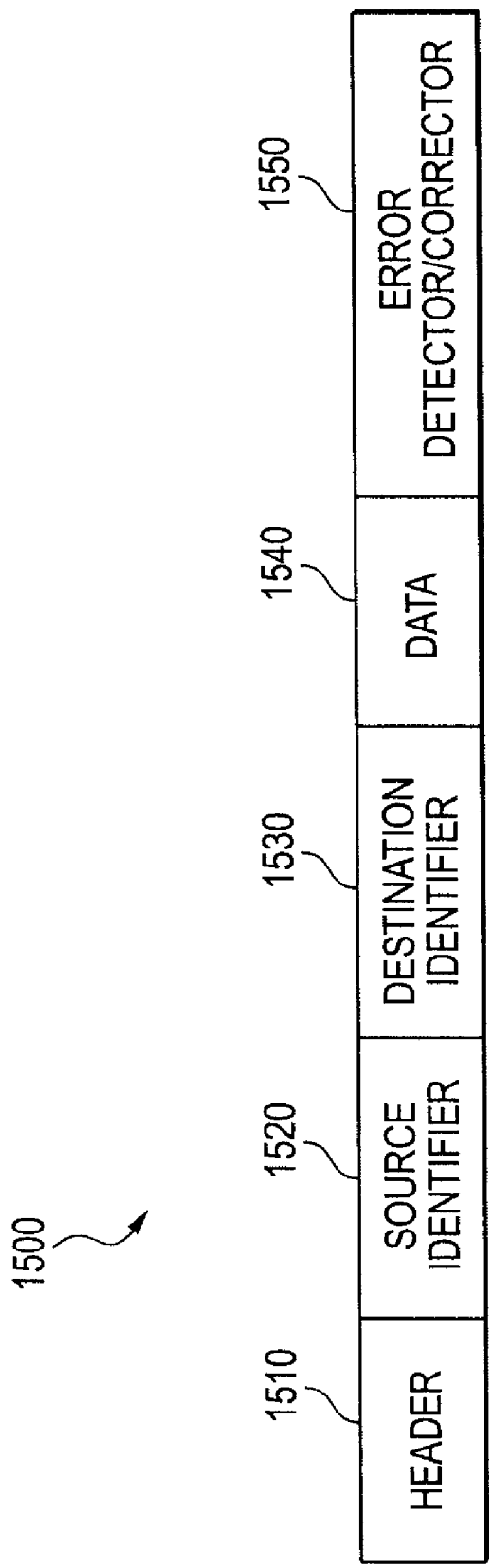
FIG. 15 illustrates a data packet.

Referring now to FIG. 15, information can be transmitted between various computer components associated with controller scaling and parameterization described herein via a data packet 1500. An exemplary data packet 1500 is shown. The data packet 1500 includes a header field 1510 that includes information such as the length and type of packet. A source identifier 1520 follows the header field 1510 and includes, for example, an address of the computer component from which the packet 1500 originated. Following the source identifier 1520, the packet 1500 includes a destination identifier 1530 that holds, for example, an address of the computer component to which the packet 1500 is ultimately destined. Source and destination identifiers can be, for example, globally unique identifiers (guids), URLS (uniform resource locators), path names, and the like. The data field 1540 in the packet 1500 includes various information intended for the receiving computer component. The data packet 1500 ends with an error detecting and/or correcting field 1550 whereby a computer component can determine if it has properly received the packet 1500. While six fields are illustrated in the data packet 1500, it is to be appreciated that a greater and/or lesser number of fields can be present in data packets.

Figure 16:
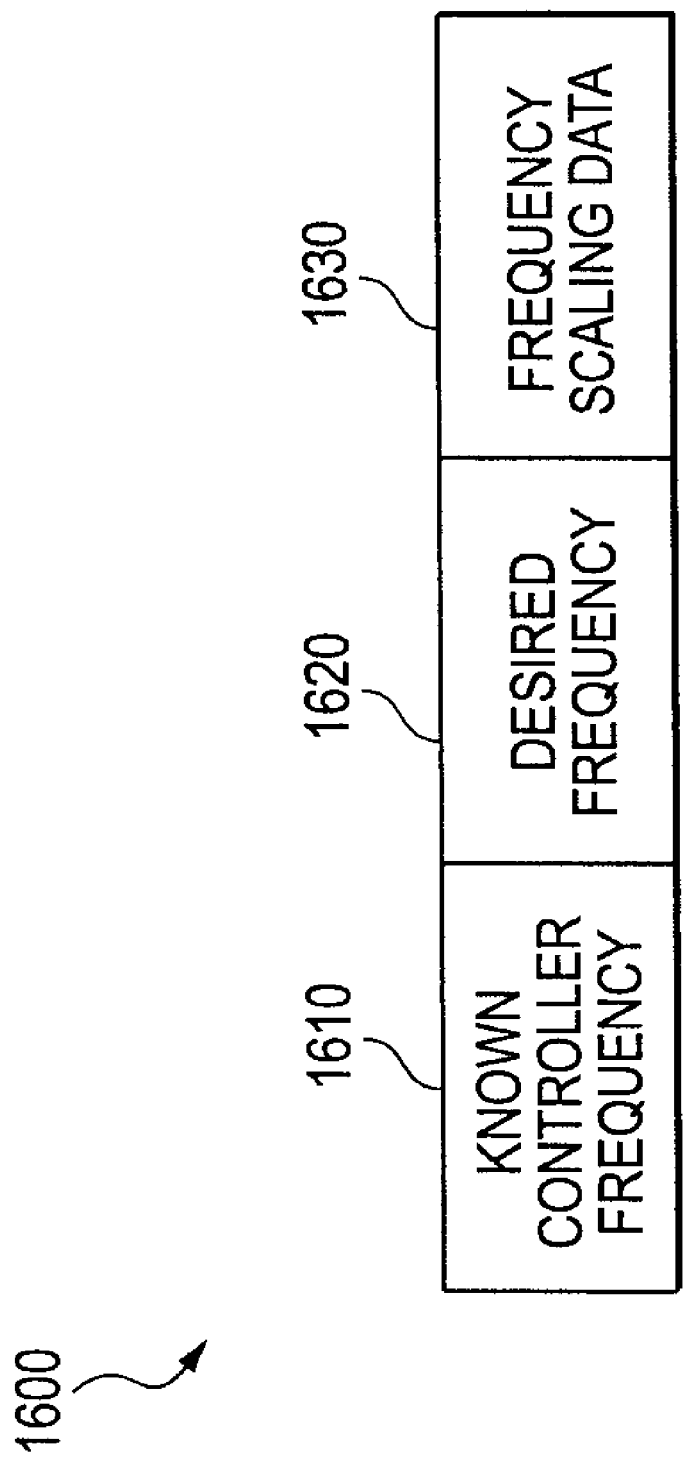
FIG. 16 illustrates sub-fields within a data packet.

FIG. 16 is a schematic illustration of sub-fields 1600 within the data field 1540 (FIG. 15). The sub-fields 1600 discussed are merely exemplary and it is to be appreciated that a greater and/or lesser number of sub-fields could be employed with various types of data germane to controller scaling and parameterization. The sub-fields 1600 include a field 1610 that stores, for example, information concerning the frequency of a known controller and a second field 1620 that stores a desired frequency for a desired controller that will be scaled from the known controller. The sub-fields 1600 may also include a field 1630 that stores a frequency scaling data computed from the known frequency and the desired frequency.

Figure 17:
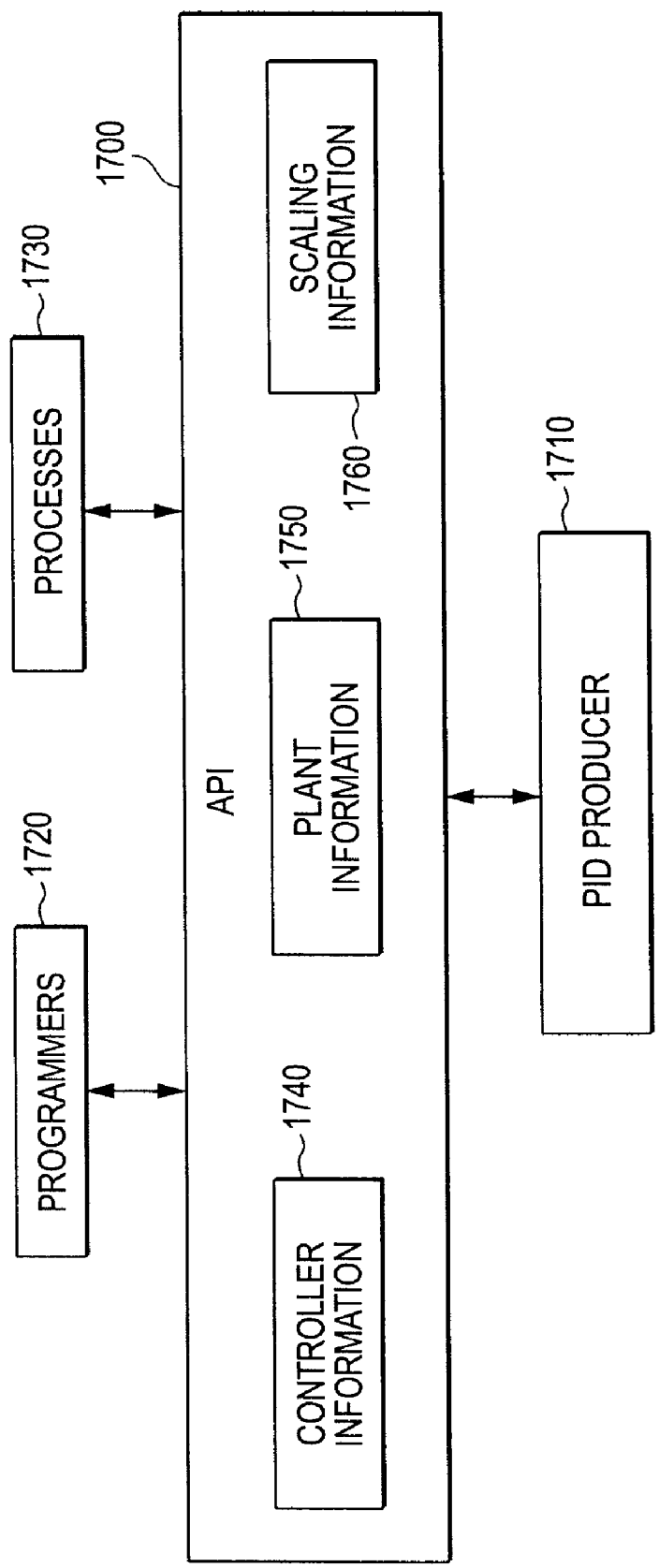
FIG. 17 illustrates an API.

Referring now to FIG. 17, an application programming interface (API) 1700 is illustrated providing access to a system 1710 for controller scaling and/or parameterization. The API 1700 can be employed, for example, by programmers 1720 and/or processes 1730 to gain access to processing performed by the system 1710. For example, a programmer 1720 can write a program to access the system 1710 (e.g., to invoke its operation, to monitor its operation, to access its functionality) where writing a program is facilitated by the presence of the API 1700. Thus, rather than the programmer 1720 having to understand the internals of the system 1710, the programmer's task is simplified by merely having to learn the interface to the system 1710. This facilitates encapsulating the functionality of the system 1710 while exposing that functionality. Similarly, the API 1700 can be employed to provide data values to the system 1710 and/or retrieve data values from the system 1710.

For example, a process 1730 that retrieves plant information from a data store can provide the plant information to the system 1710 and/or the programmers 1720 via the API 1700 by, for example, using a call provided in the API 1700. Thus, in one example of the API 1700, a set of application program interfaces can be stored on a computer-readable medium. The interfaces can be executed by a computer component to gain access to a system for controller scaling and parameterization. Interfaces can include, but are not limited to, a first interface 1740 that facilitates communicating controller information associated with PID production, a second interface 1750 that facilitates communicating plant information associated with PID production, and a third interface 1760 that facilitates communicating frequency scaling information generated from the plant information and the controller information.

LADRC Applied to Web Processing

In another embodiment, a linear Active Disturbance Rejection Control (LADRC) can be employed to provide control on web processing lines. LADRC requires very little information of the plant dynamics, has only two parameters to tune, and has very good disturbance rejection capability. LADRC controllers are inherently robust against plant variations and are effective in a large range of operations.

The mathematical model of a web process line and the existing control methods are illustrated. The accumulator dynamics are used as a test bed in association with an exemplary embodiment. Generally, a web processing line layout includes an entry section, a process section and an exit section. Operations such as wash and quench on the web are performed in the process section. The entry and exit section are responsible for web unwinding and rewinding operations with the help of accumulators located in each sections.

Figure 19:
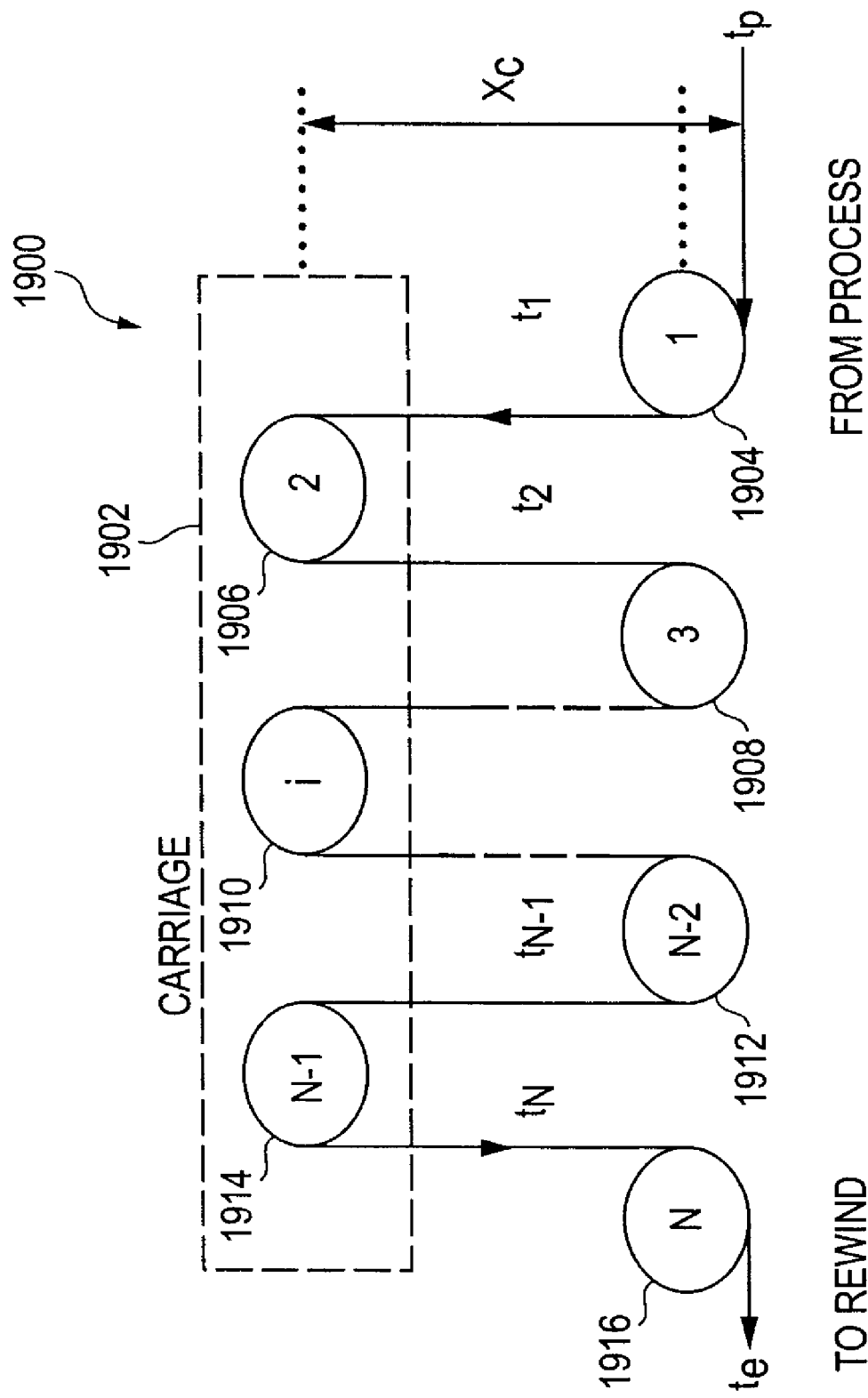
FIG. 19 is block diagram of a web processing system, that includes a carriage and a plurality of web spans, in accordance with an exemplary embodiment.

With reference to FIG. 19, an exemplary exit accumulator 1900 is illustrated. Accumulators are primarily used to allow for rewind or unwind core changes while the process continues at a constant velocity. Dynamics of the accumulator directly affect the behavior of web tension in the entire process line. Tension disturbance propagates along both the upstream and downstream of the accumulator due to the accumulator carriage.

Since there is no difference between the entry accumulator and exit accumulator, except that one is for unwinding and the other is for rewinding operations, the embodiment discussed relates to exit accumulators. However, it is to be understood that the systems and methods described herein can relate to an accumulator in substantially any location within substantially any system (e.g., a web process line, etc.). As shown, the exit accumulator 1900 includes a carriage 1902 and web spans 1904, 1906, 1908, 1910, 1912, 1914, and 1916. It is to be understood that the web spans 1904-1916 are for illustrative purposes only and that the number of web spans can be N, where N is an integer equal to or greater than one.

The dynamics of the carriage tension and the entry/exit rollers are summarized below:

$$\dot{t}_c(t) = \frac{AE}{x_c(t)}\left(v_c(t) + \frac{1}{N}(v_e(t) - v_p(t))\right) \quad (71)$$

$$\dot{x}_c(t) = v_c(t) \quad (72)$$

$$\dot{v}_c(t) = \frac{1}{M_c}(-Nt_c(t) - F_f(v_c(t)) + u_c(t)) - g \quad (73)$$

$$\dot{v}_e(t) = \frac{1}{J}(-B_{fe}v_e(t) + R^2(t_c(t) - t_r) + RK_e u_e(t) + R^2 \delta_e(t)) \quad (74)$$

$$\dot{v}_p(t) = \frac{1}{J}(-B_f v_p(t) + R^2(t_c(t) - t_r) + RK_p u_p(t) + R^2 \delta_p(t)) \quad (75)$$

where $v_c(t)$, $v_e(t)$ and $v_p(t)$ are the carriage velocity, exit-side and process-side web velocity, respectively. $x_c(t)$ is the carriage position, $t_r$ is the desired web tension in the process line and $t_c(t)$ is the average web tension. $u_c(t)$, $u_e(t)$ and $u_p(t)$ are the carriage, exit-side and process-side driven roller control inputs, respectively. The disturbance force, $F_f(t)$, includes friction in the carriage guides, rod seals and other external force on the carriage. $K_e$ and $K_p$ are positive gains. $\delta_e(t)$ and $\delta_p(t)$ are disturbances on the exit side and process line. The constant coefficients in (71) to (75) are described in Table II.

TABLE II

PLANT COEFFICIENTS

| | Values | Descriptions |
|---|---|---|
| $M_c$ | 7310 kg | Mass of the carriage |
| A | $3.27 \times 10^{-4}$ m$^2$ | Cross sectional area of web |
| E | $6.90 \times 10^{10}$ N/m$^2$ | Modulus of elasticity |
| R | 0.1524 m | Radius of exit and process-side roller |
| N | 34 | Number of web spans |
| J | 2.1542 kg-m$^2$ | Moment of inertia |
| $v_f$ | $35.037 \times 10^5$ N-s/m | Viscous friction coefficient |
| $B_f$ | $2.25 \times 10^{-3}$ N-m-s | Bearing friction coefficient |

Existing Web Tension Control Methods

The control design objective is to determine a control law such that the process velocities, $v_c(t)$, $v_e(t)$ and $v_p(t)$, as well as the tension, $t_c(t)$, all closely follow their desired trajectories or values. It is assumed that $v_c(t)$, $v_e(t)$ and $v_p(t)$, are measured and available as feedback variables.

Typically, proportional-integral-derivative (PID) control is the predominant method in industry, and such control is conventionally employed with web applications. In one example, an industry controller can employ a feed-forward method for the position and velocity control of the accumulator carriage, and the feed-forward plus proportional-integral (PI) control method for the exit-side driven roller and process-side driven roller velocity control. The control law can be described as:

$$u_{cl}(t) = M_c\left(\dot{v}_c^d(t) + g + \frac{v_f}{M_c}v_c^d(t) + \frac{N}{M_c}t_c^d\right) \quad (76)$$

$$u_{el}(t) = \frac{J}{RK_e}\left(\frac{B_f}{J}v_e^d(t) + \dot{v}_e^d(t) - k_{pe}e_{ve}(t) - k_{ie}\int e_{ve}(t)d\tau\right) \quad (77)$$

$$u_{pl}(t) = \frac{J}{RK_p}\left(\frac{B_f}{J}v_p^d(t) + \dot{v}_p^d(t) - k_{pp}e_{vp}(t) - k_{ip}\int e_{vp}(t)d\tau\right) \quad (78)$$

where $U_{cl}(t)$, $u_{el}(t)$ and $u_{pl}(t)$ are the carriage, exit-side and process-side driven roller control inputs. $v_c^d$, $v_e^d$ and $v_p^d$ are the desired velocity of carriage exit-side and process-side rollers, respectively; and $\dot{v}_c^d$, $\dot{v}_e^d$ and $\dot{v}_p^d$ their derivatives. $k_{pe}$ and $k_{pp}$ are proportional gains and $k_{ie}$, $k_{ip}$ are integral gains.

An alternative control method based on Lyapunov method can also be employed:

$$u_c(t) = M_c\left(\dot{v}_c^d(t) + g + \frac{v_f}{M_c}v_c^d(t) + \right. \quad (79)$$
$$\left. \frac{N}{M_c}t_c^d - \frac{AE}{x_c(t)}\hat{e}_{tc}(t) - e_{xc}(t) + \frac{N}{M_c}\hat{e}_{tc}(t) - \gamma_3 e_{ve}(t)\right)$$

$$u_e(t) = \frac{J}{RK_e} \quad (80)$$
$$\left(\frac{B_f}{J}v_e^d(t) + \dot{v}_e^d(t) - \gamma_e e_{ve}(t) - \left(\frac{AE}{Nx_c(t)} - \frac{R^2}{J}\right)\hat{e}_{tc}(t) - \frac{R^2}{J}\delta_e sgn(e_{ve})\right)$$

$$u_p(t) = \frac{J}{RK_e}\left(\frac{B_f}{J}v_p^d(t) + \dot{v}_p^d(t) - \right. \quad (81)$$
$$\left. \gamma_p e_{vp}(t) - \left(\frac{AE}{Nx_c(t)} - \frac{R^2}{J}\right)\hat{e}_{tc}(t) - \frac{R^2}{J}\delta_p sgn(e_{vp})\right)$$

where $\gamma_3$, $\gamma_e$, and $\gamma_p$ are the controller gains to be selected.

The following tension observer can be used to estimate $t_c(t)$:

$$\dot{\hat{t}}_c(t) = \left(\frac{2AE}{x_c(t)} - \frac{N}{M_c}\right)e_{vc}(t) + \left(\frac{2AE}{Nx_c(t)} - \frac{R^2}{J}\right)(e_{ve}(t) - e_{vp}(t)) \quad (82)$$

$$\hat{t}_c(0) = \hat{t}_{c0}$$

Here, $$e_{tc} = t_c(t) - t_c^d, \hat{e}_{tc}(t) = \hat{t}_c(t) - t_c^d, \tilde{e}_{tc}(t) = t_c(t) - \hat{t}_c(t)$$

$$e_{vc}(t) = v_c(t) - v_c^d(t), e_{xc}(t) = x_c(t) - x_c^d(t)$$

$$e_{vp}(t) = v_p(t) - v_p^d(t), e_{ve}(t) = v_e(t) - v_e^d(t).$$

Since the velocities are generally controlled in open-loop by a conventional PI feed forward and control method, the industrial controller needs to retune the controller when the operating conditions are changed and external disturbance appears. In addition, the industrial controller has a poor performance in the presence of disturbance.

The Lyapunov based controller (LBC) improves the industrial controller by adding auxiliary error feedback terms to get better performance and disturbance rejection. However, the LBC has its own shortcomings since it is designed specifically to deal with disturbances, which are introduced in the model. Thus, when uncertainties appear in a real-world application, the LBC may require re-design of the controller.

In view of the conventional systems and methods, the exemplary embodiment was developed in the framework of an alternative control design paradigm, where the internal dynamics and external disturbances are estimated and compensated in real time. Therefore, it is inherently robust against plant variations and effective in disturbances and uncertainties in real application. In tension regulation, both open-loop and closed-loop options will be explored. In the open-loop case, the tension is not measured but indirectly controlled according to Equation (71) by manipulating the velocity variables. In the closed-loop case, a tension observer is employed in the tension feedback control.

A New Solution to Velocity and Tension Regulation

Figure 20:
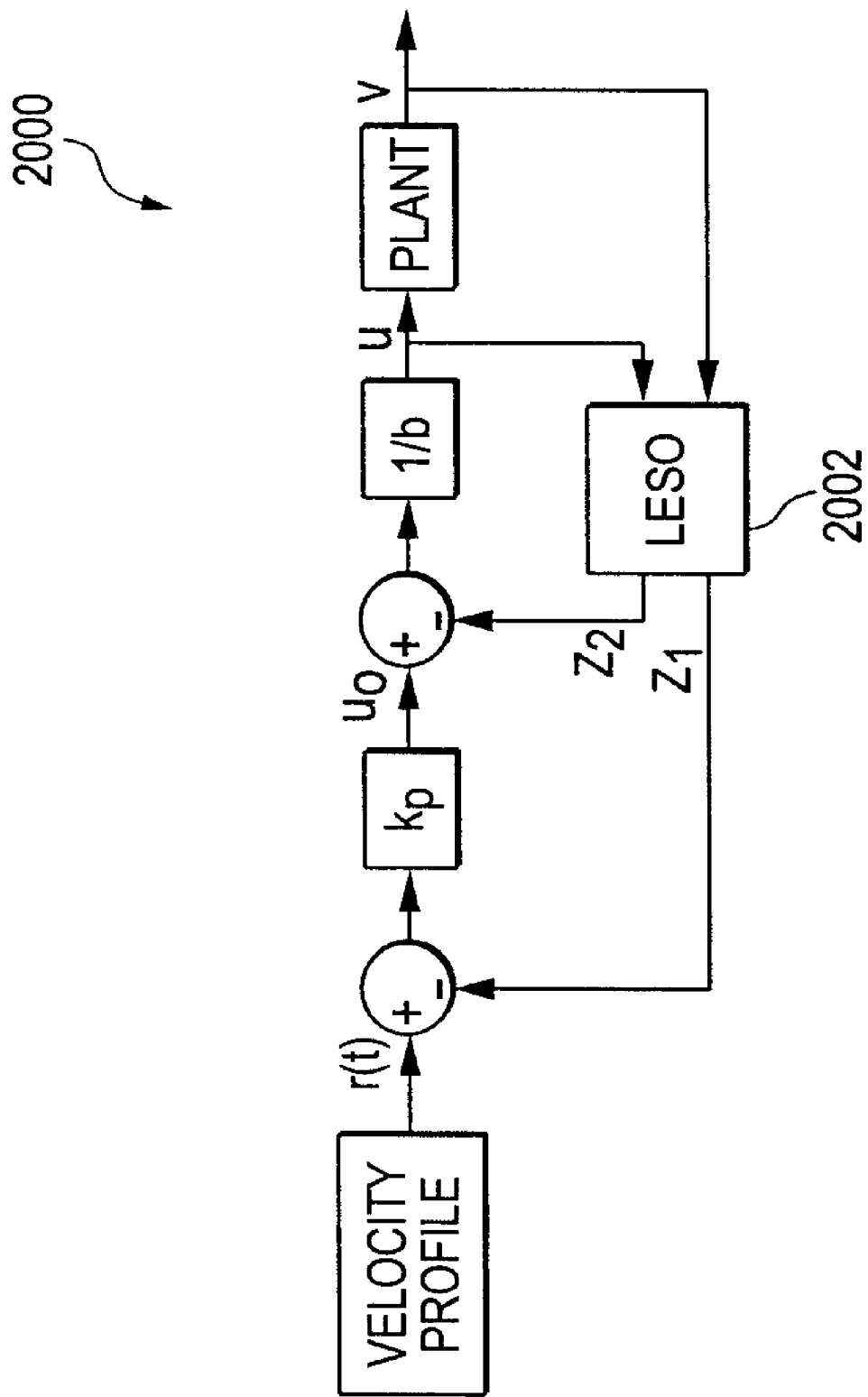
FIG. 20 is a linear active disturbance rejection control based velocity control system, in accordance with an exemplary embodiment.
Figure 21:
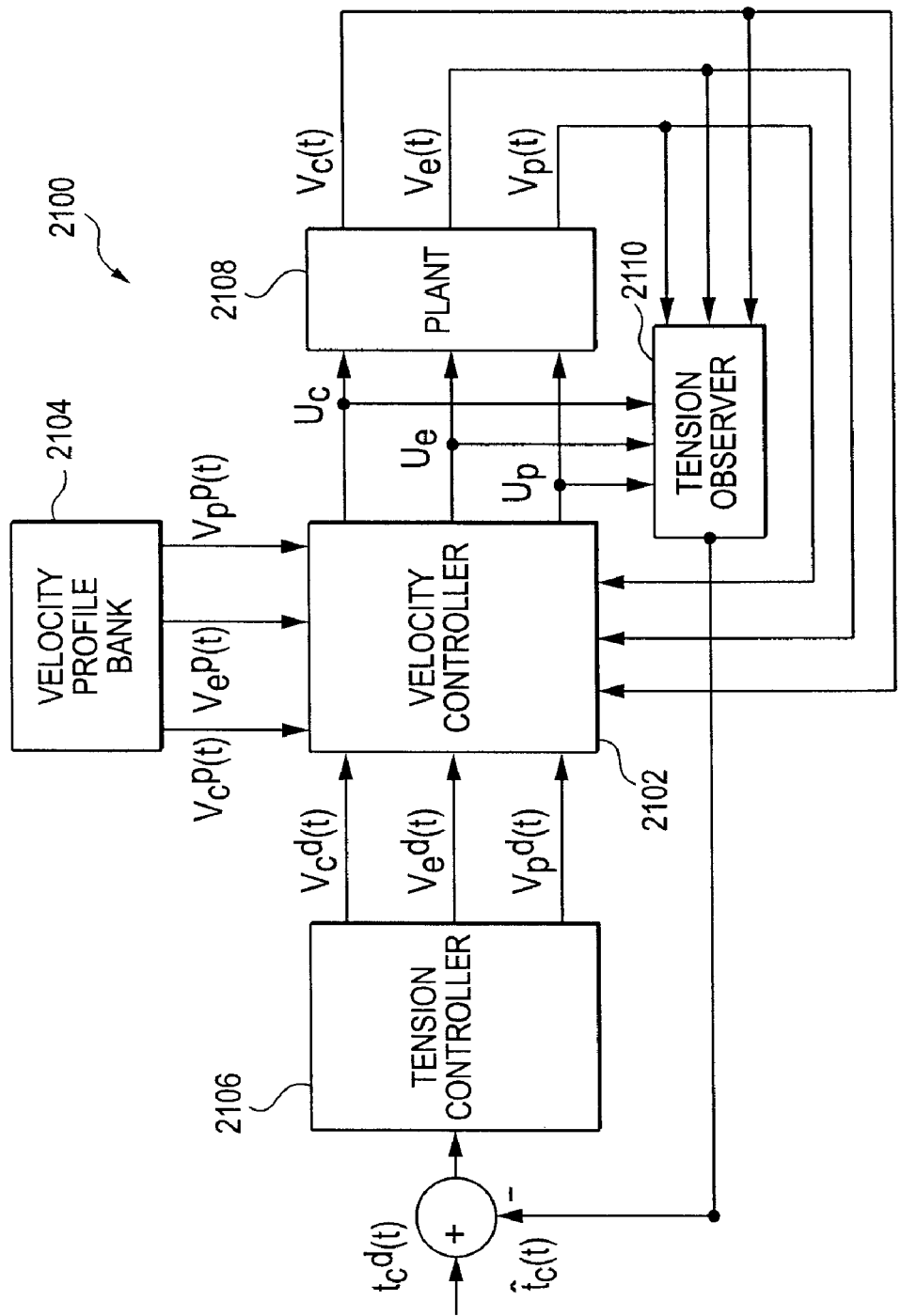
FIG. 21 is an observer based tension control system, in accordance with an exemplary embodiment.

In developing new solutions for this difficult industry problem, performance and simplicity are stressed. That is, the new controller must have a much better performance than the existing ones, and it should also be simple to design, implement, and tune. In order to provide a comprehensive control structure, velocity and tension are both addressed. The three velocity loops are very similar in nature and finding a better solution would be a good first step. The tension problem is crucial because of its importance and its nonlinear dynamics. Based on the cost and performance considerations, two solutions are discussed herein: 1) if the tension model in (1) is reliable, it can be well controlled with fast and accurate velocity loops; 2) industry users are quite willing to install tension sensors for direct tension feedback control in return for better tension performance. FIG. 20 illustrates an exemplary velocity control system and FIG. 21 illustrates a tension control system.

FIG. 20 illustrates a LADRC-based velocity control system 2000 that employs a linear extended state observer (LESO) 2002. An extended state observer (ESO) is a unique method to solve the fault estimation, diagnosis and monitoring problem for undesired changes in dynamic systems. As an overview, ESO uses minimal plant information while estimating the rest of the unknown dynamics and unknown faults. This requires an observer that uses minimal plant information while still being able to estimate the essential information. In one example, for fault problems, the important information is the faults and disturbances. With minimal information, the ESO is designed to estimate these unknown dynamic variations that compose the faults. As implemented with fault diagnosis, these estimated dynamics are analyzed for changes that represent the fault or deterioration in health. Accordingly, the more that is known about a relationship between the dynamics and a specific fault the better the fault can be isolated. The basic idea for fault remediation is that estimated fault information is employed to cancel the effect of the faults by adjusting the control to reject faults.

The ESO system can be employed in various forms of dynamic systems. These include but are not limited to electrical, mechanical, and chemical dynamic systems often concerned with control problems. The most advantage would be achieved if this solution closes the loop of the system to accommodate the estimated faults. However, without dynamically controlling the system this method would still provide a benefit for health status and fault detection without automatically attempting to fix the fault or optimize the health. In one example, ESO is employed in web processing systems, as discussed in detail below. Other applications can include power management and distribution.

The ESO offers a unique position between common methods. There are generally two ways that the health and fault diagnosis problem is approached. On one side of the spectrum the approach is model dependent analytical redundancy. The other side of the spectrum is the model-less approaches from fuzzy logic, neural networks and statistical component analysis. The ADRC framework offers a unique position between these two extremes without entering into hybrid designs. The ESO requires minimal plant information while estimating the rest of the unknown dynamics and unknown faults. Furthermore, built into the solution is a novel scheme for automatic closed loop fault accommodation.

Although a single velocity loop is illustrated, it is to be appreciated that the control system 2000 can be applied separately for all three velocity loops $v_c(t)$, $v_e(t)$ and $v_p(t)$. Velocity regulation in a process line is one of the most common control problems in the manufacturing industry. Since most processes are well-behaved, a PID controller is generally sufficient. Other techniques, such as pole-placement and loop shaping, could potentially improve the performance over PID but require mathematical models of the process. They are also more difficult to tune once they are implemented. An alternative method is described below:

The velocity equations (73)-(75) can be rewritten as $$\dot{v}_c(t) = f_c(t) + b_c u_c(t) \quad (83)$$

$$\dot{v}_e(t) = f_e(t) + b_e u_e(t) \quad (84)$$

$$\dot{v}_p(t) = f_p(t) + b_p u_p(t) \quad (85)$$

where $$f_c(t) = \frac{1}{M_c}(-Nt_c(t) - F_f(t) - M_c g) \quad (86)$$

$$f_e(t) = \frac{1}{J}(-B_f v_e(t) + R^2(t_r - t_c(t)) + R^2 \delta_e(t)) \quad (87)$$

$$f_p(t) = \frac{1}{J}(-B_f v_p(t) + R^2(t_c(t) - t_r) + R^2 \delta_p(t)) \quad (88)$$

The plants in (84)-(86) are all of the form $$\dot{v}(t) = f(t) + bu(t) \quad (89)$$

where v(t) is the measure to be controlled, u(t) is the control signal, and the value of b is known, approximately. $f(t)$ represents the combined effects of internal dynamics and external disturbance.

The key to the control design is to compensate for $f(t)$, and such compensation is simplified if its value can be determined at any given time. To make such a determination, an extended state observer can be applied.

Writing the plant in (89) in a state space form $$\begin{cases} \dot{x}_1 = x_2 + bu \\ \dot{x}_2 = h \\ y = x_1 \end{cases} \quad (90)$$

Let $x_1 = v$, with $x_2 = f$ added as an augmented state, and $h = \dot{f}$ as unknown disturbance.

The state space model is $$\begin{cases} \dot{x} = Az + Bu + Eh \\ y = Cx \end{cases} \quad (91)$$

where $$A = \begin{bmatrix} 0 & 1 \\ 0 & 0 \end{bmatrix}, B = \begin{bmatrix} b \\ 0 \end{bmatrix}, C = [1\,0]$$

Now $f$ can be estimated using a state observer based on the state space model

Based on (91), a state observer, can be constructed as $$\begin{cases} \dot{z} = Az + Bu + L(y - \hat{y}) \\ \hat{y} = Cz \end{cases} \quad (92)$$

where $z \to x$. If $f$ is known or partially known, it can be used in the observer by taking $h = \dot{f}$ to improve estimation accuracy.

$$\begin{cases} \dot{z} = Az + Bu + L(y - \hat{y}) + Eh \\ \hat{y}(t) = Cz \end{cases} \quad (92a)$$

The observer reduced to the following sets of state equations is the LESO.

$$\begin{cases} \dot{z}_1 = z_2 + L_1(y - z_1) + bu \\ \dot{z}_2 = L_2(y - z_1) \end{cases} \quad (93)$$

If partial information is used, the observer is then represented by $$\begin{cases} \dot{z}_1 = z_2 + L(y - z_1) + bu \\ \dot{z}_2 = L(y - z_1) + h \end{cases} \quad (93a)$$

By setting $\lambda(s) = |sI - (A - LC)| s^2 + L_1 s + L_2$ equal to the desired error dynamics, $(s+\omega)^2$, the observer gains are solved as functions of a single tuning parameter, $\omega_0$.

As known, $L_1 = 2\omega_o$, $L_2 = \omega_o^2$ can be parameterized and assign eigenvalues of the observer to $\omega_o$. With a functioning LESO, which results in $z_1 \to v$ and $z_2 \to f$, the control law will be designed as $$u = (-z_2 + u_0)/b \quad (94)$$

This reduces the plant to an approximate integral plant $$\dot{v}(t) = (f(t) - z_2(t)) + u_0(t) \approx u_0(t) \quad (95)$$

which can be easily controlled by $$u_0(t) = k_p(r(t) - z_1(t)) \quad (96)$$

For the given set point r, an approximate closed-loop transfer function is created without the addition of zeros from the controller.

$$\frac{y(s)}{r(s)} = \frac{k_p}{s + k_p} \quad (97)$$

By setting equal to the desired transfer function, $\omega_c/(s+\omega_c)$, the controller gains are solved as functions of one tuning parameter, $\omega_c$.

Set $k_p = \omega_c$, where $\omega_c$ is the desired closed-loop bandwidth.

In this example, to show how z converges to $f$, it is calculated from (89) that $f = \dot{v} - bu$. After solving (92), (93) and (95) for $Z_2$ by superposition, the result is a filter version of $f$.

$$z_2 = (sv(s) - bu(s))\frac{\omega_0^2}{(s+\omega_0)^2} \quad (98)$$

The LESO can be further simplified by substituting (93) into (92) to remove an algebraic loop and decouple $Z_2$, allowing ADRC to be presented in PID form $$u = k_p(r - z_1) - L_2\int(y - z_1)/b \quad (99)$$

where v(t) is the measure to be controlled, u(t) is the control signal, and the value of b is known, approximately. $f(t)$ represents the combined effects of internal dynamics and external disturbance.

The disturbance observer-based PD controller can achieve zero steady state error without using an integrator.

The unknown external disturbance and the internal uncertain dynamics are combined and treated as a generalized disturbance.

By augmenting the observer an extra state, which can be actively estimated and canceled out the disturbance, thereby achieving active disturbance rejection.

The PD controller can be replaced with other advanced controller if necessary. The tuning parameters are $\omega_o$ and $\omega_c$.

The only parameter needed is the approximate value of b in (89).

Both open-loop and closed-loop solutions to tension regulation are discussed below. The open-loop system is simple and economic; whereas the closed-loop system is more precise but requires an additional sensing device.

Open-Loop Tension Regulation

High quality velocity regulation can allow tension in a web based control system to be controlled via open-loop, if the model of the tension dynamics (71) is accurate. From (71), the tension can be computed as $$t_c(t) = t_c(0) + \int_0^t \frac{AE}{x_c(t)}\left(v_c(t) + \frac{1}{N}(v_e(t) - v_p(t))\right)dt \quad (100)$$

where $t_c(0)$ is the initial value of tension. For the open-loop control, let the desired velocities; $v_c^d$, $v_e^d$ and $v_p^d$, be carefully chosen so that (96) yields $$t_c(t) = t_c^d, t \geq t_1 \quad (101)$$

For a given initial condition $t_c(0)$ and a given time constraint, $t_1$. Then, if all three velocity loops are well-behaved, the actual tension should be close to the desired value. An example of this method is given in simulation below. Note that, for this purpose, the desired velocities must satisfy the following condition $$v_c^d(t) = -\frac{v_e^d(t) - v_p^d(t)}{N}, t \geq t_1 \quad (102)$$

The above approach is a low cost, open-loop solution. As the operating condition changes, the tension dynamics (1) could vary, causing variations in tension. If the tension is not measured, such variations may go unnoticed until visible effects on the product quality appear. To maintain accurate tension control, industry users usually are willing to install a tension sensor, which regulates the tension in a feedback loop, as discussed below.

Observer Based Closed Loop Tension Regulation

FIG. 21 illustrates an observer-based closed-loop tension control system 2100, wherein the system employs block diagrams for the velocity and tension control loops. In this manner, the tension and velocity can be controlled at relatively the same time to provide real time control of a web processing line. A velocity controller 2102 acts as a PID controller and receives information from all three velocity loops, $v_c(t)$, $v_e(t)$ and $v_p(t)$, which represent the carriage, exit-side and process-side driven roller velocities respectively. The velocity controller 2102 receives proportional velocity data from a velocity profile bank 2104, derivative velocity data from a tension controller 2106, and integral velocity data from a plant 2108. All three inputs allow the velocity controller 2102 to maintain desired target values for the control signal inputs ($u_c(t)$, $u_e(t)$ and $u_p(t)$) into the plant 2108 for each of the carriage, exit-side and process-side driven rollers.

In one example, a tension meter, such as a load cell can be used for closed-loop tension control. Conventionally one or more physical instruments are required to sense the tension, which require additional machine space, and need adjustment. Therefore, implementing tension control without a tension sensor can provide an economic benefit. Accordingly, a tension observer 2110 is employed to act as a surrogate for a hardware tension sensor to provide closed-loop tension control. In one embodiment, the tension observer 2110 receives roller control input values ($u_c(t)$, $u_e(t)$ and $u_p(t)$) from the velocity controller 2102 and roller velocity values ($v_c(t)$, $v_e(t)$ and $v_p(t)$) from the plant 2108. The output from the tension observer 2110, $\hat{t}_c(t)$, is coupled with the derivative value of the average web tension, $t_c^d(t)$, wherein both values are input into the tension controller 2106. The computation of the output value of the tension observer 2110 is given below.

Recall in (73)-(75), tension is coupled in velocity loops ($v_c(t)$, $v_e(t)$ and $v_p(t)$), and an Active Disturbance Rejection Control (ADRC) controller can be used to decouple the tension from the velocity loops. Actually, tension is part of the $f(t)$ component, which is estimated and canceled out in LESO, as illustrated in FIG. 20.

Considering $f(t)$ in three velocity loops, and if the other parts of $f(t)$ are known, tension can be estimated through equations (86)-(89) and presented as:

$$\hat{t}_{cc}(t) = -\frac{M_c}{N}\left(f_c(t) + \frac{1}{M_c}(-F_f(t) - M_c g)\right) \quad (103)$$

$$\hat{t}_{ce}(t) = \frac{1}{R^2}(-Jf_e(t) - B_f v_e(t) + R^2 t_r + R^2 \delta_e(t)) \quad (104)$$

$$\hat{t}_{cp}(t) = \frac{1}{R^2}(Jf_p(t) + B_f v_p(t) + R^2 t_r + R^2 \delta_p(t)) \quad (105)$$

With a proper parameter setting, the LESO 2002 can guarantee that $z_1 \to v$ and $z_2 \to f$. That is to say, from the LESO 2002, $f_c(t), f_e(t)$ and $f_p(t)$ can be obtained. Since the other components $f(t)$ are all known in this problem, tension estimation from three velocity loops can be calculated based on (103)-(105).

Finally, the tension observer output value is obtained from the average of three tension estimations.

$$\hat{t}_c(t) = \frac{1}{3}(\hat{t}_{cc}(t) + \hat{t}_{ce}(t) + \hat{t}_{cp}(t)) \quad (106)$$

Web Processing Simulation and Comparison

In this section, four types of control systems are compared via simulations, including: 1) the commonly used industrial controller (IC) shown in equations (76) to (78); 2) the LBC in equations (79) to (82); 3) the three ADRC controllers, described in (91)-(94), for the velocity loops with tension regulated in open-loop (LADRC1); and 4) the same LADRC velocity controllers with an additional LADRC controller for the tension feedback loop (LADRC2).

Note that in IC and LADRC1, the tension is controlled open-loop, while LADRC2 closes the tension loop with a tension feedback. LBC relies on the tension estimator for its closed-loop tension control.

The comparison of these controllers is carried out in the presence of disturbances. In addition, to demonstrate the feasibility of the proposed methods, they are implemented in discrete-time form with a sampling period of 10 ms.

Figure 22:
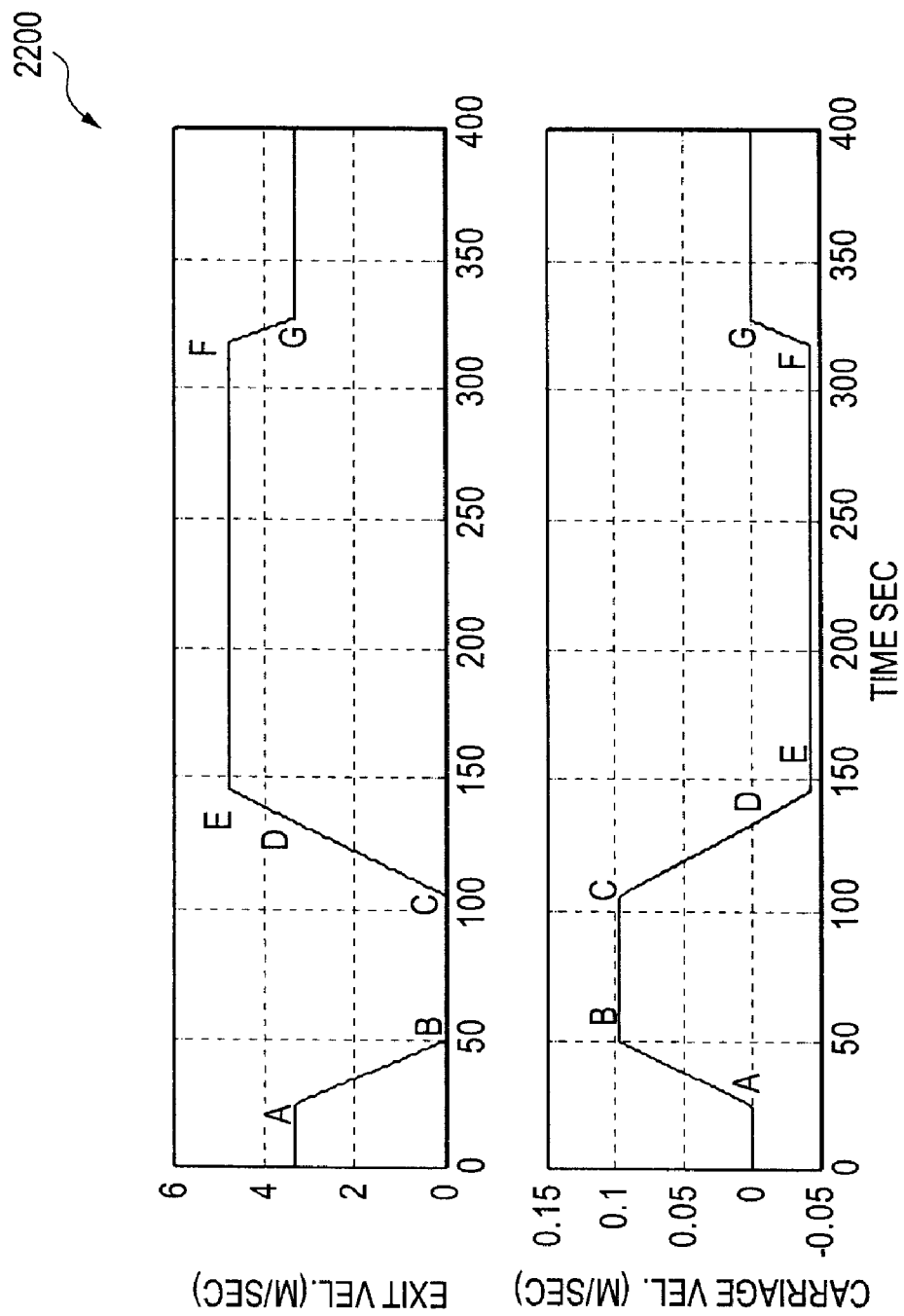
FIG. 22 illustrates a desired exit speed in association with a carriage speed on a web processing line, in accordance with an exemplary embodiment.

Three control schemes are investigated by conducting simulations on an industrial continuous web process line. The desired tension in the web span is 5180N. The desired process speed is 650 feet per minute (fpm). A typical scenario of the exit speed and the carriage speed during a rewind roll change is depicted in FIG. 22. The objective of control design is to make the carriage, exit velocity, and process velocities closely track their desired trajectories, while maintaining the desired average web tension level.

Figure 23:
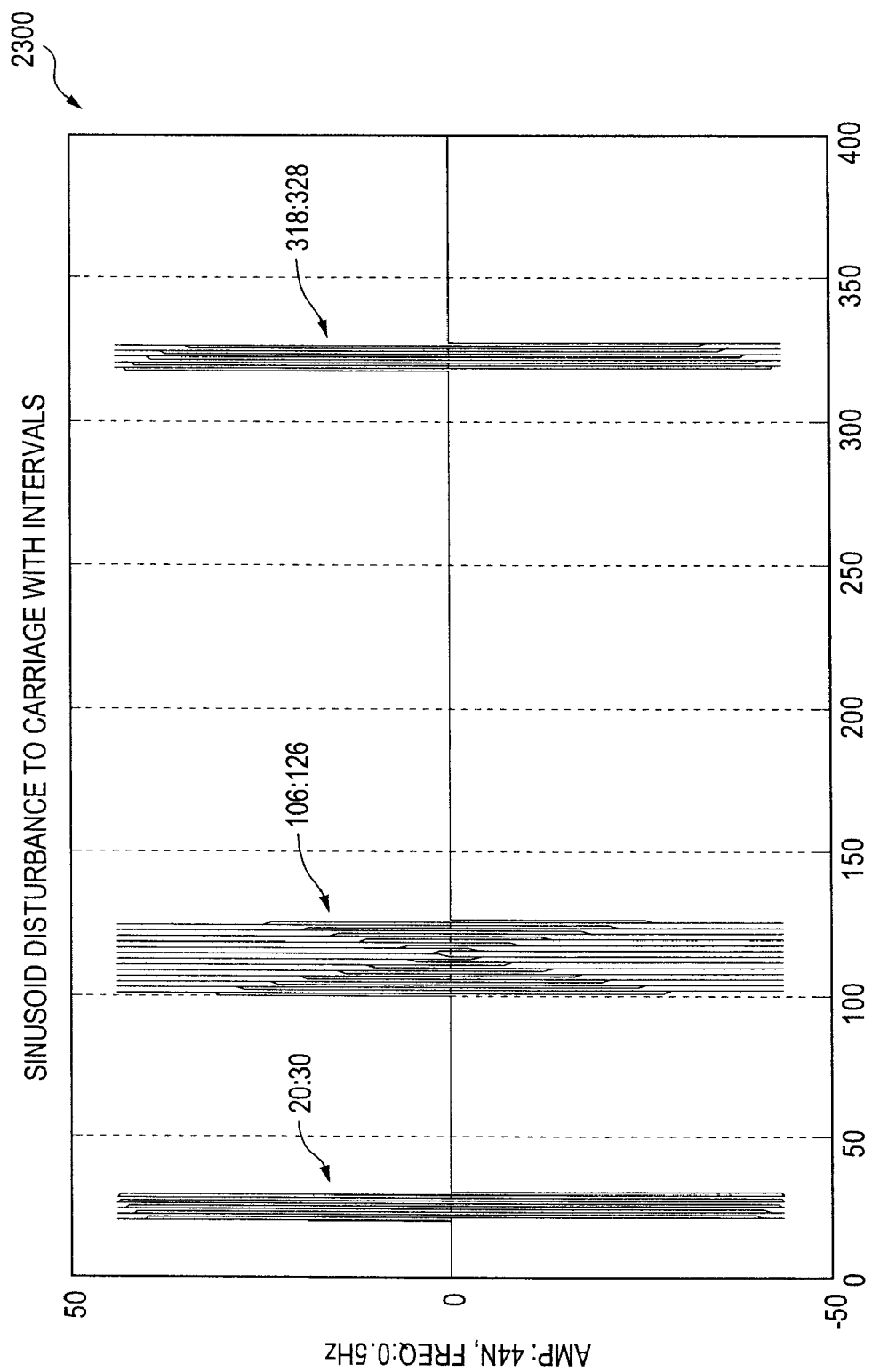
FIG. 23 shows a simulated disturbance introduced in a carriage of a web processing system, in accordance with an exemplary embodiment.
Figure 24:
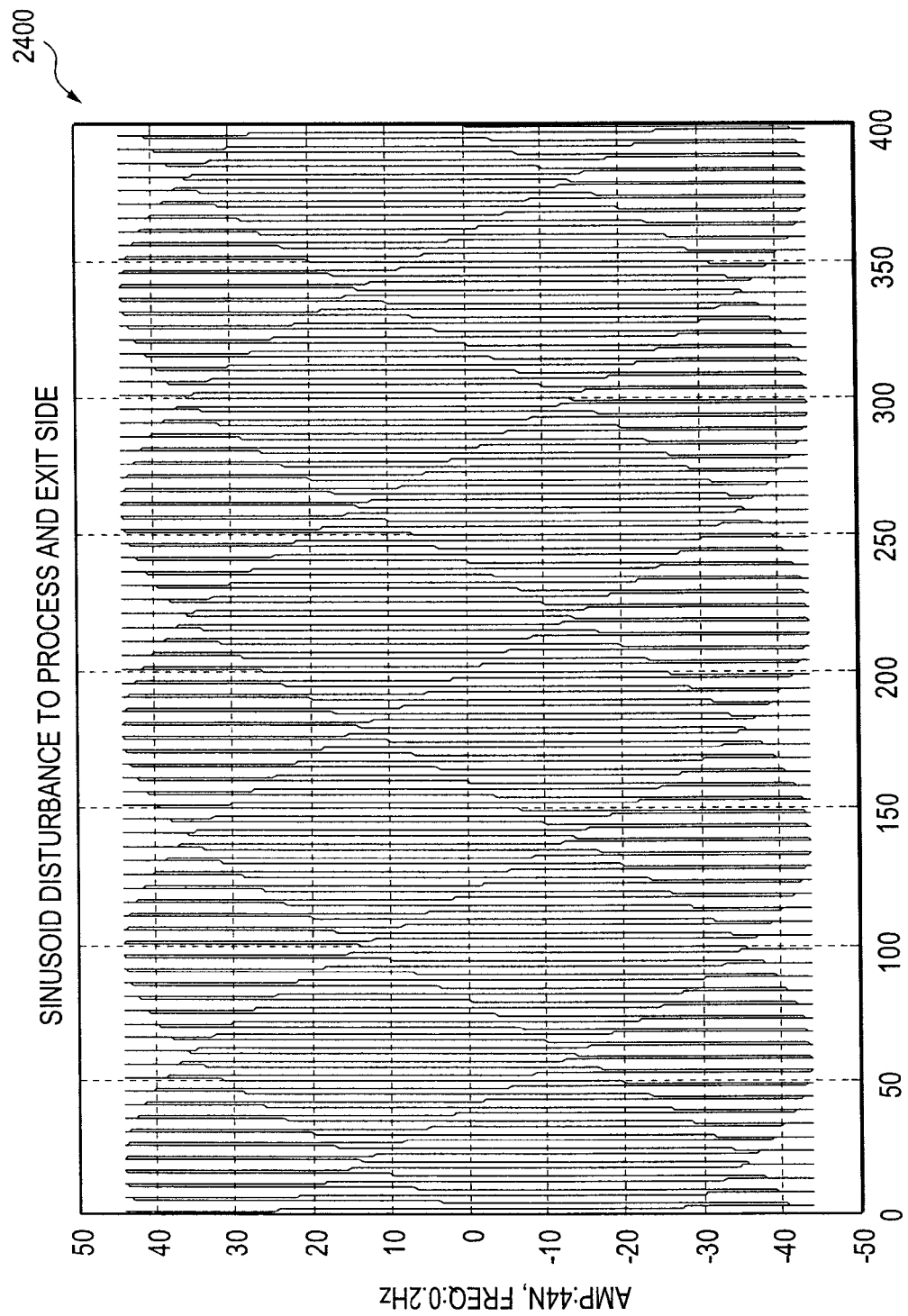
FIG. 24 shows a simulated disturbance introduced in a process and exit-side of a web processing system, in accordance with an exemplary embodiment.

To make the simulation results realistic, three sinusoidal disturbances are injected. $F_f(t)$ in (73) is a sinusoidal disturbance with the frequency of 0.5 Hz and amplitude of 44N, and is applied only in three short specific time intervals: 20:30 seconds, 106:126 seconds, and 318:328 seconds as shown in FIG. 23. $\delta_e(t)$ and $\delta_p(t)$, in equation (4) and (5), are also sinusoidal functions with the frequency of 0.2 Hz and the amplitude of 44N, and is applied throughout the simulation, as shown in FIG. 24.

Following the parameterization and design procedure described above, $\omega_c$ and $\omega_o$ are the two parameters need to be tuned. As known in the art, the relationship between $\omega_c$ and $\omega_o$ is $\omega_o \approx 3 \square 5 \omega_c$. So we only have one parameter to tune, which is $\omega_c$.

The other important parameter needed is the approximate value of b in (89). For this problem, the best estimate of b in (83), (84) and (85) is as follows:

$$b_c = \frac{1}{M_c} = 1.368 \times 10^{-4}, b_e = \frac{R}{J}K_e = 0.7057,$$

$$b_p = \frac{R}{J}K_p = 0.7057, b_t = A*E/5 = 3.76 \times 10^6$$

Figure 29:
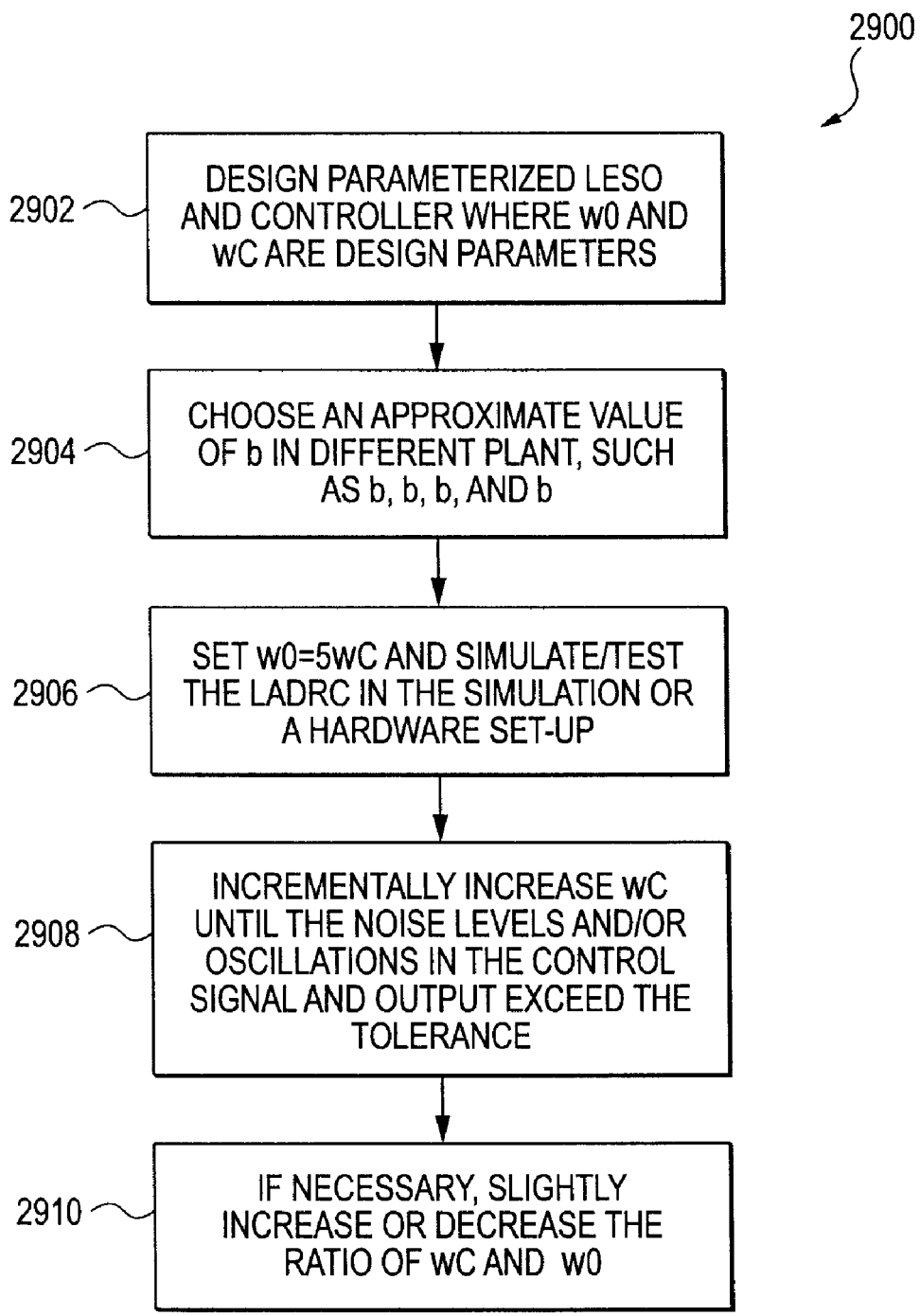
FIG. 29 illustrates a methodology for design and optimization of a cohesive LADRC, in accordance with an exemplary embodiment.

FIG. 29 illustrates a methodology 2900 for design and optimization of a cohesive LADRC. At 2902, a parameterized LESO controller is designed where $\omega_c$ and $\omega_o$ are design parameters. At 2904, an approximate value of b in different plant is chosen. For example, $b_c$, $b_e$, $b_p$, and $b_t$, which represents disparate known values in disparate locations within a web processing system. At 2906, $\omega_o$ is set to equal $5\omega_c$. The LADRC is simulated and/or tested. In one example, a simulator or a hardware set-up is employed. At 2908, the value of $\omega_c$ is incrementally increased until the noise levels and/or oscillations in the control signal and output exceed a desired tolerance. At 2910, the ratio of $\omega_c$ and $\omega_o$ is modified until a desired behavior is observed.

The parameters of the four controllers are shown in Table III.

TABLE III

VALUES OF THE GAINS USED IN THE SIMULATION

| Method | Velocity Loops | Tension Loop |
|---|---|---|
| IC | $k_{ie} = 0.1\ k_{ip} = 0.1$ | |
| | $k_{pe} = 100,\ k_{pp} = 100$ | |
| LBC | $\gamma_3 = 100,\ \gamma_e = 100,\ \gamma_p = 100$ | |
| LADRC1 | $\omega_{cc} = 15,\ \omega_{ce} = 40,\ \omega_{cp} = 40,$ | |
| LADRC2 | Same as ADRC1 | $\omega_{ct} = 12$ |

Here $k_{pe}$, $k_{pp}$, $k_{ie}$ and $k_{ip}$ are the gains in (76)-(78) for the IC. $\gamma_3$, $\gamma_e$, and $\gamma_p$ are the gains in (79)-(81) for the LBC. $b_c$, $b_e$, and $b_p$ are specific values of b in (92) for the carriage, exit, and process velocity loops, respectively. Similarly, $\omega_{oc}$, $\omega_{oe}$ and $\omega_{op}$ are the observer gains in equation (91); and $\omega_{cc}$, $\omega_{ce}$ and $\omega_{cp}$ are the controller gains ($k_p$) in equation (94). $b_t$, $\omega_{ct}$, and coot are the corresponding ADRC parameters for the tension plant in (109).

Figure 25:
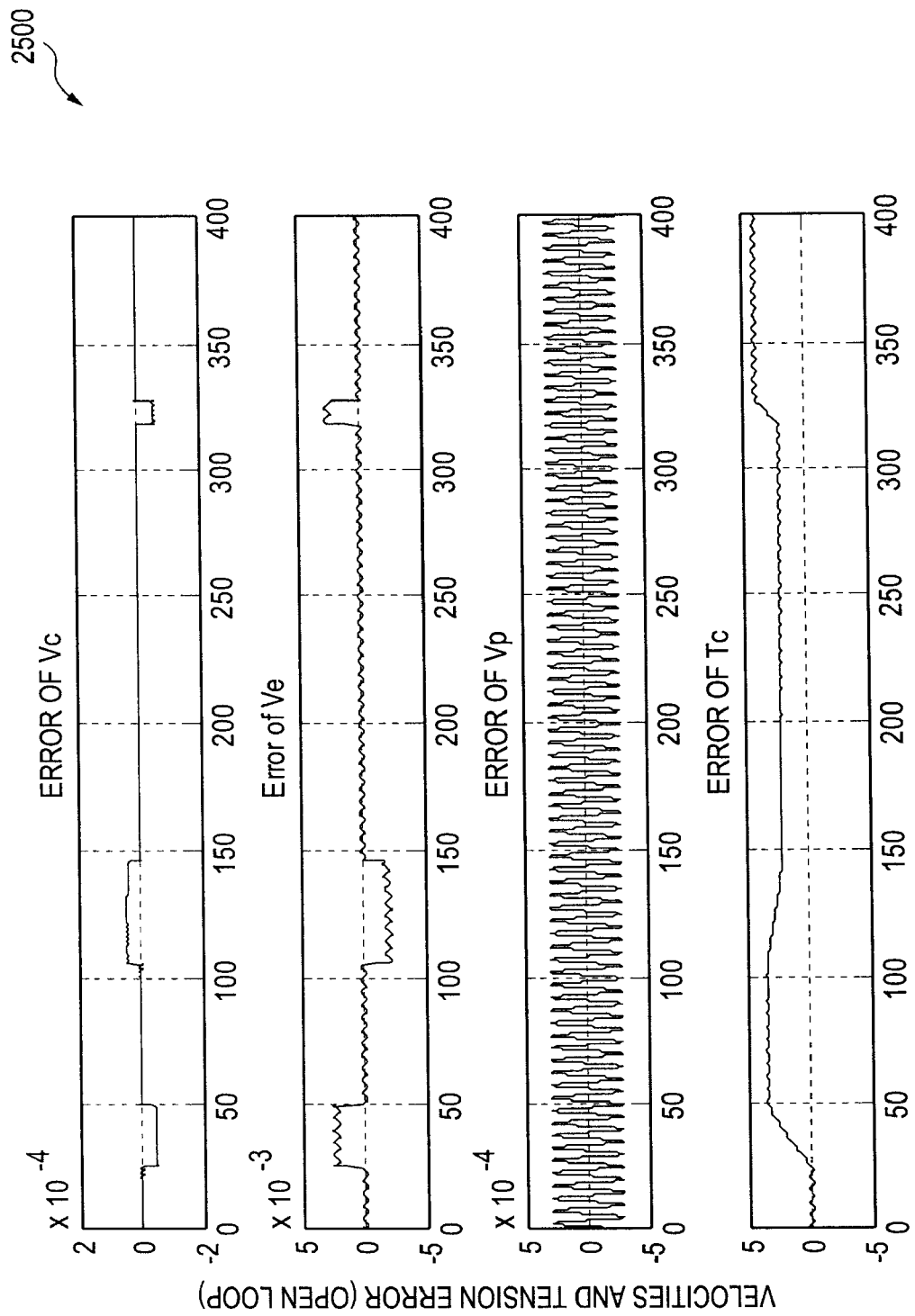
FIG. 25 shows simulated velocity and tension tracking errors for carriage roller by utilizing a LADRC, in accordance with an exemplary embodiment.

The velocity errors ($v_c$, $v_e$ and $v_p$) and tension tracking errors $t_c$ resulting from ADRC1 are shown in FIG. 25. Obviously, the velocity and tension tracking errors are quite small, despite the fact that the controller design is not based on the complete mathematical model of the plant and there are significant disturbances in the process.

Figure 26:
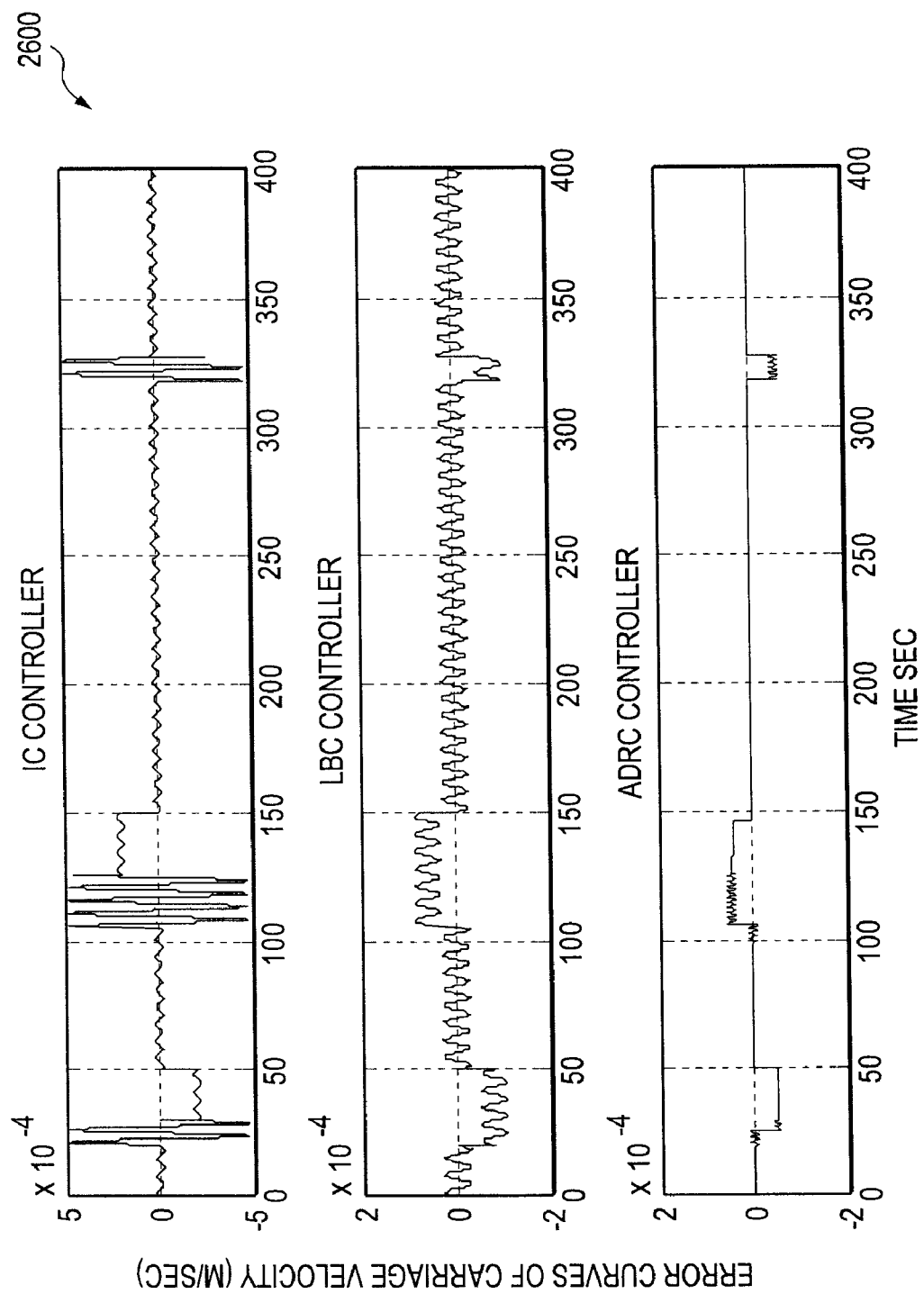
FIG. 26 shows simulated velocity tracking errors for a carriage roller by IC, LBC and LADRC1, in accordance with an exemplary embodiment.
Figure 27:
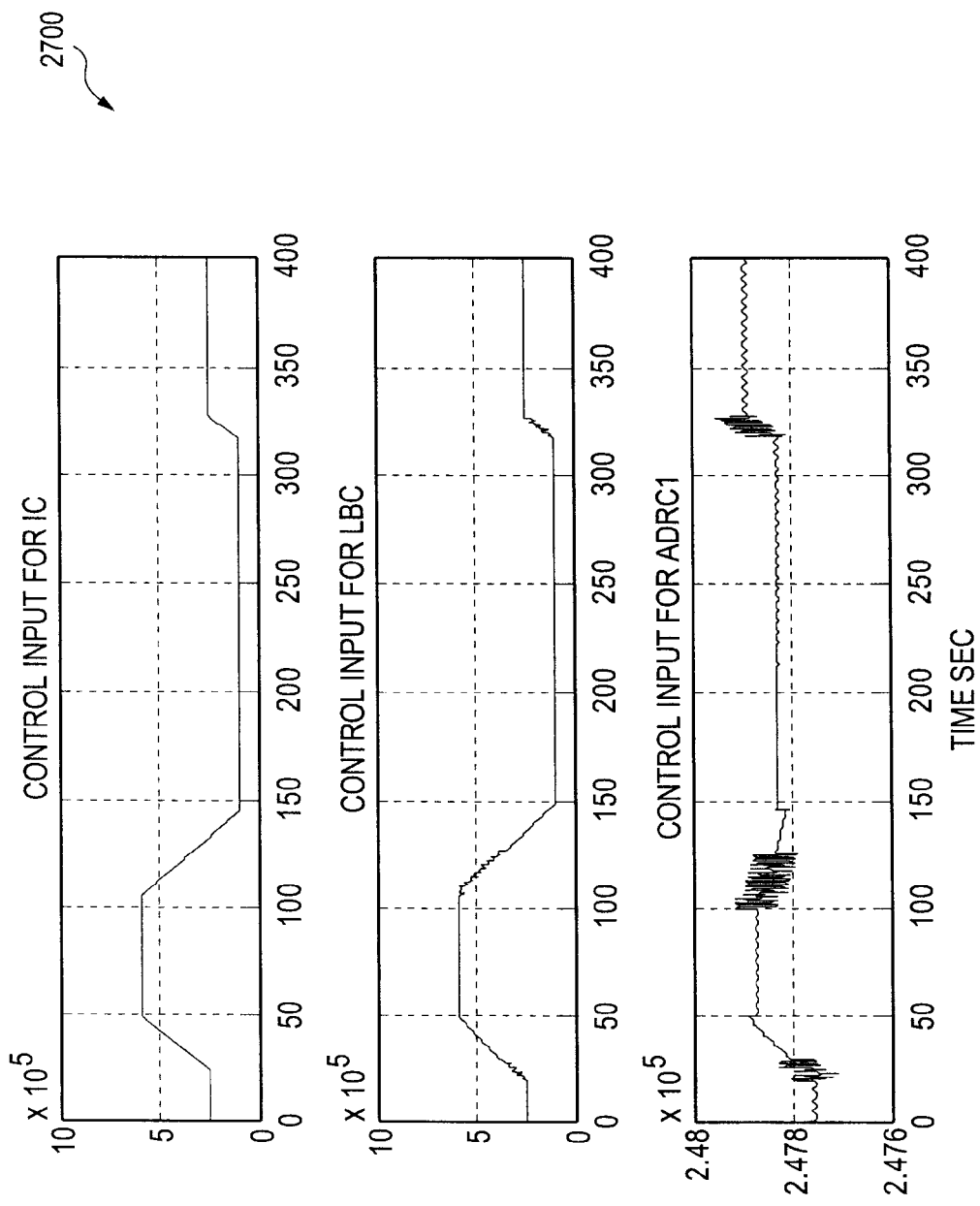
FIG. 27 shows a simulated control signal for carriage roller by IC, LBC and LADRC1, in accordance with an exemplary embodiment.

The comparisons of IC, LBC and LADRC1 are shown in FIGS. 26 and 27, in terms of the tracking errors and control signals for the carriage velocity loop. The carriage velocity errors indicate that LADRC1 is much better than the other two methods and the control signal indicates that the LADRC controller actively responds to the disturbances. It is to be appreciated that utilizing the systems and methods disclosed herein, similar characteristics can be found in the exit and process velocity loops.

Figure 28:
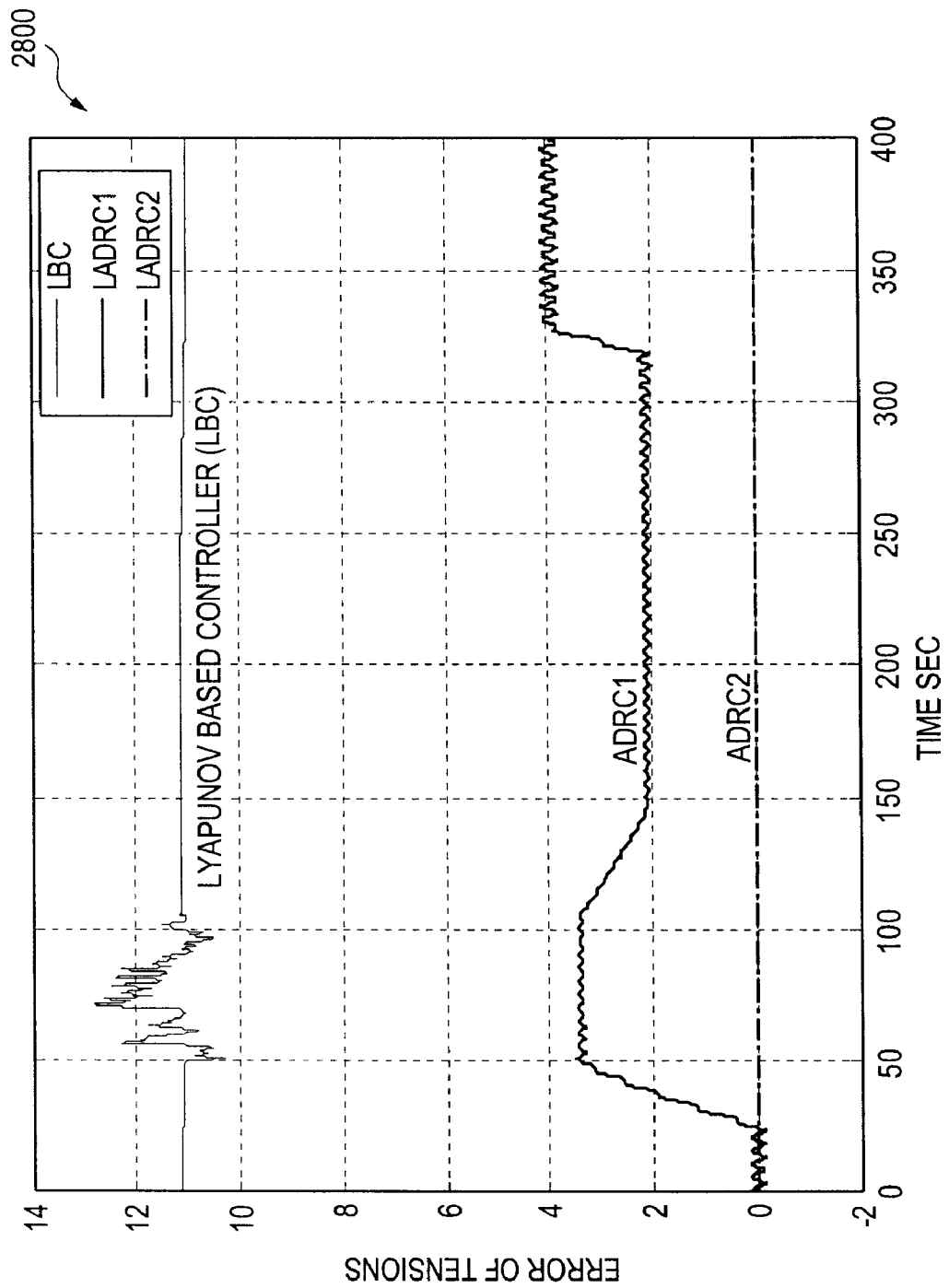
FIG. 28 shows a simulated tension tracking error by LBC, LADRC1, and LADRC2, in accordance with an exemplary embodiment.

Due to the poor results of the IC controller, only LBC, LADRC1, LADRC2 are compared in the tension control results in FIG. 28. With a direct tension measurement, LADRC2 results in negligible tension errors. Furthermore, even in an open-loop control, LADRC1 has a smaller error than LBC. This can be attributed to the high quality velocity controllers in LADRC1.

The velocity and tension errors of all four control systems are summarized in Table IV. Overall, these results reveal that the proposed LADRC controllers have a distinct advantage in the presence of sinusoidal disturbances and a much better performance in tension control.

TABLE IV

SIMULATION COMPARISON

| | Maximum Error | | | | Root Mean Square Error | | | |
|---|---|---|---|---|---|---|---|---|
| Method | $v_c$ (m/s) | $v_e$ (m/s) | $v_p$ (m/s) | $t_c$ (N) | $v_c$ (m/s) | $v_e$ (m/s) | $v_p$ (m/s) | $t_c$ (N) |
| IC | 5.0E−4 | 8.5E−3 | 8.5E−3 | 8.8E+4 | 1.0E−4 | 1.0E−3 | 1.0E−3 | 71.0 |
| LBC 1 | 1.2E−4 | 2.7E−3 | 1.4E−3 | 12.8 | 3.0E−5 | 5.0E−4 | 6.0E−4 | 11.1 |
| LADRC 1 | 8.0E−5 | 1.5E−3 | 2.0E−4 | 4.1 | 1.0E−5 | 1.0E−5 | 2.0E−4 | 2.8 |
| LADRC2 | 7.0E−5 | 1.3E−3 | 2.0E−4 | 1.5E−2 | 1.0E−5 | 1.0E−5 | 2.0E−4 | 1.E−3 |

A new control strategy is proposed for web processing applications, based on the active disturbance rejection concept. It is applied to both velocity and tension regulation problems. Although only one section of the process, including the carriage, the exit, and the process stages, is included in this study, the proposed method applies to both the upstream and downstream sections to include the entire web line. Simulation results, based on a full nonlinear model of the plant, have demonstrated that the proposed control algorithm results in not only better velocity control but also significantly less web tension variation. The proposed method can provide several benefits over conventional systems and methods. For example, 1) no detailed mathematical model is required; 2) zero steady state error is achieved without using the integrator term in the controller; 3) improved command following is achieved during the transient stage; 4) the controller is able to cope with a large range of the plant's dynamic change; and 5) excellent disturbance rejection is achieved.

Additional Forms of the Extended State Observer

Although various observers are known, such as high gain observers, sliding mode observers, and extended state observers (ESO), it is generally regarded that the extended state observer is superior in dealing with dynamic uncertainties, disturbances, and sensor noise. Controllers that use it depend on quick and accurate estimation in real time of the output and equivalent disturbance as well as their derivatives.

Observers are used to estimate variables that are internal to the system under control, i.e. the variables are not readily available outputs. Observers use a model of the system with correction terms and are run in continuous time. In order for continuous functions of time to run in hardware, however, they are often discretized and run at fixed sample rates. Discrete observers are often referred to as estimators.

The fundamental limiting factor of the controller and estimator is the sampling rate. Improving the ESO will improve the overall performance of the system. Up to this point, Euler approximations have been used to implement the ESO in hardware, which adversely affects its performance at slower sampling rates. As described in greater detail herein, several discrete variants of extended state observers are further identified and analyzed.

There are three main contributions, discrete implementation of the ESO or (DESO), the Generalization of the ESO and DESO or (GESO), and discrete parameterization of the DESO and GESO.

Performance enhancements are made to the ESO, both in formulation and in implementation. Although this is referred to as the DESO, a number of methods are disclosed. Here, the system model is first discretized using any number of methods; Euler, zero order hold (ZOH), and first order hold (FOH). Then, a predictive discrete estimator (PDE) from G. F. Franklin, J. D. Powell, and M. Workman, *Digital Control of Dynamic Systems,* 3rd ed., Menlo Park, Calif.: Addison Wesley Longman, Inc., 1998, pp. 328-337 is constructed from the discrete model and correction terms are determined in discrete time symbolically as a function of one tuning parameter. It is also formulated as a Current Discrete Estimator (CDE) from G. F. Franklin, J. D. Powell, and M. Workman, *Digital Control of Dynamic Systems,* 3rd ed., Menlo Park, Calif.: Addison Wesley Longman, Inc., 1998, pp. 328-337 to maintain stable operation at lower sampling rates, a major limiting factor in controls. Typical discretization methods, such as a PDE, generate at least one sample of delay, whereas a CDE removes this delay by adding a current time step update to the estimated state. Next, Euler, zero order hold (ZOH), and first order hold (FOH) versions of all discrete matrices are determined symbolically to retain the simplicity of single parameter tuning. In the past, only an approximation using Euler integration was used. The problem is that the correction terms were determined in continuous time and become inaccurate when they are increased and at low sample rates. A second order example is used. Simple tests show that the CDE with ZOH performs the best.

The DESO is then generalized to estimate systems of arbitrary order, as well as to estimate multiple extended states. This is referred to as the generalized ESO or (GESO). This reformulation incorporates a disturbance model of arbitrary order, thus allowing the amount of disturbance rejection to be specified for different types of systems. Multiple extended states allow the estimation of higher order derivatives of the disturbance, which improves the estimation of the disturbance, allowing it to be more accurately cancelled. In the past, disturbances were restricted to first order and estimated using one extended state. The standard ESO does not make use of this information. A number of advantages exist for the current discrete version of the GESO. First, it offers better estimation and accordingly higher stability. Another implementation benefit is the minimal code space and processing power changes in addition to the standard ESO. The GESO also improves the performance and increases the range of operation while maintaining a similar level of complexity.

The immediate application of the DESO and GESO can be applied to ADRC controllers. Due to the current and eventual wide-spread application of both ADRC, the powerful GESO also has great immediate and future potential. Many plants or other control applications have physical upper limits for sample time and they will benefit from a stable and accurate estimation at lower sampling rates. They may also have a need to estimate higher order disturbances and they will benefit from higher performance control.

The preferred embodiments described herein allow these advanced control methods to be a practical solution for industry to transparently implement a high performance controller into their systems. The problem it solves is that the usability of the controller will no longer suffer dramatically as a result adding complexity to achieve higher performance. This means a significant reduction in time to design, implement, tune, and maintain each drive in every plant and/or every application.

The preferred embodiment observers have been tested in simulation and hardware. Results on simple test applications and popular motion control problems have shown stable control at lower sampling rates than what are possible with the standard ESO. It was applied to ADRC with a tracking controller. The controller was tested in a realistic simulation and in hardware in a motion control servo-drive Discrete Implementation of the Extended State Observer (DESO)

For the sake of simplicity, consider the continuous-time differential equation of a second order plant where u and y are the input and output, respectively, and b is a constant.

$$\ddot{y}=g(y,\dot{y},t)+w+bu \quad (107)$$

Combining the internal dynamics $g(y,\dot{y},t)$ with an external disturbance w to form a generalized disturbance $f(y,\dot{y},t)$, the system is rewritten as $$\ddot{y}=f(y,\dot{y},w,t)+bu. \quad (108)$$

An augmented state space model is constructed $$\dot{x} = Ax + Bu + E\dot{f} \quad (109)$$
$$y = Cx + Du$$
$$A = \begin{bmatrix} 0 & 1 & 0 \\ 0 & 0 & 1 \\ 0 & 0 & 0 \end{bmatrix}, B = \begin{bmatrix} 0 \\ b \\ 0 \end{bmatrix}, E = \begin{bmatrix} 0 \\ 0 \\ 1 \end{bmatrix}$$
$$C = [1 \ 0 \ 0], D = [0]$$

where $x=[y,\dot{y},f]^T$ includes the disturbance to be estimated.

Next, an observer is created from the state space model.

$$\dot{\hat{x}}=A\hat{x}+Bu+L(y-\hat{y})$$
$$\hat{y}=C\hat{x}+Du \quad (110)$$

Note that $\dot{f}$ is ignored in (110) since it is unknown and is estimated by the correction term. The observer is rewritten to output the state $$\dot{\hat{x}}=[A-LC]\hat{x}+[B-LD,L]u_c$$
$$y_c=\hat{x} \quad (111)$$

where $u_c=[u, y]^T$ is the combined input and $y_c$ is the output. It is then decomposed into individual state equations for the purpose of implementation. For the sake of simplicity, the observer gain vector L is determined by placing the poles of the characteristic equation in one location.

$$\lambda(s)=|sI-(A-LC)|=(s+\omega_o)^3$$
$$L=[3\omega_o, 3\omega_o^2, \omega_o^3]^T \quad (112)$$

The state space model in (109) is first discretized (formulated in discrete-time) by applying Euler, ZOH, or FOH.

$$\hat{x}(k+1)=\Phi\hat{x}(k)+\Gamma u(k)$$
$$\hat{y}(k)=H\hat{x}(k)+Ju(k) \quad (113)$$

A discrete observer is created from this model.

$$\hat{x}(k+1)=\Phi\hat{x}(k)+\Gamma u(k)+L_p(y(k)-\hat{y}(k))$$
$$\hat{y}(k)=H\hat{x}(k)+Ju(k) \quad (114)$$

This is known as a predictive discrete estimator (G. F. Franklin, J. D. Powell, and M. Workman, *Digital Control of Dynamic Systems,* 3rd ed., Menlo Park, Calif.: Addison Wesley Longman, Inc., 1998, pp. 328-337) because the current estimation error $y(k)-\hat{y}(k)$ is used to predict the next state estimate $\hat{x}(k+1)$.

However, by defining the predictive estimator gain vector as $$L_p=\Phi L_c. \quad (115)$$

the estimated state reduces to $$\hat{x}(k+1)=\Phi\bar{x}(k)+\Gamma u(k) \tag{116}$$

where the new state includes a current time step update, giving it less time delay.

$$\bar{x}(k)=\hat{x}(k)+L_c(y(k)-\hat{y}(k)) \tag{117}$$

Figure 40:
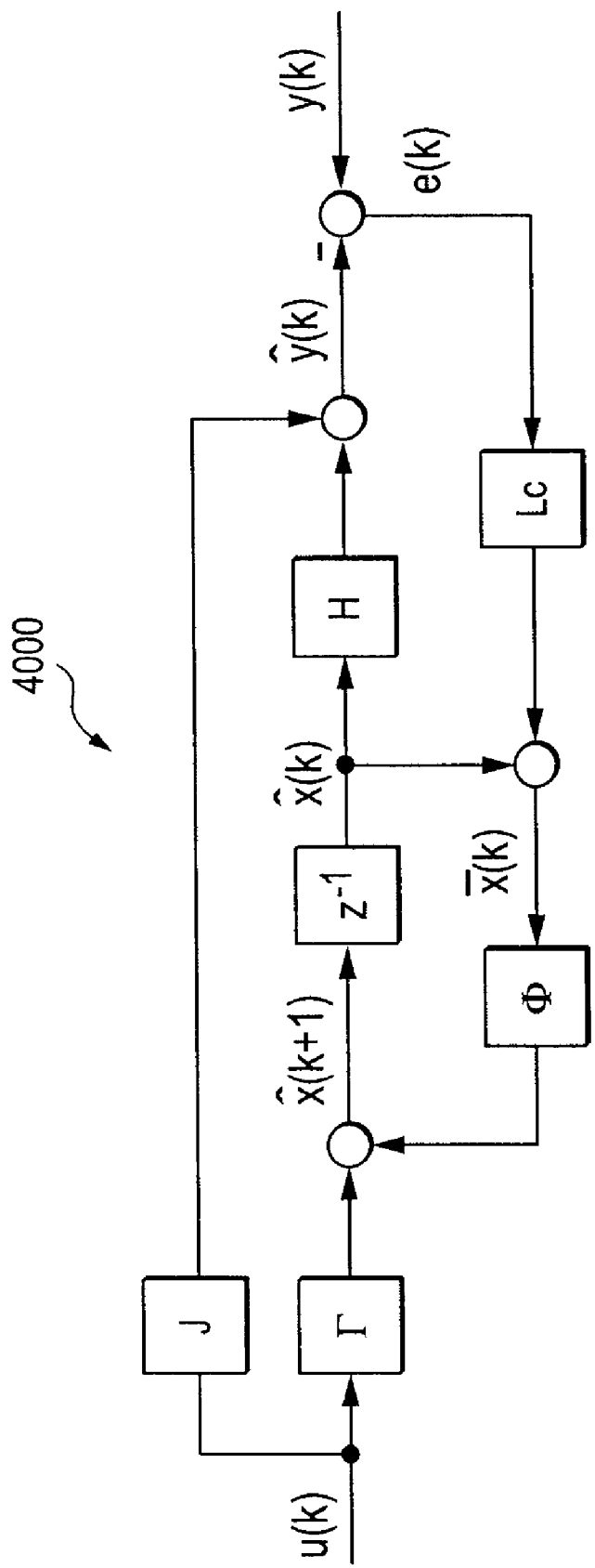
FIG. 40 illustrates a current discrete estimator system, in accordance with an exemplary embodiment.

This is referred to as a current discrete estimator G. F. Franklin, J. D. Powell, and M. Workman, *Digital Control of Dynamic Systems*, 3rd ed., Menlo Park, Calif.: Addison Wesley Longman, Inc., 1998, pp. 328-337. When the sampling rate is low, this could play a significant role in enhancing the stability of a closed loop system. A block diagram is illustrated in 4000 of FIG. 40. The estimator is then rewritten to output the new state $$\hat{x}(k+1)=[(\Phi-L_pH)\hat{x}(k)+[\Gamma-L_pJ,L_p]u_d(k)$$

$$y_d(k)=[I-L_cH]\hat{x}(k)+[-L_cJ,L_c]u_d(k) \tag{118}$$

where $u_d(k)=[u(k), y(k)]^T$ is the combined input and $y_d$ is the output. The only difference for the predictive estimator is that $y_d(k)=\hat{x}(k)$.

Discrete Parameterization of the ESO

For the sake of simplicity, the current estimator gain vector $L_c$ is determined by placing the poles of the discrete characteristic equation in one location.

$$\lambda(z)=|zI-(\Phi-\Phi L_c H)|=(z-\beta)^3 \tag{119}$$

The relation between the discrete estimator poles and the continuous observer poles is given as $$\beta=e^{-\omega_o T}. \tag{120}$$

For example, applying Euler to (109) and solving (119) for $L_c$ yields $$\Phi=\begin{bmatrix}1 & T & 0\\ 0 & 1 & T\\ 0 & 0 & 1\end{bmatrix}, \Gamma=\begin{bmatrix}0\\ bT\\ 0\end{bmatrix}, L_c=\begin{bmatrix}1-\beta^3\\ (2-3\beta+\beta^3)\frac{1}{T}\\ (1-\beta)^3\frac{1}{T^2}\end{bmatrix}. \tag{121}$$

$$H=[1\ 0\ 0], J=[0]$$

where T is the discrete sample time. However, note that $^T$ is denoted as the matrix transpose. In the past, the ESO was implemented by integrating each state equation in (110) using Euler (J. Han, "Nonlinear Design Methods for Control Systems", *Proc. 14th IFAC World Congress*, 1999; Z. Gao, "Scaling and Bandwidth-Parameterization Based Controller Tuning," *American Control Conference*, pp. 4989-4996, June 2003; Z. Gao and S. Hu, "A Novel Motion Control Design Approach Based on Active Disturbance Rejection," *Proc. of the 40th IEEE Conference on Decision and Control*, p. 4974, December 2001; Y. Hou, Z. Gao, F. Jiang, and B. T. Boulter, "Active Disturbance Rejection Control for Web Tension Regulation," *IEEE Conference on Decision and Control*, 2001; B. Sun, "Dsp-based Advanced Control Algorithms for a DC-DC Power Converter," *Master's Thesis, Cleveland State University*, June 2003; R. Kotina, Z. Gao, and A. J. van den Bogert, "Modeling and Control of Human Postural Sway," *XXth Congress of the International Society of Biomechanics*, Cleveland, Ohio, July 31-Aug. 5, 2005; R. Miklosovic and Z. Gao, "A Dynamic Decoupling Method for Controlling High Performance Turbofan Engines," *Proc. of the 16th IFAC World Congress*, Jul. 4-8, 2005. The problem with this method is that it produces the same matrices as (121) except for $L_p=TL$, making the observer unstable at relatively low sample rates. Yet in cases where L is a nonlinear function, this may be the only way of discrete implementation. For the sake of further discussion, the past method is referred to as the Euler approximation.

Applying ZOH $$\Phi=e^{AT}\Rightarrow\sum_{k=0}^{\infty}\frac{A^kT^k}{(k)!} \tag{122}$$

$$\Gamma=\int_0^T e^{A\tau}d\tau B\Rightarrow\sum_{k=0}^{\infty}\frac{A^kT^{k+1}}{(k+1)!}B$$

$$H=C, J=0$$

to (109) produces a more accurate estimation than Euler.

$$\Phi=\begin{bmatrix}1 & T & \frac{T^2}{2}\\ 0 & 1 & T\\ 0 & 0 & 1\end{bmatrix}, \Gamma=\begin{bmatrix}b\frac{T^2}{2}\\ bT\\ 0\end{bmatrix}, L_c=\begin{bmatrix}1-\beta^3\\ (1-\beta)^2(1+\beta)\frac{3}{2T}\\ (1-\beta)^3\frac{1}{T^2}\end{bmatrix} \tag{123}$$

$$H=[1\ 0\ 0], J=[0]$$

Simulation and Analysis of the Discrete ESO

Figure 41:
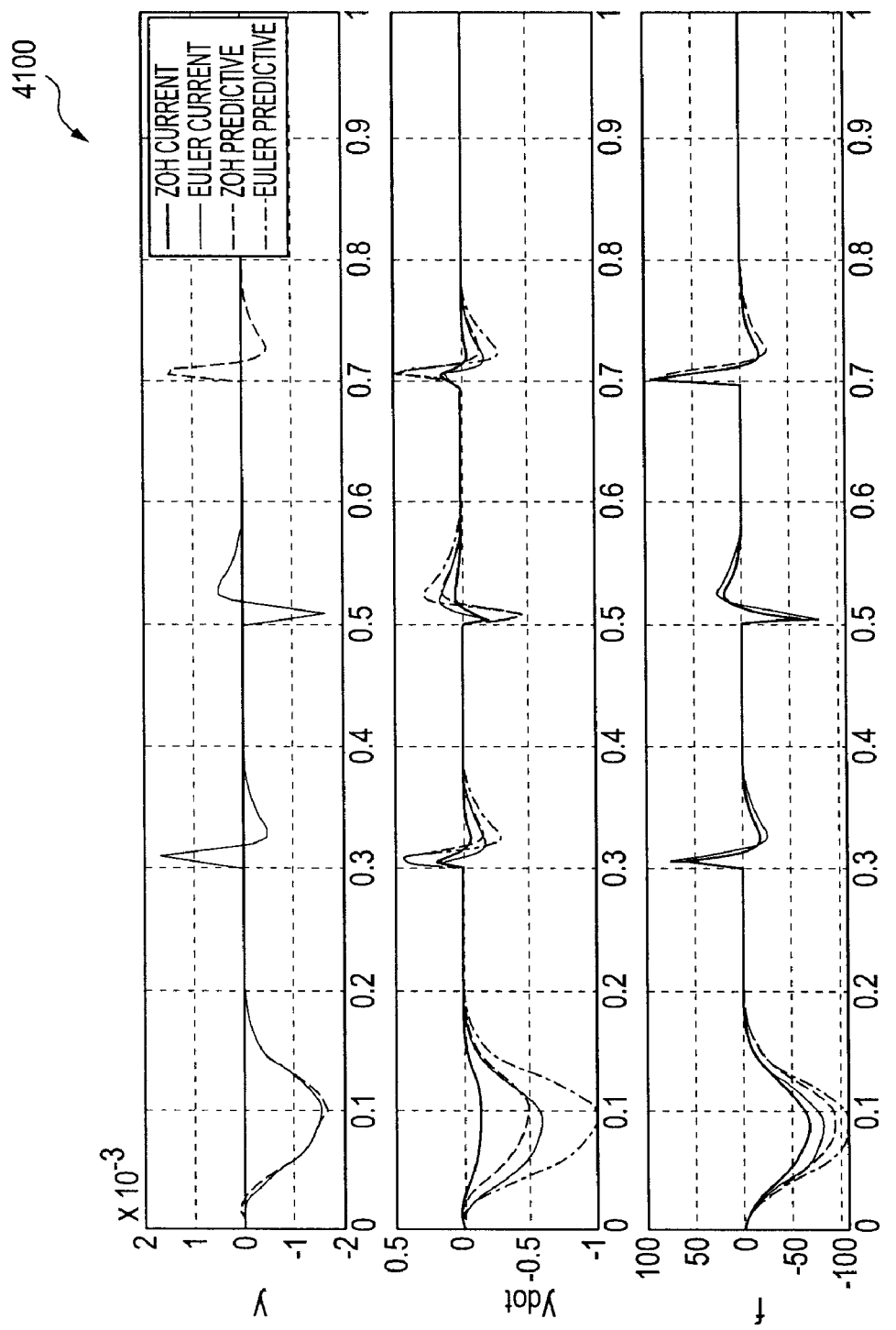
FIG. 41 illustrates an open-loop tracking error plot, in accordance with an exemplary embodiment.

Various discretization methods are analyzed through simulation of various plants. The ESO is first applied in open loop to a simple motion system plant model $$\ddot{y}=50\dot{y}+500u+100w \tag{124}$$

where w is a 2.5 Hz square wave starting at 0.3 sec. and u is a trapezoidal profile that lasts 0.125 sec. The estimator parameters are $\omega_o=300$ and T=0.005. A tracking error plot is shown in 4100 of FIG. 41 that compares the predictive and current discrete methods using both Euler and ZOH. The transient and steady state parts of each trajectory are evaluated using integral absolute error and then summarized in Table V.

TABLE V

OPEN LOOP TRACKING ERRORS

| Discretization Method | Transient Integral Absolute Error | | |
|---|---|---|---|
| | y | y' | F |
| ZOH Current | 1.49E-6 | 12E-3 | 5.90 |
| Euler Current | 1.51E-6 | 51E-3 | 7.16 |
| ZOH Predictive | 136E-6 | 41E-3 | 8.41 |
| Euler Predictive | 134E-6 | 87E-3 | 9.66 |
| Discretization Method | Steady State Integral Absolute Error | | |
| | y | y' | F |
| ZOH Current | 0.10E-5 | 9E-3 | 2.83 |
| Euler Current | 0.10E-5 | 20E-3 | 2.83 |
| ZOH Predictive | 9.55E-5 | 30E-3 | 4.32 |
| Euler Predictive | 9.55E-5 | 40E-3 | 4.32 |

When the step size T=0.005, the Euler approximation becomes unstable and therefore was not shown. However, the four methods shown use discrete pole placement and do not become unstable until T=0.066. From the table, the second most important option appears to be the current discrete method for tracking accuracy. The table also shows that ZOH is better than Euler and, interestingly, dominant in estimating transient velocity.

Next, the ESO is applied in closed loop to (124) and to a more complex simulation of an actual servo-motor.

$$V_m = 80(75u - 0.075I_a), |V_m| < 160, |u| < 8$$

$$\dot{I}_a = -2500(V_m - 0.4I_a - 1.2\dot{y})$$

$$\ddot{y} = 11.1(100w + 1.5I_a) \quad (125)$$

With $\omega_c = 30$ and $\omega_o = 300$, the sample period is increased to the point of instability and then tabulated in Table VI.

TABLE VI

MAXIMUM CLOSED LOOP STEPSIZE

| Discretization Method | Simple Plant (18) | Servo-motor (19) |
|---|---|---|
| Euler Approximation | 26E-4 | 30E-4 |
| Euler Predictive | 37E-4 | 57E-4 |
| Euler Current | 47E-4 | 68E-4 |
| ZOH Predictive | 85E-4 | 140E-4 |
| ZOH Current | 150E-4 | 300E-4 |

The results show that the most important option for low sampling time requirements is ZOH, followed by the current discrete method. In this regard, the current discrete ESO with ZOH appears to be six to ten times better than the Euler approximation used in previous literature. The servo system in (145) was also simulated, resulting in an improvement of 5.3 times. In summary, the current discrete ESO with ZOH should be used for improved tracking accuracy as well as closed loop stability.

Generalization of the Extended State Observer (GESO)

Although a second order example was used in the previous section, (110) through (120) and (122) are applicable to a plant of arbitrary order with any number of extended states. For example, a class of general $n^{th}$ order plants similar to (107) is represented as $$y^{(n)} = g(y, \ldots, y^{(n-1)}, t) + w + bu \quad (126)$$

where $y^{(n)}$ denotes the $n^{th}$ derivative of the output and $g(y, \ldots, y^{(n-1)}, w, t)$ represents the internal dynamics. Two critical parameters are relative order n and high frequency gain b. Combining the unknowns into one generalized disturbance $f(y, \ldots, y^{(n-1)}, w, t)$ results in $$y^{(n)} = f(y, \ldots, y^{(n-1)}, w, t) + bu. \quad (127)$$

Note that when represented with an equivalent input disturbance $d = f/b$, the design model becomes $$P_d(s) = b/s^n. \quad (128)$$

Figure 42:
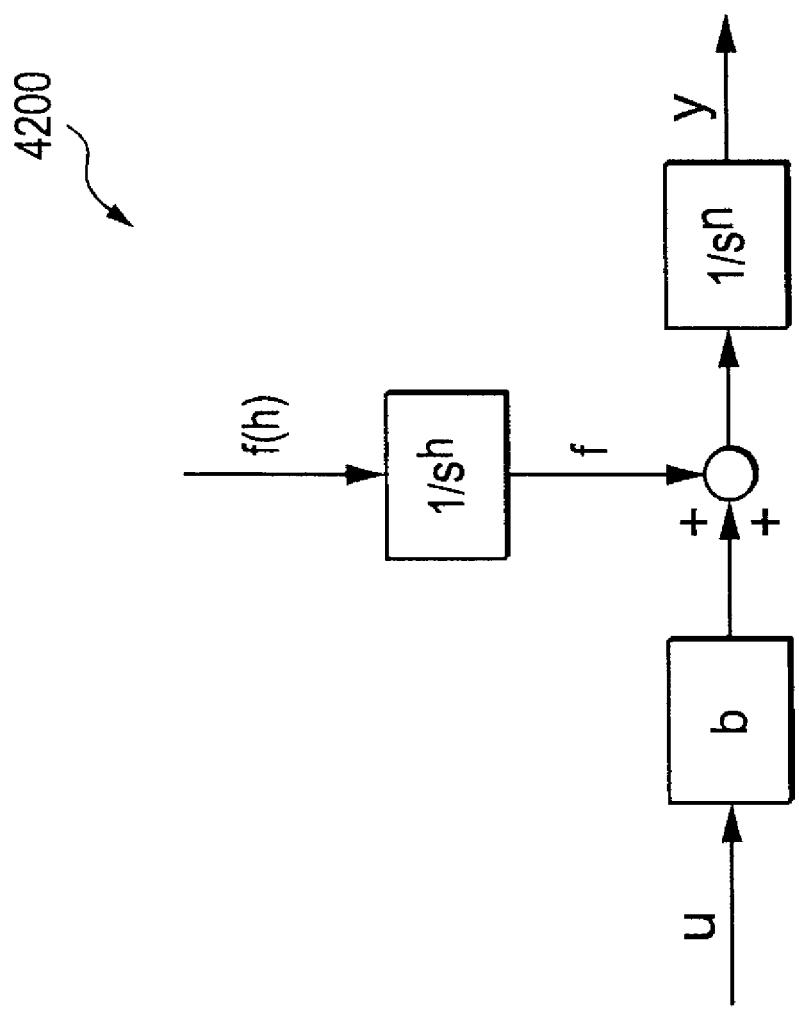
FIG. 42 illustrates a model of a canonical form system with disturbance, in accordance with an exemplary embodiment.

As a signal, the type of disturbance can be characterized similar that of system type in a classical control. This specification is outlined in G. F. Franklin, J. D. Powell, and A. Emami-Naeni, *Feedback Control of Dynamic Systems*, 4th ed., Upper Saddle River, N.J.: Prentice-Hall, Inc., 2002, pp. 239-242, 601-604 as the degree of a polynomial that approximates a signal, which directly relates to the number of times it is differentiated before reaching zero. Sometimes disturbances are represented by a set of cascaded integrators $1/s^h$ with unknown input. Under this assumption, the plant is represented in 4200 of FIG. 42 by two sets of cascaded integrators; one for the design model and another for the disturbance model. It will also be shown that this assumption leads to an estimated disturbance equivalent to that of a DOB.

In (109), previous ESO design, and in disturbances are considered to be piece-wise constant with h=1 or a series of steps. Now an ESO with h=1, 2, 3 can respectively track a square, triangular, or parabolic disturbance. A sinusoid is a different matter because it is infinitely differentiable. However, increasing h increases the degree of the polynomial and improves tracking of a sinusoid or any time varying disturbance. An ESO with h extended states for a relative $n^{th}$ order plant is denoted as an $ESO_{n,h}$.

The new form is represented in continuous state space $$\dot{x} = Ax + Bu + Ef^{(h)}$$

$$y = Cx + Du \quad (129)$$

where the state includes the disturbance $f$ and its derivatives to be estimated.

$$x = [x_1, \ldots, x_n, x_{n+1}, \ldots, x_{n+h}]^T \quad (130)$$

$$= [y^{(0)}, \ldots, y^{(n-1)}, f^{(0)}, \ldots, f^{(h-1)}]^T$$

Since the new form consists of cascaded integrators, the A matrix simplifies to an n+h square matrix with ones on the super diagonal. Each element of A is defined as $$a_{i,j} = \begin{cases} 1, & i = j-1 \\ 0, & \text{otherwise.} \end{cases} \quad (131)$$

Since the input is added after n-integrators, the first state is defined as the output, and the derivative of the last state is $f^{(h)}$, the other matrices become $$B = [0_{n-1} \ b \ 0_h]^T, \ C = [1 \ 0_{n+h-1}], \ E = [0_{n+h-1} \ 1]^T \quad (132)$$

where $0_h$ represents a 1×h zero vector and D=0.

For the sake of simplicity, the observer gain vector is determined by placing all of the poles of the characteristic equation in one location.

$$\lambda(s) = |sI - (A - LC)| = (s + \omega_o)^{n+h} \quad (133)$$

As a result, each element in L becomes $$l_i = C_{n+h,i} \omega_o^i, \ i=1,2,\ldots,n+h \quad (134)$$

where the binomial coefficients are $$c_{i,j} = \binom{i}{j} = \frac{i!}{j!(i-j)!}.$$

The ESO can also be represented in filter form $$\hat{y}^{(i)} = s^i[Q_y y + (1-Q_y)P_d u], \ i=0,\ldots,n-1$$

$$\hat{f}^{(j)} = s^j[bQ_f(P_d^{-1}y - u)], \ j=0,\ldots,h-1 \quad (135)$$

where binomial filters $$Q_y(s) = \frac{\beta_{n+h,n+h-i-1}(s)}{\beta_{n+h,n+h}(s)}, \ Q_f(s) = \frac{\beta_{n+h,h-j-1}(s)}{\beta_{n+h,n+h}(s)} \quad (136)$$

consist of numerator and denominator polynomials that are functions of a single tuning parameter $\omega_o = 1/\tau$.

$$\beta_{i,j}(s) = 1 + \sum_{r=1}^{j} c_{ir}(\tau s)^r \quad (137)$$

This form shows that additional extended states raise observer order, n+h, and increase the slope of the cutoff frequency. It also shows that the estimated disturbance is equivalent to a DOB, i.e. a filtered version of the actual $f$.

$$\hat{f} = bQ_f(P_d^{-1}y - u) \quad (138)$$

Discrete Implementation of the GESO

Applying ZOH to (129) using (122) produces an n+h square $\Phi$ matrix where each element is defined as $$\phi_{i,j} = \begin{cases} \gamma_{j-i}, & i \le j \\ 0, & \text{otherwise} \end{cases} \quad (139)$$

for $\gamma_k = T^k/k!$. The $\Gamma$ matrix reduces to $$\Gamma = [b\gamma_n \ldots b\gamma_1 \ 0_h]^T. \quad (140)$$

If FOH is preferred, the only change is in the $\Gamma$ and $J$ matrices, which become $$\Gamma = \left[\frac{(2^{n+1}-2)}{n+1}b\gamma_n \ldots \frac{2}{2}b\gamma_1 \ 0_h\right]^T \quad (141)$$

$$J = \left[\frac{b\gamma_n}{n+1} \ldots \frac{b\gamma_1}{2} \ 0_h\right]^T.$$

If Euler is preferred, the $\Phi$ matrix where each element is defined as $$\phi_{i,j} = \begin{cases} 1, & i = j \\ T, & i+1 = j \\ 0, & \text{otherwise} \end{cases} \quad (142)$$

and the $\Gamma$ matrix reduces to $$\Gamma = [0_{n-1} \ bT \ 0_h]^T. \quad (143)$$

Discrete Parameterization of the GESO

For the sake of simplicity, the current estimator gain vector Lc is determined by placing the poles of the discrete characteristic equation in one location.

$$\lambda(z) = |zI - (\Phi - \Phi L_c H)| = (z - \beta)^{n+h} \quad (144)$$

As a result, the current estimator gain vector is listed in Table VII as a function of n+h. A current discrete ESO with h extended states for a relative $n^{th}$ order plant is denoted as $CDESO_{n,h}$.

TABLE VII

CDESO ESTIMATOR GAINS FOR ZOH AND FOH

| n + h | $L_c$ |
|---|---|
| 1 | $[1 - \beta]^T$ |
| 2 | $\left[1 - \beta^2, (1-\beta)^2 \frac{1}{T}\right]^T$ |
| 3 | $\left[1 - \beta^3, (1-\beta)^2(1+\beta)\frac{3}{2T}, (1-\beta)^3 \frac{1}{T^2}\right]^T$ |
| 4 | $\left[1 - \beta^4, (1-\beta)^2(11 + \beta(14 + 11\beta))\frac{1}{6T}, (1-\beta)^3(1+\beta)\frac{2}{T^2}, (1-\beta)^4\frac{1}{T^3}\right]^T$ |
| 5 | $\left[1 - \beta^5, (1-\beta)^2(1+\beta)(5 + \beta(2+5\beta))\frac{5}{12T}, (1-\beta)^3(7 + \beta(10+7\beta))\frac{5}{12T^2}, (1-\beta)^4(1+\beta)\frac{5}{2T^3}, (1-\beta)^5\frac{1}{T^4}\right]^T$ |

A simulation of an industrial motion control test bed is used to demonstrate the control design procedure and its simplicity, resulting performance, and overall effectiveness in the absence of a simulation model. The servo amplifier, motor, and drive train are modeled with a resonant load as $$V_m = 4(V_c - 2.05 I_a), \ |V_c| < 4.5, \ |V_m| < 10$$

$$\dot{I}_a = 2500(V_m - 4I_a - 0.2\dot{x}_m), \ |I_a| < 1$$

$$T_m = 0.5 I_a - T_d - T_l$$

$$T_l = 0.0005(\dot{x}_m - 4\dot{x}_l) + 0.0001(x_m - 4x_l)$$

$$\ddot{x}_m = 2500 T_m$$

$$\ddot{x}_l = 175 T_l$$

where $V_c$, $x_l$, and $T_d$ are the control input voltage, output load position, and torque disturbance, respectively. Backlash of a ±0.31 μm/sec. dead-bandwidth on $\dot{x}$ is also applied. The control design method using the ESO is fairly straight forward with only a few physical intuitions. In the most basic sense, a servo motor can be considered as a double integrator.

$$\frac{x_l(s)}{V_c(s)} \approx \frac{b_m}{s^2}. \quad (146)$$

It is put into the new canonical form where $f(t)$ represents any of the discrepancies or dynamics not modeled in (38).

$$\ddot{x}(t) = f(t) + b_m V_c(t) \quad (147)$$

First, a $CDESO_{2,h}$ is used to estimate $x_l(t)$, $\dot{x}_l(t)$, and $f(t)$ in discrete time. Then the estimated disturbance is fed back to cancel itself $$V_c(k) = \frac{u_0(k) - \hat{f}(k)}{b_m} \quad (148)$$

which reduces the system to a double integrator, $\ddot{x}_l(t) \approx u_0(t)$. Finally, a parameterized control law is used to control the augmented system where r(k) is a reference motion profile.

$$u_0(k) = \omega_c^2(r(k) - \hat{x}_l(k)) - 2\omega_c \hat{\dot{x}}_l(k) \quad (149)$$

Figure 43:
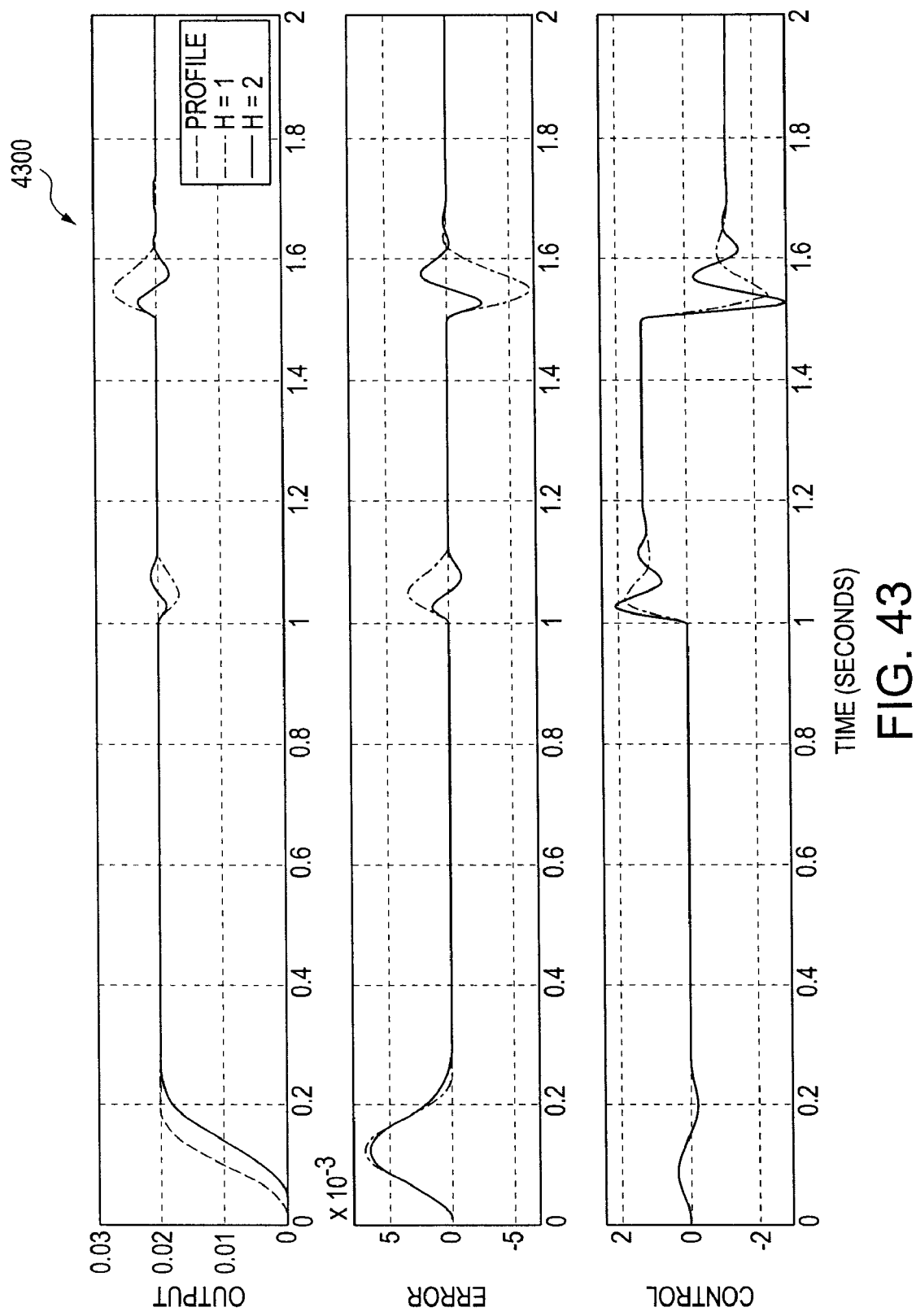
FIG. 43 illustrates a plot of a response of an industrial motion control test bed to a square torque disturbance, in accordance with an exemplary embodiment.
Figure 44:
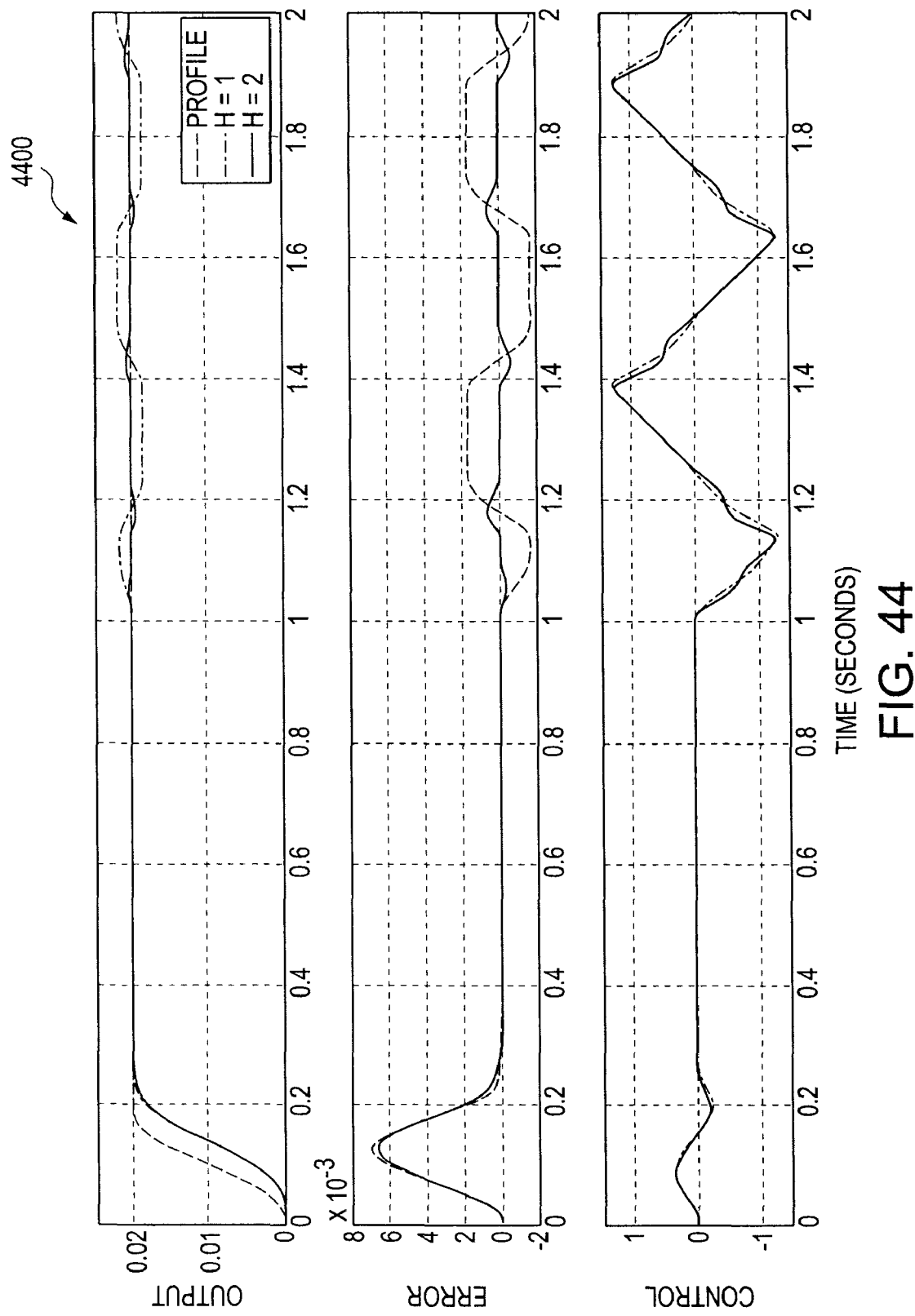
FIG. 44 illustrates a plot of a response of an industrial motion control test bed to a triangular torque disturbance, in accordance with an exemplary embodiment.
Figure 45:
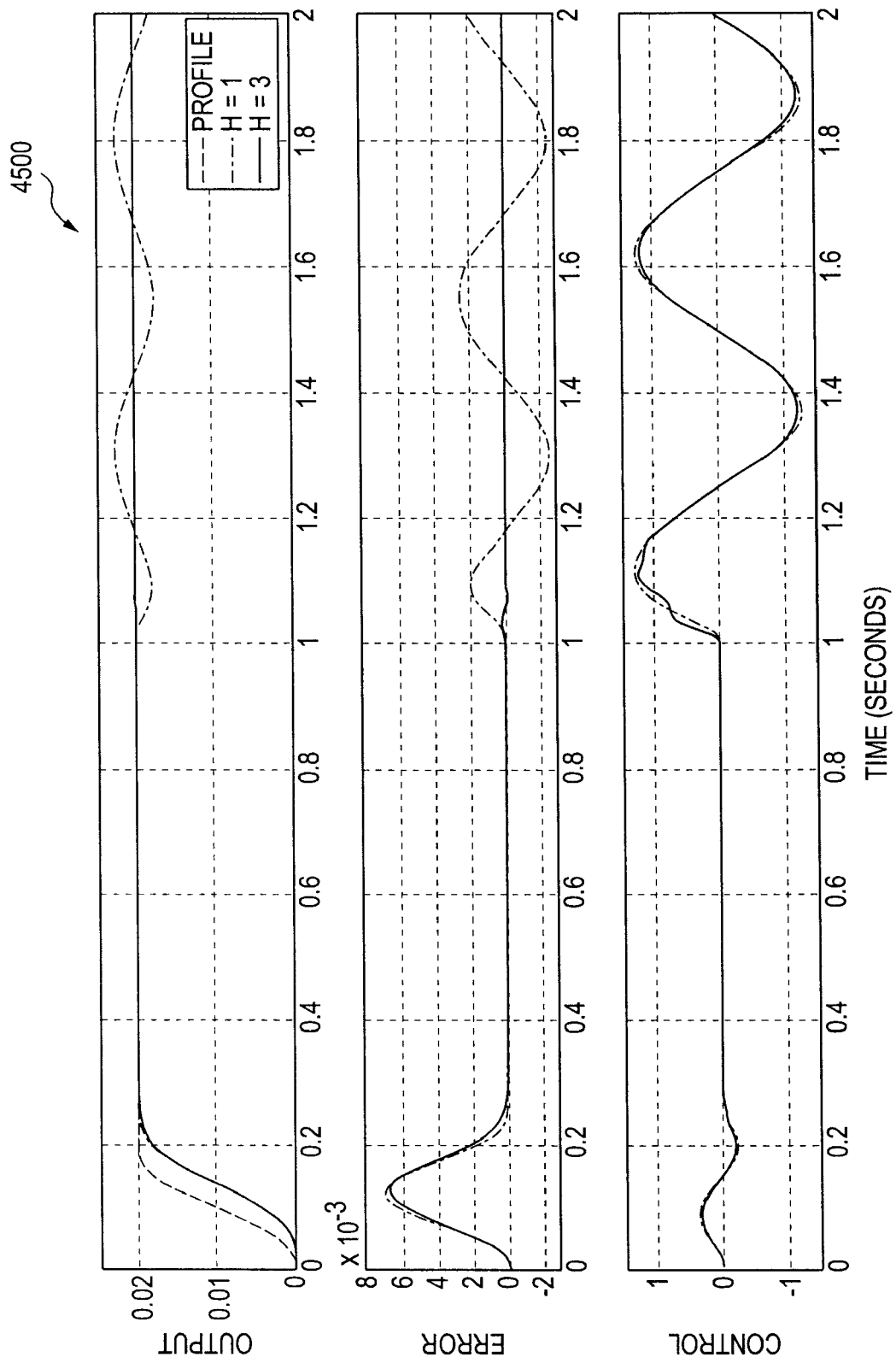
FIG. 45 illustrates a plot of a response of an industrial motion control test bed to a sinusoidal torque disturbance, in accordance with an exemplary embodiment.

The observer and control laws in (148) and (149) are selected with a sample rate of 10 kHz to control the motion system's model in (145). The gain $b_m=25$ is crudely estimated as the initial acceleration from a step response. Disturbance rejection was tested by applying various torque disturbances at time t=1 second and 0.1% white noise is injected into the output. Keeping the control signal within ±4.5V and its noise level within ±100 mV, ad and $\omega_o$ were increased to 50 and 150, respectively. The results for a type 1 square, type 2 triangular, and type ∞ sinusoidal torque disturbance are shown in 4300 of FIG. 43, 4400 of FIG. 44, and 4500 of FIG. 45, respectively. Robustness was tested by increasing the load by a factor of nearly 8. There was no noticeable difference. The results show that two extended states reduce the error compared to one extended state. In FIG. 44, two extended states drive to zero the error created by type 2 disturbances. Although a sinusoidal disturbance is infinitely differentiable, three extended states significantly reduce the steady state error in FIG. 45.

Various discrete implementations of the extended state observer are studied and compared. It is shown that the current discrete formulation is superior to the predictive one in reducing the delay associated with the sampling process. It is also demonstrated that the ZOH implementation improves estimation accuracy and stability without additional complexity to the user. To facilitate the ESO implementation for practitioners, the algorithm is derived symbolically with a single tuning parameter, i.e. the bandwidth of the observer. Another significant development is the generalization of the ESO for various types of systems and disturbances. Finally, a filter version shows that the estimated disturbance is equivalent to the DOB structure. Unlike the DOB, however, the ESO estimates suitable derivatives of the output, allowing for a straightforward controller design. The motion control problem is complex with many uncertainties, yet preliminary results show that this observer can achieve high performance over a wide range of system dynamics while remaining easy to use.

Tracking Control Applied to ADRC

The various preferred embodiment controllers and observers described herein can be used in conjunction with tracking components to further improve their function and performance.

The immediate application of the tracking enhancement can be applied to ADRC controllers. Due to the current and eventual wide-spread application of ADRC, the powerful tracking enhancement also has great immediate and future potential. Future uses also include the specific application of the tracking control method to new controllers.

The already proven ADRC control structure which works well for steady state set point control can now be extended to handle transient tracking control by use of the preferred embodiment tracking strategy. This enhancement allows these advanced control methods to be a practical solution for industry to transparently implement a high performance tracking controller into their systems. The problem it solves is that the usability of the controller will no longer suffer dramatically as a result adding complexity to achieve higher tracking performance. This means a significant reduction in time to design, implement, tune, and maintain each drive in every plant of every company.

The preferred embodiment tracking strategies have been applied to ADRC in the form of prefilters and/or feed forward tends to make the desired closed loop transfer function of ADRC approximately equal to one or, more generally, have a relative order equal to zero. Test results in simulation and hardware have shown error reduction up to eighty fold.

The tracking enhancement was applied to a controller using ADRC and a Current Discrete Extended State Estimator (CDESO). The controller was tested in a realistic simulation and in hardware in motion system servo drive.

Tracking ADRC Applied to a Second Order Plant

For the sake of clarity, let us first consider a general second order plant where u and y are the input and output, respectively, and b is a constant.

$$\ddot{y}=g(y,\dot{y},t)+w+bu \quad (150)$$

Combining the internal dynamics $g(y,\dot{y},t)$ with an external disturbance w to form a generalized disturbance $f(y,\dot{y},w,t)$, the system is rewritten as $$\ddot{y}=f(y,\dot{y},w,t)+bu \quad (151)$$

An augmented state space model is constructed $$\dot{x} = Ax + Bu + E\dot{f} \quad (152)$$
$$y = Cx$$
$$A = \begin{bmatrix} 0 & 1 & 0 \\ 0 & 0 & 1 \\ 0 & 0 & 0 \end{bmatrix}, B = \begin{bmatrix} 0 \\ b \\ 0 \end{bmatrix}, E = \begin{bmatrix} 0 \\ 0 \\ 1 \end{bmatrix}$$
$$C = [1 \ 0 \ 0]$$

where $x=[x_1,x_2,x_3]^T=[y,\dot{y},f]^T$ includes the disturbance.

An ESO is then created from (152) to estimate the states $$\dot{\hat{x}}=A\hat{x}+Bu+L(y-C\hat{x}) \quad (153)$$

where $\hat{x}=[\hat{x}_1,\hat{x}_2,\hat{x}_3]^T=[\hat{y},\dot{\hat{y}},\hat{f}]^T$. For the sake of simplicity, the observer gain vector L is determined by placing the poles of the characteristic equation in one location.

$$\lambda(s)=|sI-(A-LC)|=(s+\omega_o)^3 \quad (154)$$

$$L=[3\omega_o, 3\omega_o^2, \omega_o^3]^T$$

A disturbance rejection control law is applied to the plant in (151) to dynamically cancel $f(y,\dot{y},w,t)$ using its estimate $\hat{x}_3$.

$$u=(u_0-\hat{x}_3)/b \quad (155)$$

This reduces the plant to a double integrator at low frequencies.

$$\ddot{y}=u_0 \quad (156)$$

A simple control law is then applied $$u_0=k_p(r-\hat{x}_1)-k_d\hat{x}_2 \quad (157)$$

to form the following closed loop transfer function.

$$G_{ry}(s) \approx \frac{k_p}{s^2+k_d s+k_p} \quad (158)$$

For the sake of simplicity, it is set equal to a desired closed loop transfer function that provides a smooth step response.

$$G_{ry}^*(s) = \frac{\omega_c^2}{(s+\omega_c)^2} \quad (159)$$

The resulting controller gains become $$k_p=\omega_c^2, k_d=2\omega_c. \quad (160)$$

Figure 46:
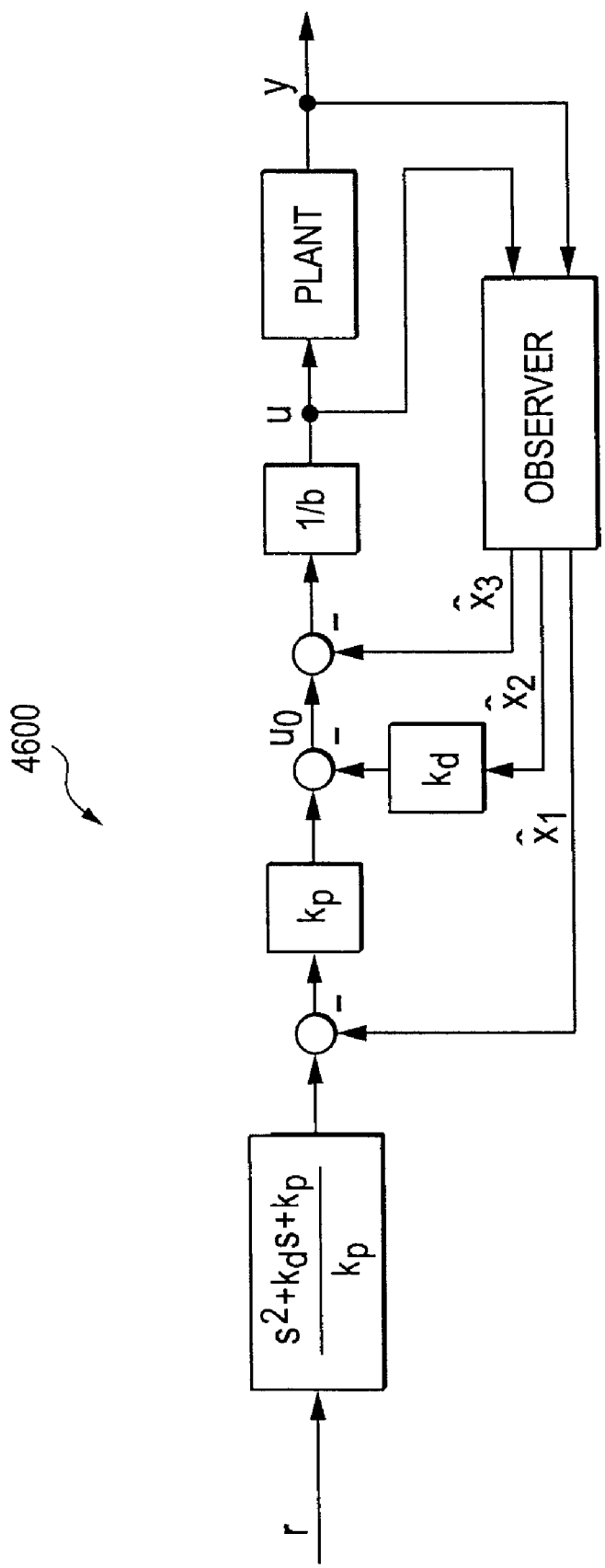
FIG. 46 illustrates a block a diagram of a second order active disturbance rejection control (ADRC) system with phase compensation, in accordance with an exemplary embodiment.

The problem with (157) is in the phase lag it produces in (158). Therefore in situations requiring precise command following, it is proposed that the inverse of the closed loop transfer function, shown in square brackets in (161), is added to the reference input of the control law as a prefilter $$u_0 = k_p\left(\left[\frac{s^2 + k_d s + k_p}{k_p}\right]r - \hat{x}_1\right) - k_d\hat{x}_2 \tag{161}$$

to compensate for the predicted phase lag by making the new closed loop transfer function $G_{ry} \approx 1$, thus producing a much smaller error $e=r-y$ than the original controller. This configuration is shown in 4600 of FIG. 46.

Figure 47:
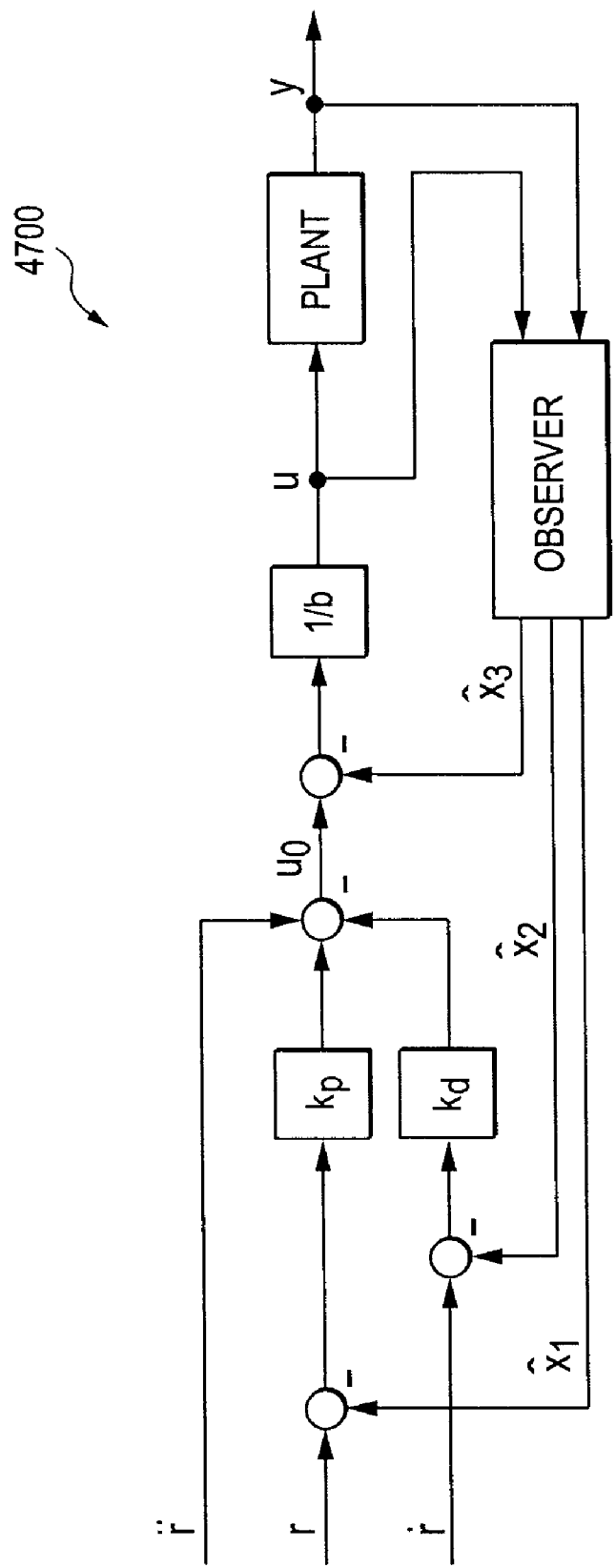
FIG. 47 illustrates a block a diagram of a second order ADRC system with tracking, in accordance with an exemplary embodiment.

A simpler way of implementation is in reducing the new control law in (161) to $$u_0 = k_p(r-\hat{x}_1) + k_d(\dot{r}-\hat{x}_2) + \ddot{r} \tag{162}$$

where velocity and acceleration feed forward are utilized. Here, the first two terms drive the error and its derivative to zero while the last term provides a desired control input $u^*_0$ such that $\ddot{y}$ follows $\ddot{r}$. This equivalent tracking control configuration is shown in 4700 of FIG. 47. Even though this example applies tracking to a parameterized controller, note that the concepts in (161) and (162) will work for any linear time invariant controller regardless of its parameter values. Therefore the application of tracking to ADRC is independent of the application of parameterization to ADRC, whether it is by means of a prefilter as in (161) or by a single control law with feed forward terms as in (162).

A compromise in performance between the point-to-point controller in (157) and the tracking controller in (162) is reached when using $$u_0 = k_p(r-\hat{x}_1) + k_d(\dot{r}-\hat{x}_2) \tag{163}$$

to produce a closed loop transfer function with a relative degree of one.

$$G_{ry}(s) \approx \frac{k_d s + k_p}{s^2 + k_d s + k_p} \tag{164}$$

Tracking ADRC Applied to an nth Order Plant

When (151) is extended to arbitrary order, the system is represented by $$y^{(n)} = f(y, \dot{y}, \ldots, y^{(n-1)}, w, t) + bu. \tag{165}$$

Where $y^{(n)}$ denotes the $n^{th}$ with derivative of y.

An ESO is constructed $$\dot{\hat{x}} = A\hat{x} + Bu + L(y - C\hat{x}). \tag{166}$$

The elements of the A matrix have ones on the super diagonal $$a_{i,j} = \begin{cases} 1 & i = j-1 \\ 0, & \text{otherwise.} \end{cases} \tag{167}$$

and the other matrices become $$B = [0_{n-1} \ b \ 0]^T, C = [1 \ 0_n] \tag{168}$$

where $0_n$ represents a 1×n zero vector.

For the sake of simplicity, the observer gain $L=[l_1, l_2, \ldots, l_{n+1}]^T$ is determined by placing the poles of the characteristic equation in one location.

$$\lambda(s) = |sI - (A - LC)| = (s + \omega_o)^{n+1} \tag{169}$$

As a result, each element in L becomes $$l_i = \frac{(n+1)!}{i!(n+1-i)!}\omega_o^i, i = 1, 2, \ldots, n+1. \tag{170}$$

A disturbance rejection control law is applied to (16) to dynamically cancel $f(y,\dot{y},w,t)$ using its estimate in $\hat{x}_{n+1}$.

$$u = (u_0 - \hat{x}_{n+1})/b \tag{171}$$

and reduce the plant to cascaded integrators at low frequencies.

$$y^{(n)} \approx u_0 \tag{172}$$

A point-to-point control law is then applied $$u_0 = k_0(r-\hat{x}_1) - k_1\hat{x}_2 - \ldots - k_{n-1}\hat{x}_n \tag{173}$$

to form the following closed loop transfer function.

$$G_{ry}(s) \approx \frac{k_0}{s^{n+1} + k_n s^n + \ldots + k_0} \tag{174}$$

For the sake of simplicity, it is set equal to a desired closed loop transfer function that provides a smooth step response.

$$G^*_{ry}(s) = \frac{\omega_c^{n+1}}{(s+\omega_c)^{n+1}} \tag{175}$$

and the controller gains are determined as $$k_i = \frac{n!}{i!(n-i)!}\omega_c^{n-i}, i = 0, \ldots, n-1. \tag{176}$$

For precise tracking, the inverse of (174) is added to the reference input of (173) as a prefilter, making $G_{ry} \approx 1$. As a result, the tracking control law becomes $$u_0 = k_0(r-\hat{x}_1) + \ldots + k_{n-1}(r^{(n-1)} - \hat{x}_n) + r^{(n)}. \tag{177}$$

A single control law is formed by combining (177) with (171)

$$u = k(x^* - \hat{x}) \tag{178}$$

where the new gains $k=[k_0, \ldots, k_n]/b$ and the feed forward terms $x^* = [r, \dot{r} \ldots, r^{(n)}]$.

Discrete Implementation of Tracking ADRC

In hardware, a discrete ESO is created.

$$\hat{x}(k+1) = \Phi\hat{x}(k) + \Gamma u(k) + L_p(y(k) - H\hat{x}(k)) \tag{179}$$

where $\bar{x}(k) = \hat{x}(k) + L_c(y(k) - yH\hat{x}(k))$ is the current time update.

The matrices are determined by applying zero order hold.

$$\Phi = \sum_{k=0}^{\infty}\frac{A^k T^k}{(k)!}, \Gamma = \sum_{k=0}^{\infty}\frac{A^k T^{k+1}}{(k+1)!}B, H = C \tag{180}$$

The discrete estimator gain vector $L_p$ is determined by placing the poles of the discrete characteristic equation in one location $$\lambda(z) = |zI - (\Phi - \Phi L_c H)| = (z-\beta)^{n+1} \tag{181}$$

Here, the relation between the discrete estimator poles and the continuous observer poles is given as $$\beta = e^{-\omega_o T}. \tag{182}$$

For example, the matrices for the second order system become $$\Phi = \begin{bmatrix} 1 & T & \frac{T^2}{2} \\ 0 & 1 & T \\ 0 & 0 & 1 \end{bmatrix}, \Gamma = \begin{bmatrix} b\frac{T^2}{2} \\ bT \\ 0 \end{bmatrix}, L_p = \begin{bmatrix} 3-3\beta \\ (1-\beta)^2(5+\beta)\frac{1}{2T} \\ (1-\beta)^3\frac{1}{T^2} \end{bmatrix} \quad (183)$$

$$H = [1 \ 0 \ 0].$$

A discrete control law is formed $$u(k) = k(\hat{x}^*(k) - \hat{x}(k)) \quad (184)$$

where the feed forward terms $\hat{x}^*(k) = [\hat{r}(k), \dot{\hat{r}}(k), \ldots, \hat{r}^{(n)}(k)]^T$.

The feed forward terms contain the reference input r and its derivatives. Since the reference input is generated by an algorithm and not a measured signal, it is often noise free. As a result, discrete differences are used for derivatives. A typical example of velocity and acceleration feed forward calculations are given.

$$\dot{\hat{r}}(k) = (r(k) - r(k-1))/T$$

$$\ddot{\hat{r}}(k) = (\dot{\hat{r}}(k) - \dot{\hat{r}}(k-1))/T \quad (185)$$

Since the states of the ESO are subtracted from these signals in the control law in (184), any difference in derivation between the ESO states and the feed forward terms causes dynamic errors. As a result, an estimator similar to the discrete ESO is used to estimate the feed forward terms, thus reducing the error and increasing performance. A model representing n+1 cascaded integrators and h−1 extended states is used to form a discrete estimator where only the model output signal r is available.

$$\hat{x}^*(k+1) = \Phi \bar{x}^*(k) + L_p(y(k) - H\hat{x}^*(k)) \quad (186)$$

where $\bar{x}^*(k) = \hat{x}^*(k) + L_c(y(k) - yH\hat{x}^*(k))$ is the current time update.

Another problem arises in discrete implementation of the ESO and feed forward estimators when signals within them grow large and create numerical errors and even instability due to increasing input signals. As a result, the two estimators are combined to form a single estimator that uses error as an input. Since the control law merely subtracts the states of each estimator, the matrices $\Phi, L_p, L_c, H$ are only functions of n+h, and $\Gamma$ only resides in the state feedback observer, (179) is subtracted from (186) to form $$\hat{z}(k+1) = \Phi\hat{z}(k) - \Gamma u(k) + L_p(e(k) - H\hat{z}(k)) \quad (187)$$

$$\hat{z}(k) = \begin{bmatrix} \hat{z}_1(k) \\ \ldots \\ \hat{z}_n(k) \\ \hat{z}_{n+1}(k) \end{bmatrix} = \begin{bmatrix} \hat{r}(k) - \hat{y}(k) \\ \ldots \\ \hat{r}^{(n-1)}(k) - \hat{y}^{(n-1)}(k) \\ \hat{r}^{(n)} - \hat{f}(k) \end{bmatrix}.$$

where e(k)=r(k)−y(k). This eliminates numerical errors and instability, cuts computation in half, and keeps all signals within the new estimator and control law small.

The current discrete estimator form of (187) becomes $$\hat{z}(k+1) = [\Phi - L_p H]\hat{z}(k) - \Gamma u(k) + L_p e(k)$$

$$\bar{z}(k) = [I - L_c H]\hat{z}(k) + L_c e(k) \quad (188)$$

where $\bar{z}(k)$ is the current time update and $L_p = \Phi L_c$.

Figure 48:
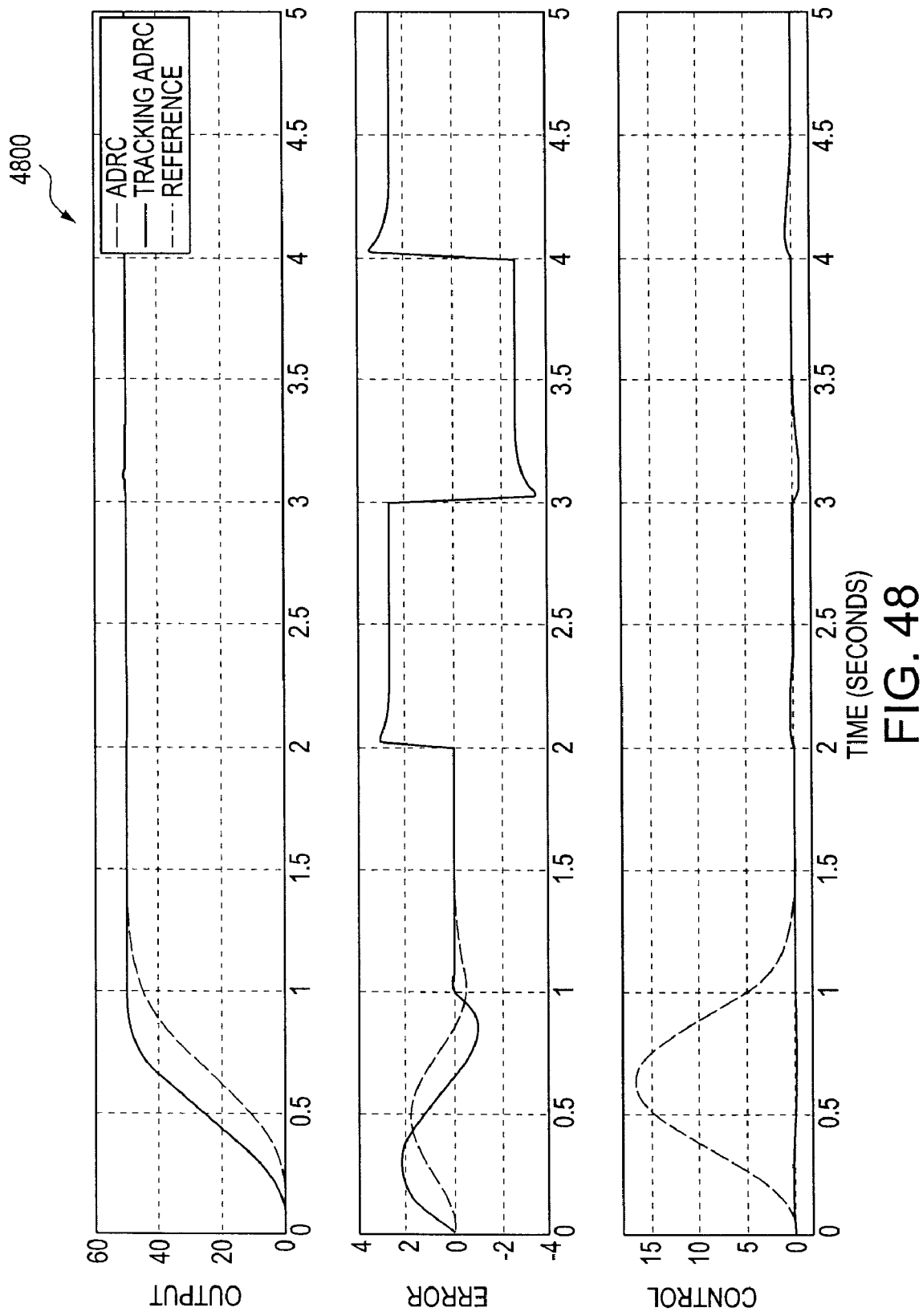
FIG. 48 is a plot of tracking of a transient profile, in accordance with an exemplary embodiment.

As proof of concept, a simulation example is given. The setup in (145) is used to track a motion profile reference signal with a final time $t_p=1$ second. The system is simulated with and without a tracking controller and the results are compared in 4800 of FIG. 48. Note that the tracking and reference traces are so close that they are on top of each other. With tracking control, the maximum error is reduced by a factor of 80 times during the initial transient shown in the first 1.5 seconds with only a slight increase in maximum control effort. There is also no adverse affect on the disturbance rejection property of the controller, shown when a square wave disturbance is added after 1.5 seconds.

This discrete tracking ADRC algorithm does not require an explicit mathematical model to achieve high performance. It has one or two tuning parameters that can be adjusted quickly, meaning that the level of expertise, time, and resources typically needed to construct a model, design a controller, and maintain performance is no longer required. This reduces manufacturing costs.

Multivariable ADRC

A general control method is given that can be applied to any MIMO system with the number of inputs greater than or equal to the number of outputs, not just jet engines. For proof of concept, it is then applied to dynamically decouple and control turbofan engines, i.e. jet engines. Since the jet engine is one of the most complex systems in existence, it is to be appreciated that this will provide a good example. If one is able to control it without knowing its mathematical model, which may be several thousand lines of code, then there is good chance this method will work on almost any plant. For example, this control system can be utilized with chemical processes, flight control of airplanes and missiles, CNC machine control, robotics, magnetic bearing, satellite attitude control, and process control.

Consider a system formed by a set of coupled $n^{th}$ order input-output equations $$y_1^{(n)} = f_1 + b_1 U \quad (189)$$
$$\vdots$$
$$y_q^{(n)} = f_q + b_q U$$

where $y_i^{(n)}$ denotes the $n^{th}$ derivative of $y_i$. The input $U=[u_1, \ldots, u_p]^T$, the output $y=[y_1, \ldots, y_q]^T$, and $b_i=[b_{i,1}, \ldots, b_{i,p}]$ for $i=1, 2, \ldots, q$ and $q \leq p$. Each equation consists of two terms, the instantaneous $b_i U$ and the dynamic $f_i(Y, \dot{Y}, \ldots, Y^{(n-1)})$. All interactions between equations, internal dynamics, and external disturbances are considered part of $f_i(Y, \dot{Y}, \ldots, Y^{(n-1)}, t)$. The system is rewritten $$Y^{(n)} = F + B_0 U \quad (190)$$

where $Y^{(n)} = [y_1^{(n)}, \ldots, y_q^{(n)}]^T$, and $F = [f_1, \ldots, f_q]^T$, and $B_0 = [b_1^T, \ldots, b_q^T]^T$. Assuming that n is known and that B is an q×p approximation of $B_0$ where both are fall row rank, a generalized disturbance is defined as $H \equiv F + (B_0 - B)U$. The system reduces to $$Y^{(n)} = H + BU. \quad (191)$$

The idea is to estimate H and cancel it in real time, reducing the plant to a set of cascaded integrators. In order to represent the plant with a set of state equations, let $X = [X_1^T, X_2^T, \ldots, X_{n+h}^T] = [Y^T, \dot{Y}^T, \ldots, Y^{(n-1)T}, H^T, \ldots, H^{(h-1)T}]^T$ such that $$\begin{cases} \dot{X}_1 = X_2 \\ \vdots \\ \dot{X}_{n-1} = X_n \\ \dot{X}_n = X_{n+1} + BU \\ \dot{X}_{n+1} = X_{n+2} + \dot{H} \\ \vdots \\ \dot{X}_{n+h} = H^{(h)} \end{cases} \quad (192)$$

In state space form, the plant is represented by $$\dot{X} = \overline{A}X + \overline{B}U + \overline{E}H^{(h)}$$

$$\hat{Y} = \overline{C}X \quad (193)$$

where $\hat{X} = [\hat{X}_1^T, \hat{X}_2^T, \ldots, \hat{X}_{n+h}^T]^T$, $0_q$ and $I_q$ are q×q zero and identity matrices, and $\overline{A}$ is an q(n+h) dimensional square matrix.

$$\overline{A} = \begin{bmatrix} 0_q & I_q & 0_q & \cdots & 0_q \\ 0_q & 0_q & I_q & \cdots & 0_q \\ \vdots & \vdots & \vdots & \ddots & \vdots \\ 0_q & 0_q & 0_q & \cdots & I_q \\ 0_q & 0_q & 0_q & \cdots & 0_q \end{bmatrix}, \overline{B} = \begin{bmatrix} 0_{q\times q} \\ 0_{q\times q} \\ \vdots \\ B \\ 0_{qh\times p} \end{bmatrix}, \overline{E} = \begin{bmatrix} 0_q \\ 0_q \\ \vdots \\ 0_q \\ I_q \end{bmatrix} \quad (194)$$

$$\overline{C} = [I_q \quad 0_q \quad 0_q \quad \cdots \quad 0_q]$$

An observer is then designed from the state space model where $\overline{L} = [L_1, \ldots, L_{n+h}]^T$ $$\dot{\hat{X}} = \overline{A}\hat{X} + \overline{B}U + \overline{L}(Y - \hat{Y})$$

$$\hat{Y} = \overline{C}\hat{X} \quad (195)$$

In (195), the state equations of the multivariable ESO become $$\begin{cases} \dot{\hat{X}}_1 = \hat{X}_2 + L_1(Y - \hat{Y}) \\ \vdots \\ \dot{\hat{X}}_{n-1} = \hat{X}_n + L_{n-1}(Y - \hat{Y}) \\ \dot{\hat{X}}_n = \hat{X}_{n+1} + L_n(Y - \hat{Y}) + BU \\ \dot{\hat{X}}_{n+1} = \hat{X}_{n+2} + L_{n+1}(Y - \hat{Y}) \\ \vdots \\ \dot{\hat{X}}_{n+h} = L_{n+h}(Y - \hat{Y}) \end{cases} \quad (196)$$

The observer gains $L_1, L_2, \ldots, L_{n+h}$ are q×q matrices, in general. However, for the sake of tuning simplicity, the gains are defined to form q parallel observer loops for $j = 1, 2, \ldots, n+h$.

$$L_j = \mathrm{diag}(l_{j,1}, l_{j,2}, \ldots, l_{j,q}) \quad (197)$$

Each loop then has its n+h poles placed in one location, for the sake of further simplification.

$$\lambda_o(s) = |sI - \overline{A} + \overline{LC}| \prod_{i=1}^{q} (s + \omega_{o,i})^{n+h} \quad (198)$$

Solving for each gain as a function of $\omega_{o,i}$ results in $$l_{j,i} = \frac{(n+h)!}{j!(n+h-j)!} \omega_{o,i}^j. \quad (199)$$

With $B^+$ defined as the right inverse of B, a disturbance rejection control law is applied to (191), effectively cancelling H at low frequencies.

$$U = B^+(U_0 - \hat{X}_{n+1}) \quad (200)$$

This allows a kind of feedback linearization and decoupling to occur which reduces the plant to a set of parallel n-integrator systems at low frequencies.

$$Y^{(n)} \approx U_0 \quad (201)$$

At this point, any number of control methods may be used. A simple control law with no integrators is proposed $$U_0 = K_0(Y^* - \hat{X}_1) - K_1\hat{X}_2 - \ldots - K_{n-1}\hat{X}_n \quad (202)$$

where $Y^*$ is the desired trajectory for Y and the controller gains $K_0, K_1, \ldots, K_{n-1}$ are q×q matrices in general. However, for the sake of tuning simplicity, the controller gains are defined to form q parallel control loops for $j = 0, 1, \ldots, n-1$.

$$K_j = \mathrm{diag}(k_{j,1}, k_{j,2}, \ldots, k_{j,q}) \quad (203)$$

Each control loop has its n poles placed in one location, for the sake of further simplification.

$$\lambda_c(s) = |sI - \overline{A} + \overline{K}| = \prod_{i=1}^{q} (s + \omega_{c,i})^n \quad (204)$$

Solving for each gain as a function of $\omega_{c,i}$ results in $$k_{j,i} = \frac{n!}{j!(n-j)!} \omega_{c,i}^{n-j}. \quad (205)$$

Typically, a nonsingular $B^{-1}$ can be approximated by a diagonal matrix of reciprocal elements, since inaccuracies in B can be accounted for in H.

The observer is simplified to remove B by substituting (200) into (196).

$$\begin{cases} \dot{\hat{X}}_1 = \hat{X}_2 + L_1(Y - \hat{Y}) \\ \vdots \\ \dot{\hat{X}}_{n-1} = \hat{X}_n + L_{n-1}(Y - \hat{Y}) \\ \dot{\hat{X}}_n = U_0 + L_n(Y - \hat{Y}) \\ \dot{\hat{X}}_{n+1} = \hat{X}_{n+2} + L_{n+1}(Y - \hat{Y}) \\ \vdots \\ \dot{\hat{X}}_{n+h} = L_{n+h}(Y - \hat{Y}) \end{cases} \quad (206)$$

The commonly used SISO form of ADRC is, in fact, the q=1 case.

Multivariable Tracking ADRC

A tracking controller can be used in place of (202) to improve the tracking error.

$$U_0 = K_0(Y^* - \hat{X}_1) + \ldots + K_{n-1}(Y^{*(n-1)} - \hat{X}_n) + Y^{*(n)} \quad (207)$$

Multivariable Discrete ESO

To output the states, the ESO in (194) and (195) is rewritten as $$\dot{\bar{X}} = [\bar{A} - \bar{L}\bar{C}]\hat{X} + [\bar{B}, \bar{L}][U, Y]^T$$

$$Y_c = \hat{X} \tag{208}$$

where $Y_c$ is the state output. It can then be discretized, forming a multivariable CDESO $$\hat{X}(k+1) = [\bar{\Phi} - \bar{L}_p \bar{H}]\hat{X}(k) + [\bar{\Gamma}\bar{L}_p][U(k)Y(k)]^T$$

$$\bar{X}(k) = [I_{q(n+h)} - \bar{L}_c \bar{H}]\hat{X}(k) + [0_{q(n+h) \times p} \bar{L}_c][U(k)Y(k)]^T \tag{209}$$

where $\bar{L}_c = [L_{c,1}, \ldots, L_{c,n+h}]^T$, $L_{c,j} = \text{diag}(lc_{j,1}, lc_{j,2}, \ldots, lc_{j,q})$, and similar notation is true for $\bar{L}_p$. The simplest way to determine the matrices is the case when (209) is equivalent to q parallel SISO loops. To show an example of how the matrices are directly extended from their SISO counterparts, the matrices for a $CDESO_{2,1}$ as a result of ZOH become $$\Phi = \begin{bmatrix} I_q & I_q T & I_q \frac{T^2}{2} \\ 0_q & I_q & I_q T \\ 0_q & 0_q & I_q \end{bmatrix}, \Gamma = \begin{bmatrix} BT \\ B \\ 0_{q \times q} \end{bmatrix}, \tag{210}$$

$$\begin{bmatrix} lc_{1,i} \\ lc_{2,i} \\ lc_{3,i} \end{bmatrix} = \begin{bmatrix} 1 - \beta_i^3 \\ (1 - \beta_i)^2(1 + \beta_i)\frac{3}{2T} \\ (1 - \beta_i)^3 \frac{1}{T^2} \end{bmatrix}.$$

$$\bar{H} = [I_q \ 0_q \ 0_q]$$

Turbofan Model and Design Specifications

Figure 30:
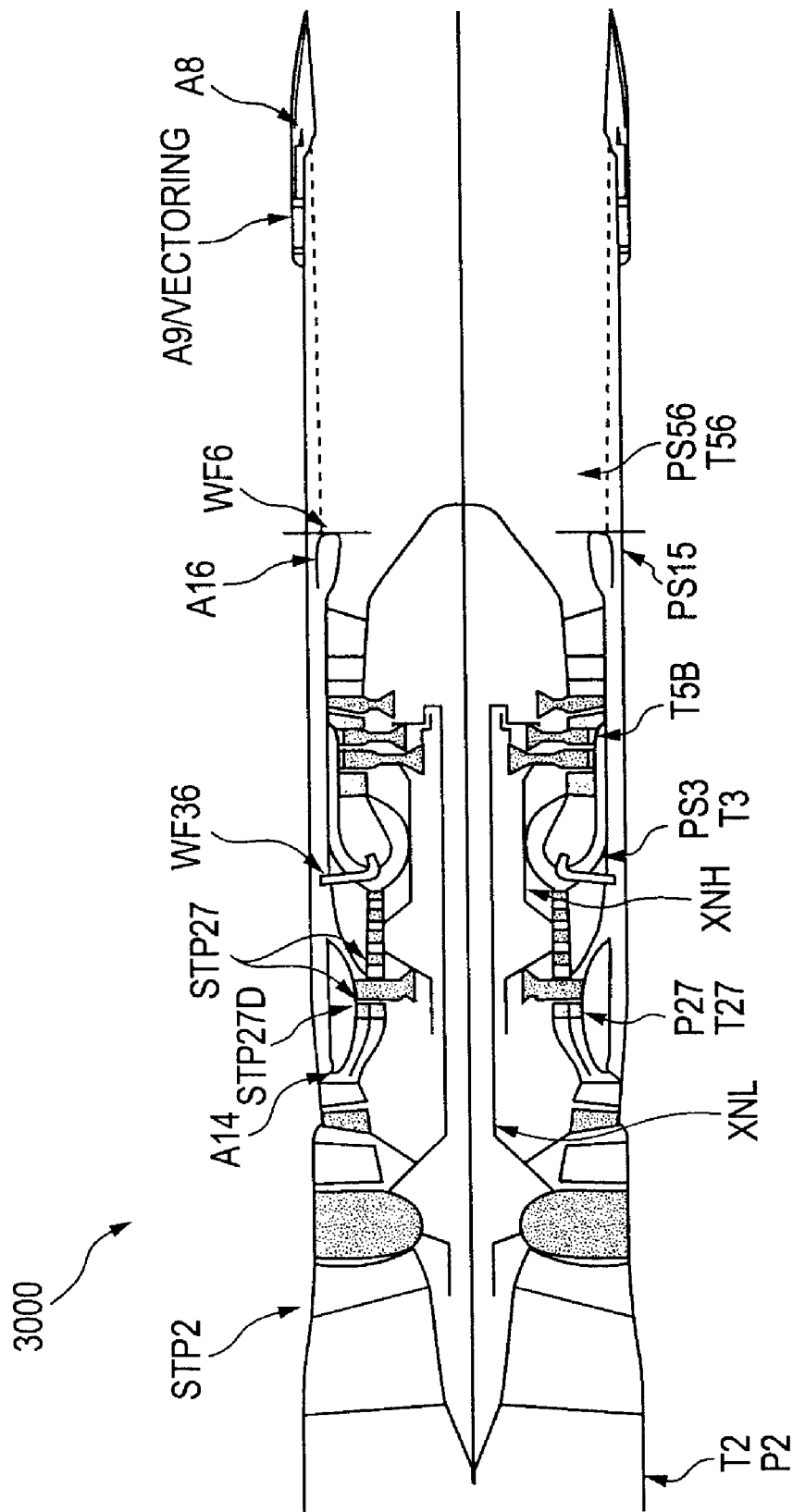
FIG. 30 is a schematic of a turbo fan in the Modular Aero-Propulsion System Simulation (MAPSS) package, in accordance with an exemplary embodiment.

FIG. 30 shows an engine schematic from a turbofan engine 3000. In this example, a Modular Aero-Propulsion System Simulation (MAPSS) package, developed by Parker and Guo, (2003) at the NASA Glenn Research Center, is employed. The package is used because it is comprehensive enough to simulate any two spool jet engine. A component-level model (CLM) within MAPSS consists of a two-spool, high pressure ratio, low bypass turbofan with mixed-flow afterburning.

Figure 31:
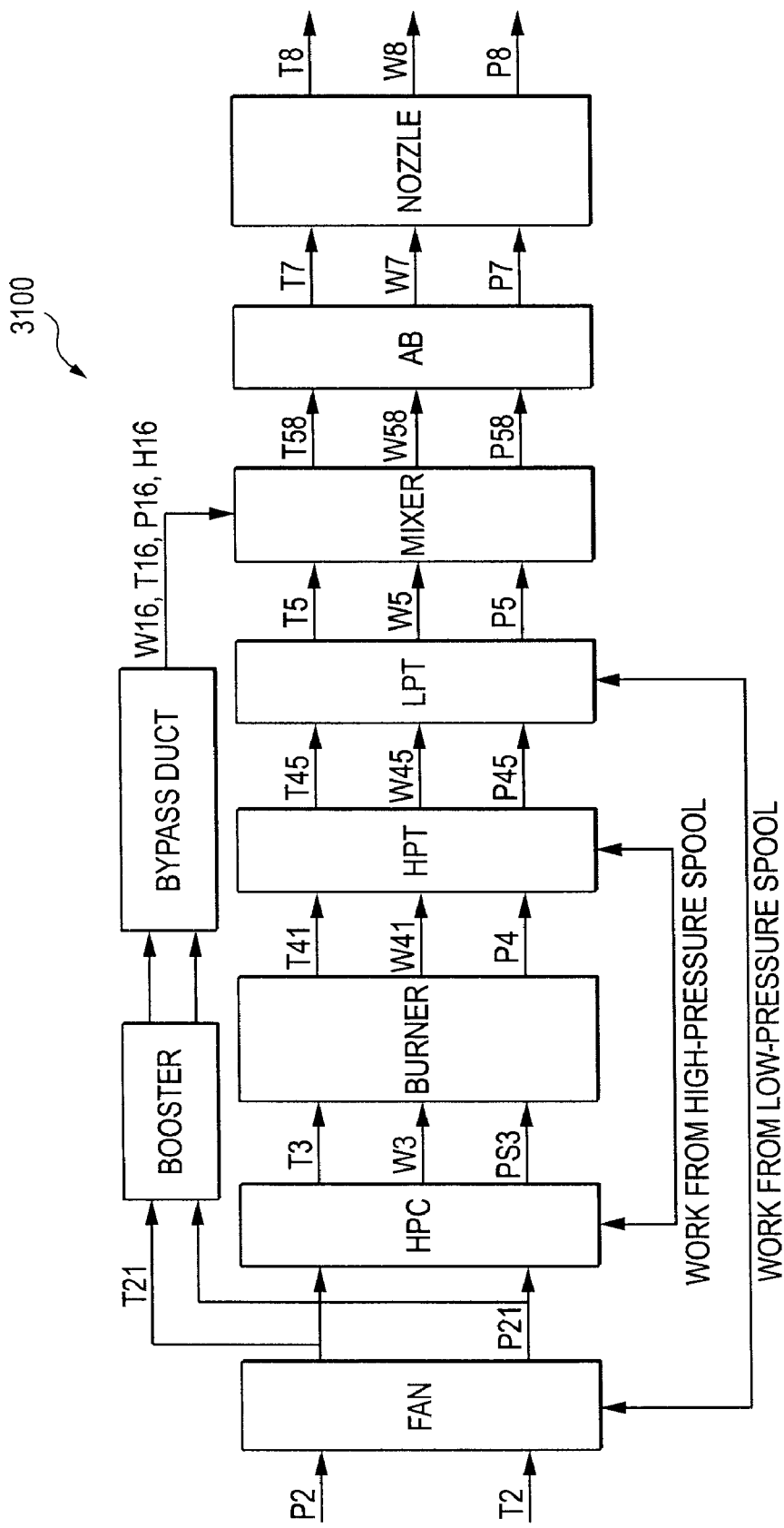
FIG. 31 is a component-level model of a turbofan engine within the MAPSS package, in accordance with an exemplary embodiment.

FIG. 31 illustrates a top-level control diagram 3100 of the turbofan engine 3000. The model consists of hundreds of coupled equations and look-up tables that ensure mass, momentum, and energy balances throughout while modeling gas properties effectively. Mathematical details can be found in (Mattingly, J. D. (1996). "Elements of Gas Turbine Propulsion", McGraw-Hill, Inc.; Boyce, M. P. (2002). "Gas Turbine Engineering Handbook," Second Edition, Butterworth-Heinemann; Cumpsty, N. (2002). "Jet Propulsion: A Simple Guide," Cambridge University Press.

In general, the CLM is defined by two nonlinear vector equations $$\dot{x}_{CLM} = f(x_{CLM}, u_{CLM}, p, \text{alt}, xm)$$

$$y_{CLM} = g(x_{CLM}, u_{CLM}, p, \text{alt}, xm) \tag{211}$$

that are functions of a 3×1 state vector ($x_{CLM}$), a 7×1 input vector ($u_{CLM}$), a 10×1 health parameter vector (p), altitude (alt), and Mach number (xm). A 22×1 vector of sensor outputs ($y_{CLM}$) is combined to calculate thrust (fn), fan stall (sm2) and over-speed (pcn2r) margins, engine temperature ratio (etr), and pressure ratios of the engine (eprs), liner (lepr), a core (cepr). These performance parameters form the controlled output.

$$Y = [\text{fn, eprs, lepr, etr, sm2, pcn2r, cepr}]^T \tag{212}$$

Each of the seven inputs ($u_{CLM}$) is controlled by a separate SISO actuator consisting of a torque motor and servomechanism with saturation limits for position, velocity, and current. The first three actuators drive the fuel flow (wf36), variable nozzle exit area (a8), and rear bypass door variable area (a16), respectively. These actuator inputs form the control signal.

$$U = [\text{wf36}_{act}, \text{a8}_{act}, \text{a16}_{act}]^T \tag{213}$$

The remaining four actuators drive stator and guide vane angles using steady state schedules within the primary control loop, ensuring safe operating limits.

The goal of the control system is to achieve a fast thrust response with minimal overshoot and zero steady state error, while maintaining safe rotor speeds, pressure and temperature limits, and stall margins. In MAPSS, the supplied multimode controller consists of four multivariable PI regulators, each controlling only three outputs at one time.

$$Y_1 = [\text{fn, eprs, lepr}]^T$$

$$Y_2 = [\text{fn, etr, lepr}]^T$$

$$Y_3 = [\text{fn, smn2, lepr}]^T$$

$$Y_4 = [\text{pcn2r, cepr, lepr}]^T \tag{214}$$

The first regulator controls eprs at low speeds, while the second regulator controls etr at high speeds. The third and fourth regulators actively control limits associated with the fan components, namely the fan stall and over-speed margins when their limits are approached. Limits associated with the engine core are met by acceleration and deceleration schedules on fuel flow (Kreiner, A. and K. Lietzau (2003). "The Use of Onboard Real-Time Models for Jet Engine Control." *MTU Aero Engines*, Germany). These schedules along with actuator limits are then placed to constrain the outgoing control signal.

Multivariable ADRC Design Procedure with a Jet Engine Example

A generic design procedure is given for multivariable ADRC, using the application to the MAPPS jet engine 3000 in FIG. 30 as an example. Test conditions are then discussed for the jet engine, followed by simulation results that compare the new algorithm to the current one, showing that similar performance can be achieved with much less design effort.

The design procedure for applying any of the new disturbance rejection techniques is uniquely characterized by the plant representation.

$$Y^{(n)} = H + BU \tag{215}$$

In (215), the size of the input vector U and output vector Y should be known. The design procedure involves the determination of n and B as well as a method of tuning the controller.

A generic procedure is given, followed by a detailed explanation of each step with examples specific to the jet engine application.

1. Determine the number of inputs p and outputs q of the system. Use multimode control if q>p.
2. Determine the high frequency gain B of the system.
3. Determine the relative order n of the system. If unknown, begin by assuming n=1.
4. Determine the number of extended states h. A value of h=1 is usually sufficient.
5. Apply the new algorithm to the system.

6. Run a closed loop simulation or hardware test in order to tune the controller and observer bandwidths.

7. Run a closed loop simulation or hardware test in order to tune $B^+$, the right inverse of B. Repeat step six as required.

Step One: The first step is to determine the number of control inputs p and controlled outputs q of the plant. If q>p, then multi-mode control should be used to make $q_j \leq p_j$ for each of the j sub-controllers. It is preferable to make $q_j=p_j$ which produces a square B matrix that allows the diagonal elements to become tuning parameters. Note that when B is a square matrix, $B^+=B^{-1}$. A diagonal B matrix also permits the new technique to be reduced to multiple SISO techniques.

The jet engine in MAPPS, for example, has three actuator inputs that control seven performance parameter outputs. As a result, the jet engine controller consists of four separate regulators, each controlling only three outputs at a time. In this research, a simple form of multivariable ADRC using Euler integration is applied to the three-input three-output low speed regulator section and tested in simulation. This approach will isolate the affects that blending of multiple modes may have on the results.

Step Two: The second step is to determine the high frequency gain B of the system. This matrix will drastically change for different values of relative order n. The trick is that n must be known in order to determine B, and B must be known to determine n, a circular argument. As a result, steps two and three are interchangeable and an iterative process may be used in finding n and B. Nevertheless, there is only a problem if both are unknown. If this is the case, use the identity matrix for B to first determine n and then iterate. The B matrix can also be tuned in step seven. In practice, $B^+$ needs to be initially within fifty percent of its true value and such a broad range is frequently known. However, if it is unknown or the system is too complex, then various system identification techniques can be used.

In MAPSS, the control signals are scaled to produce the proper units for each actuator input allowing each control signal to be within the same relative range. Thus, a logical starting point for B in the low speed regulator is the identity matrix.

Step Three: The third step is to determine the relative order n of the plant. The overall structure of the observer and controller depends on n which may or may not be the actual order of the system, depending on which dynamics are dominant. The idea is to find n=1, 2, or 3 that produces the smallest H, the smallest control signal, or the best closed loop results. Sometimes n is known or can be derived from a model of physical relationships. If none of the above techniques work, the last resort is trial and error. In this situation, start by assuming the system is first order and complete the remaining steps. Then assume the system is second order and repeat the process to see if the results are better. Then try third order, etc. Lower order is usually better.

Another consideration is that n can be determined for each plant input-output pair. For a particular output, the input yielding the lowest order with the highest gain is the most direct form of control and therefore should be used.

Since not all of the engine's states are measurable in MAPPS, the model for low speed regulation is represented as a nonlinear input-output vector function. Without explicit knowledge of system order, the simplest and lowest order case is first attempted.

$$\dot{Y}_n = F(Y_1, U, t) \tag{216}$$

When a 3×3 matrix B is used to approximate the actual high frequency gain $B_0$, the signal H is defined as $$H = F(Y, U, t) - B_0 U \tag{217}$$

The system then reduces to a form that has distinct terms to represent any internal or external dynamics and an instantaneous input.

$$\dot{Y} \approx H + BU \tag{218}$$

After running simulation tests at higher orders, first order was found to be sufficient for MAPPS. This also makes sense since the CLM is represented as a first order state space equation and the actuator dynamics are fast enough to be neglected.

Step Four: The fourth step is to determine the number of extended states h. This affects the overall structure of the ESO. For ADRC, select h=1, 2, or 3 based on the system type of the disturbance H or an external disturbance. The assumption h=1 will suffice in most cases and therefore is used in the remaining examples for the sake of clarity. Similar is true for determining the number of extended states m in the control law when using generalized PID.

Figure 32:
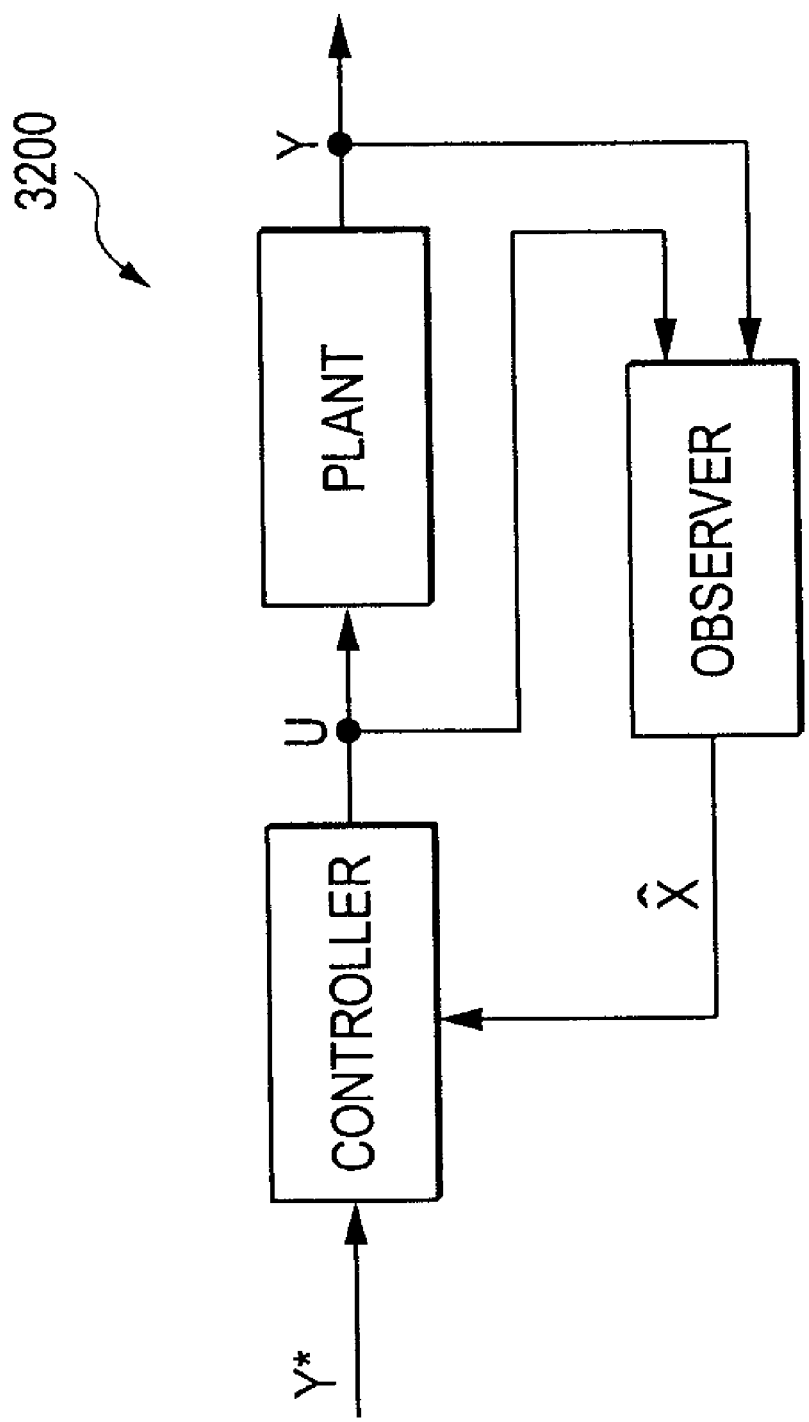
FIG. 32 illustrates a closed loop control system that employs an observer.

Step Five: The fifth step is to apply the new algorithm to the system. The overall configuration is shown in FIG. 32. The structure of the observer and controller depends on the integer values selected for n and h. The most frequently used cases are now explicitly given for multivariable ADRC with Euler integration. In general, U is a p×1 vector, Y is a q×1 vector, B is a q×p matrix, and $L_j$ and $K_j$ are q×q matrices.

When n=1 and h=1, the ESO equations become $$\dot{\hat{X}}_1 = \hat{X}_2 + L_1(Y - \hat{X}_1) + BU$$

$$\dot{\hat{X}}_2 = L_2(Y - \hat{X}_1) \tag{219}$$

and the controller is represented by $$U = B^+(K_p(Y^* - \hat{X}_1) - \hat{X}_2) \tag{220}$$

Figure 33:
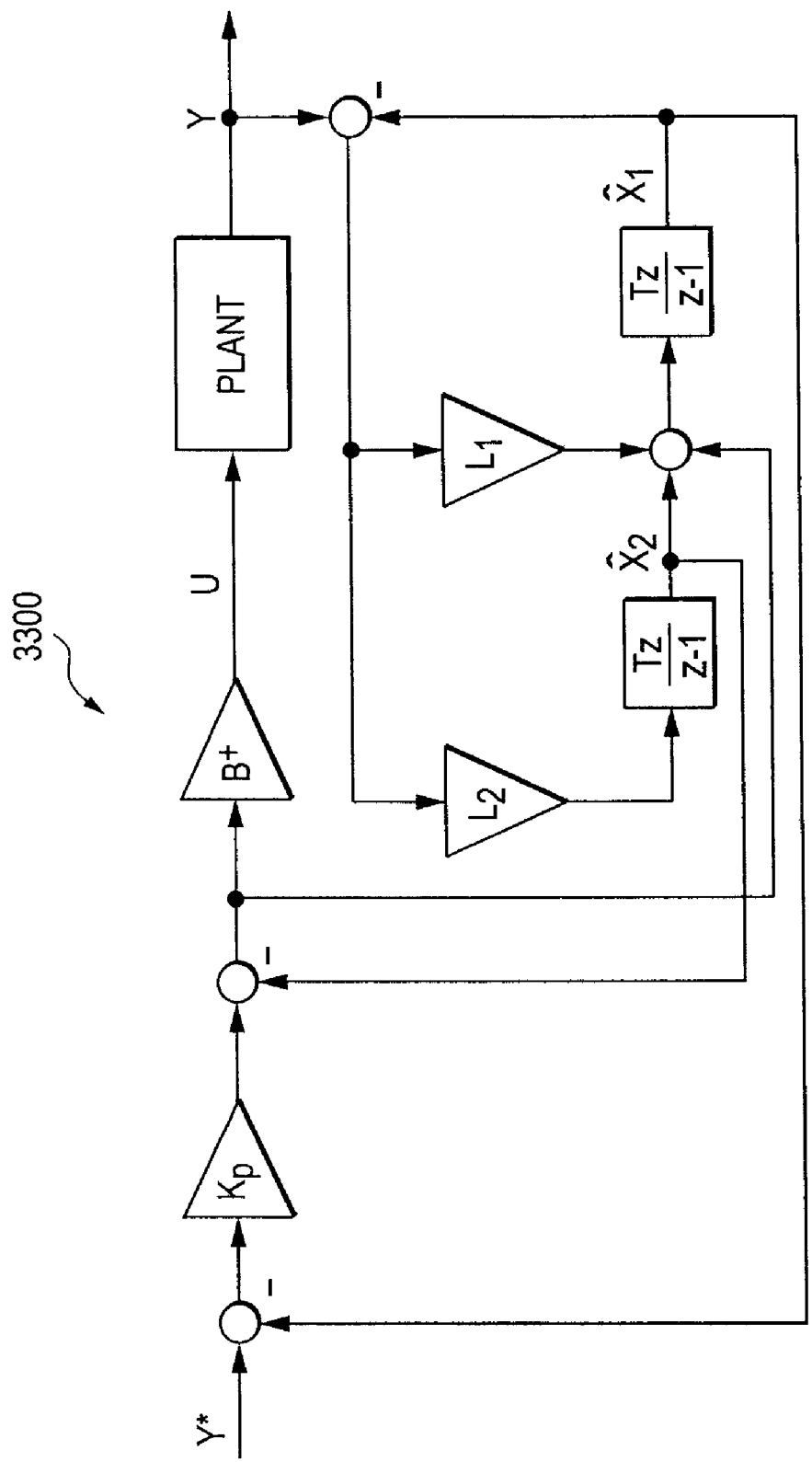
FIG. 33 illustrates an ADRC for a first order system, in accordance with an exemplary embodiment.

By applying (219) and (220), the control configuration is then shown in FIG. 33. Notice that since the input to $B^+$ is essentially BU, it is used as an input to the ESO instead of multiplying U by B. In doing so, there is only one matrix to adjust containing elements of B and it acts to scale the plant and allow the rest of the algorithm to be designed for a unity gain plant.

When n=2 and h=1, the ESO equations become $$\dot{\hat{X}}_1 = \hat{X}_2 + L_1(Y - \hat{X}_1)$$

$$\dot{\hat{X}}_2 = \hat{X}_3 + L_2(Y - \hat{X}_1) + BU$$

$$\dot{\hat{X}}_3 = L_3(Y - \hat{X}_1) \tag{221}$$

and the controller is represented by $$U = B^+(K_p(Y^* - \hat{X}_1) - K_d \hat{X}_2 - \hat{X}_3) \tag{222}$$

Figure 34:
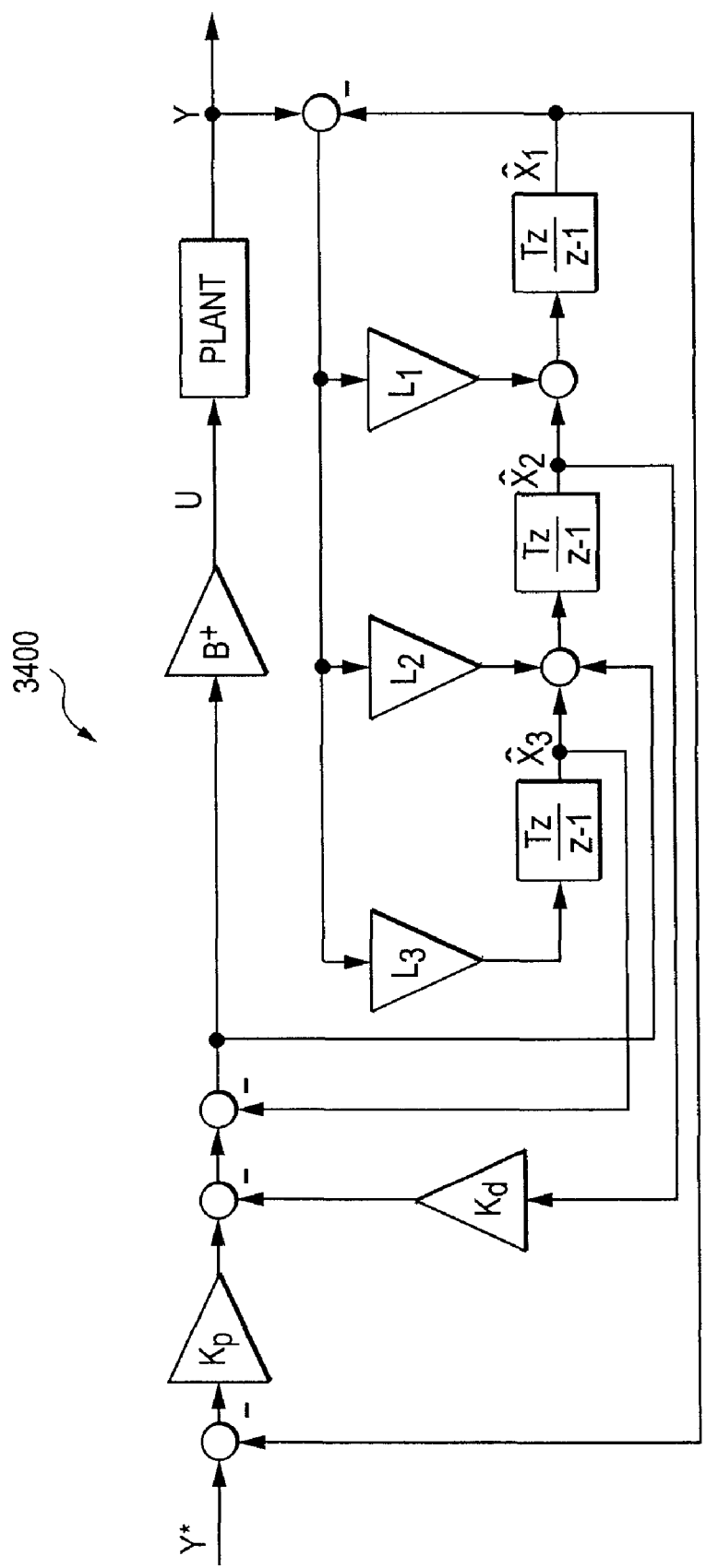
FIG. 34 illustrates an ADRC for a second order system, in accordance with an exemplary embodiment.

By applying (221) and (222), the control configuration is then shown in FIG. 34.

The first order plant in (218) used for low speed regulation is represented by state equations where the extended state $X_2$ is assigned to track the general disturbance H $$\dot{X}_1 = X_2 + BU$$

$$\dot{X}_2 = \dot{H} \tag{223}$$

and the 3×1 state vectors are defined as $X = [X_1, X_2]^T = [Y^T, H^T]^T$. By also defining the estimated states as $\hat{X} = [\hat{X}_1^T, \hat{X}_2^T]^T$, an ESO is designed from (223).

$$\dot{\hat{X}} = \hat{X}_2 + L_1(Y - \hat{X}_1) + BU$$

$$\dot{\hat{X}}_2 = L_2(Y - \hat{X}_1) \tag{224}$$

A disturbance rejection control law is then implemented $$U=B^+(U_0-\hat{X}_2) \quad (225)$$

to decouple the plant, reducing it to three parallel integrators at low frequencies $$\dot{Y} \approx U_0 \quad (226)$$

whereby a simple proportional control law is applied.

$$U_0=K_1(Y^*-\hat{X}_1) \quad (227)$$

The entire algorithm consists of (219) and (220) and is shown implemented in FIG. 33.

$$\dot{\hat{X}}_1=\hat{X}_2+BU+L_1(Y-\hat{X}_1)$$

$$\dot{\hat{X}}_2=L_2(Y-\hat{X}_1)$$

$$U=B^+(K_1(Y^*-\hat{X}_1)-\hat{X}_2) \quad (228)$$

The original jet engine regulators incorporate PID controllers that are subject to integrator windup because the integrator input is a function of the controller error R−Y where convergence to zero is affected by plant saturation. An interesting benefit of replacing these regulators with ADRC is that the integrators within ADRC do not wind up because their inputs are a function of the observer error $Y-\hat{X}_1$ where convergence to zero is not affected by plant saturation. As a result, additional anti-windup mechanisms are no longer required.

Figure 35:
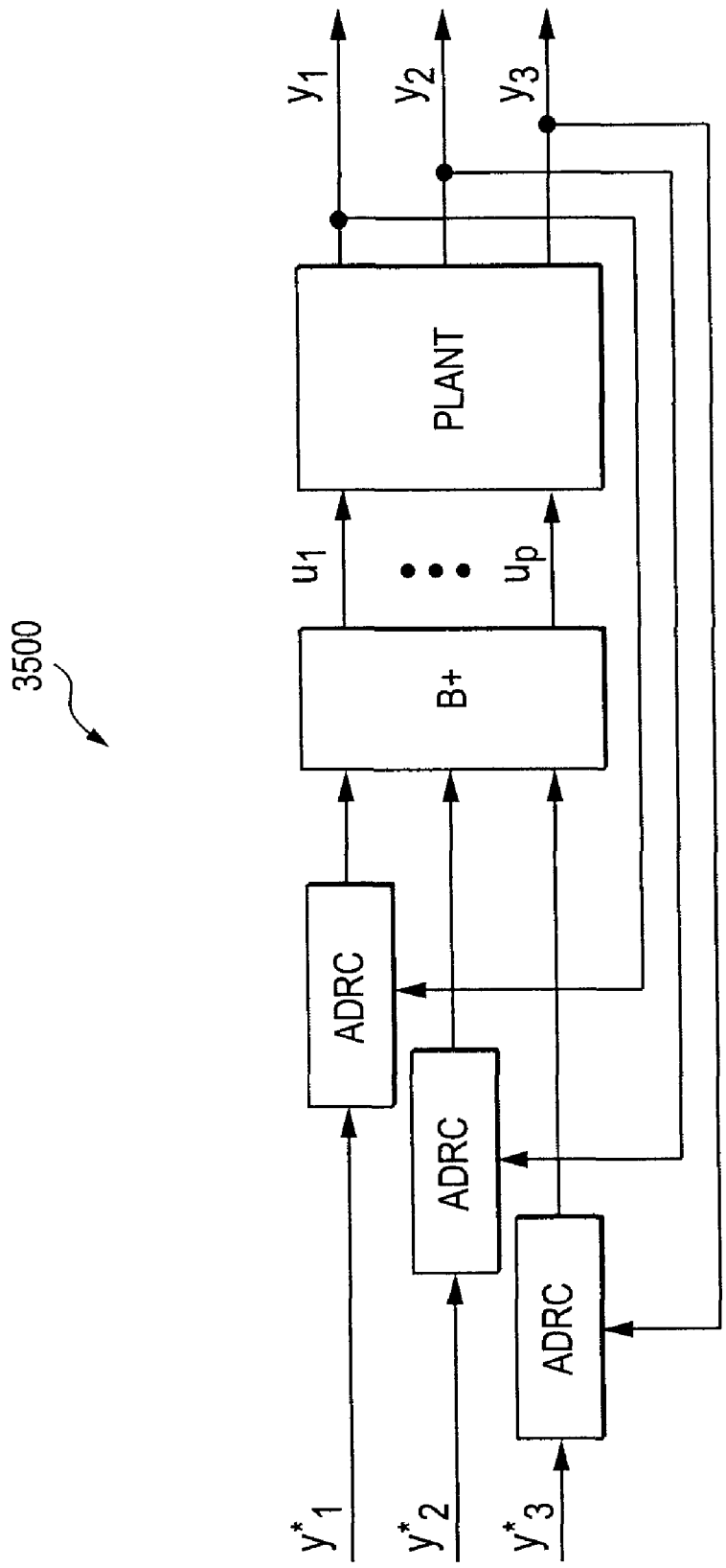
FIG. 35 illustrates a single-input single-output unity gain closed loop system, in accordance with an exemplary embodiment.

Step Six: The sixth step is to run the closed loop system in order to tune the controller and observer bandwidths. In general, $L_j$ and $K_j$ are q×q matrices. However, when $L_j$ and $K_j$ are selected as diagonal matrices, the ADRC algorithm reduces to a set of SISO controllers, one to control each output. An example is given in FIG. 35 for a three output system. A tuning procedure for this type of configuration is proposed.

When n=1 and h=1, the resulting observer and controller gain matrices become $$L_1=\text{diag}(2\omega_{o,1}, 2\omega_{o,2}, \ldots, 2\omega_{o,q})$$

$$L_2=\text{diag}(\omega_{o,1}^2, \omega_{o,2}^2, \ldots, \omega_{o,q}^2) \quad (229)$$

$$K_p=\text{diag}(\omega_{c,1}, \omega_{c,2}, \ldots \omega_{c,q}) \quad (230)$$

When n=2 and h=1, the resulting observer and controller gain matrices become $$L_1=\text{diag}(3\omega_{o,1}, 3\omega_{o,2}, \ldots, 3\omega_{o,q})$$

$$L_2=\text{diag}(3\omega_{o,1}^2, 3\omega_{o,2}^2, \ldots, 3\omega_{o,q}^2)$$

$$L_3=\text{diag}(\omega_{o,1}^3, \omega_{o,2}^3, \ldots, \omega_{o,q}^3) \quad (231)$$

$$K_p=\text{diag}(\omega_{c,1}^2, \omega_{c,2}^2, \ldots, \omega_{c,q}^2)$$

$$K_d=\text{diag}(2\omega_{c,1}, 2\omega_{c,2}, \ldots, 2\omega_{c,q}) \quad (232)$$

Preliminary system identification is often unnecessary because the only design parameters are $\omega_c$ and b and they have a direct impact on the bandwidth and overshoot of the output, meaning they can easily be adjusted by the user. In practice, 1/b needs to be initially within fifty percent of its true value, the total inertia in a second order system, and such a broad range is frequently known.

When a step input is applied to the system, normalized settling times for $\omega_c=1$ are shown in Table VIII.

TABLE VIII

NORMALIZED SETTLING TIMES FOR VARIOUS ORDERS

| n + h | 1 | 2 | 3 | 4 | 5 |
|---|---|---|---|---|---|
| $t_n$ | 3.9124 | 5.8342 | 7.5169 | 9.0842 | 10.5807 |

Since a step is the fastest possible profile, the minimum settling time of the system for a given bandwidth then becomes $$t_s=t_n/\omega_c \quad (233)$$

When faced with time specifications, this can serve as a starting point for tuning $\omega_c$ or it can determine if a solution is even feasible.

When a profile with settling time $t_p$ is used, the total settling time of the system is then approximated by $$t_t \approx t_p+t_s \quad (234)$$

A procedure to tune $\omega_{c,i}$ and $\omega_{o,i}$ for each output i is now given, dropping the i subscript for the sake of clarity. The idea is to set the controller bandwidth as high as possible. A profile is then typically used to achieve a slower settling time or to meet control signal constraints, but a step is used if the fastest possible response is desired without regard to exact trajectory.

1. Set $\omega_c$ using (233) according to initial specifications.
2. Set $\omega_o=2\sim10\omega_c$ as a rule of thumb. The exact relation will be based on the proximity of the desired closed loop bandwidth to the dominant poles of the system, resonant frequencies, and noise.
3. Run the closed loop system and increase $\omega_c$ and $\omega_o$ together to a point just before oscillation appears in the control signal.
4. Adjust the relation between $\omega_c$ and $\omega_o$ to meet the design specifications for noise level and disturbance rejection.

In MAPPS, all three observer bandwidths are set equal, $\omega_{o,1}=\omega_{o,2}=\omega_{o,3}=\omega_o$, for the sake of simplicity and proof of concept. This makes the observer gain matrices a function of one parameter.

$$L_1=2\omega_o I_3, L_2=2\omega_o^2 I_3 \quad (235)$$

All three controller bandwidths are also set equal, $\omega_{c,1}=\omega_{c,2}=\omega_{c,3}=\omega_c$, for the same reason, making the controller gain matrix a function of one parameter as well.

$$K_p=\omega_c I_3 \quad (236)$$

Step Seven: The seventh step is to run the closed loop system in order to tune $B^+$. Although B is determined using system identification techniques in step two, it acts as a control signal gain that directly affects overshoot of the closed loop system. As a result, B can also be tuned by adjusting its elements to the point just before overshoot appears in the output. It is preferable to have as many inputs as outputs to facilitate tuning. This is demonstrated by first expanding the vector products $U=[u_1, \ldots, u_p]^T$ and $b_i=[b_{i,1}, \ldots, b_{i,p}]^T$ in the following $n^{th}$ order input-output equations.

$$y_1^{(n)} = f_1 + b_1 U \quad (237)$$

$$\vdots$$

$$y_q^{(n)} = f_q + b_q U$$

to produce:

$$y_1^{(n)} = f_1 + b_{1,1}u_1 + \ldots + b_{1,q}u_q \quad (238)$$
$$y_2^{(n)} = f_2 + b_{2,1}u_1 + \ldots + b_{2,q}u_q$$
$$\vdots$$
$$y_q^{(n)} = f_q + b_{q,1}u_1 + \ldots + b_{q,q}u_q$$

In the $i^{th}$ state equation, the input $u_i$ is used to control the output $y_i$, and the rest of the inputs are combined into a new disturbance $h_i$.

$$h_1 = f_1 + b_{1,2}u_2 + \ldots + b_{1,q}u_q \quad (239)$$
$$h_1 = f_2 + b_{2,1}u_2 + b_{2,3}u_3 + \ldots + b_{2,q}u_q$$
$$\vdots$$
$$h_q = f_q + b_{q,1}u_1 + \ldots + b_{q-1,q-1}u_{q-1}$$

The plant is rewritten where only the diagonal elements of B are considered.

$$y_1^{(n)} = h_1 + b_{1,1}u_1 \quad (240)$$
$$y_2^{(n)} = h_2 + b_{2,2}u_2$$
$$\vdots$$
$$y_q^{(n)} = h_q + b_{q,q}u_q$$

The inverse of each diagonal element then becomes a tuning parameter of an individual SISO control loop.

$$B^{-1} = \text{diag}(b_1^{-1}, b_2^{-1}, \ldots, b_q^{-1}) \quad (241)$$

Figure 36:
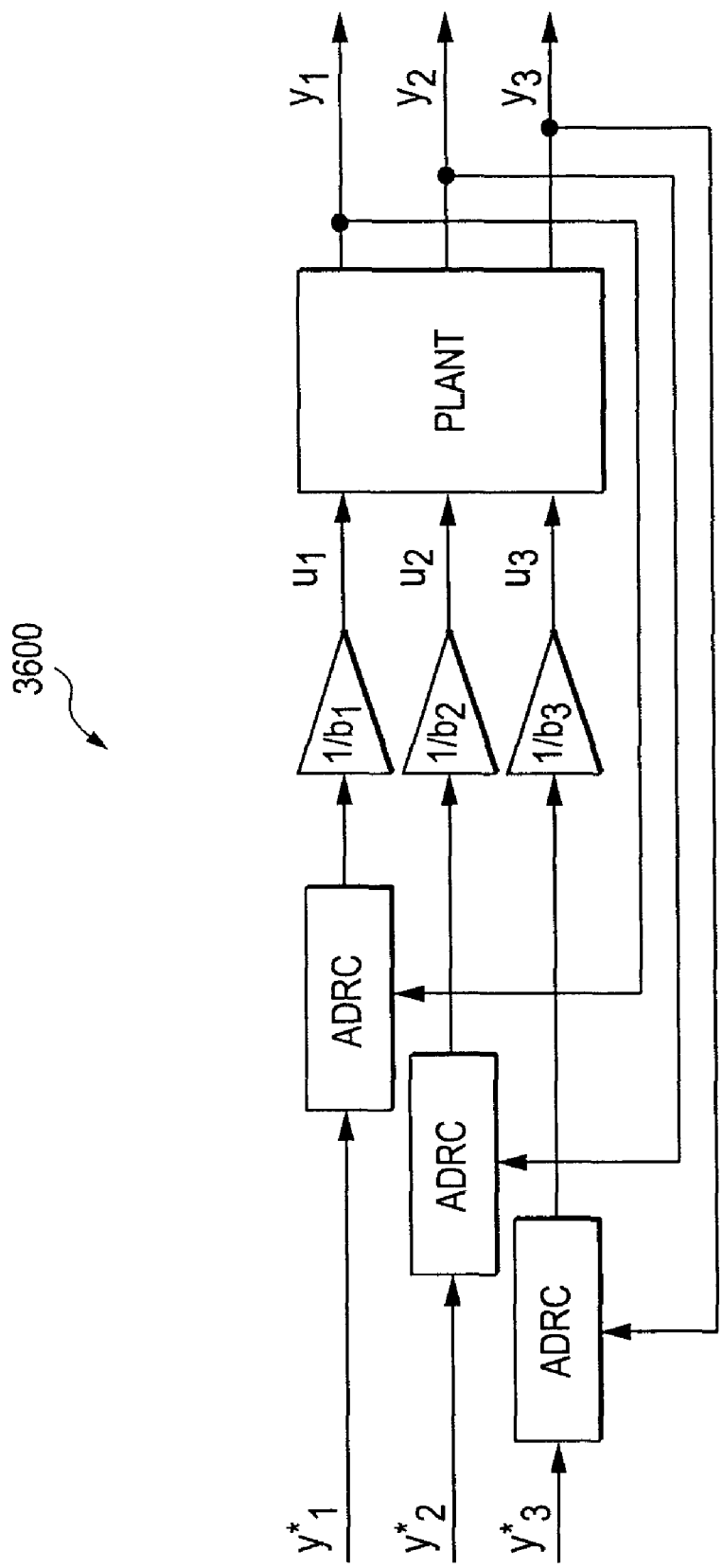
FIG. 36 illustrates a multiple single-input single-output loop system, in accordance with an exemplary embodiment.

An example is given in FIG. 36 for a three-output system.

Since each jet engine regulator has three inputs and three outputs and the system parameters are unknown, the plant used for low speed regulation was represented by (240) and the diagonal elements of $B^{-1}$ were tuned. The identity matrix was selected as a starting point. The relative signs of each diagonal element were next determined, followed by magnitude adjustment.

Jet Engine Control Simulation Results

Turbofan engine performance varies from engine to engine due to manufacturing tolerances and deterioration from extended use. Even though degradation may eventually require an engine to be overhauled as limits are reached, the engine control system should be robust enough to keep the engine operating within safe limits for several thousand flight cycles. With repeated use, the engine components wear and performance is degraded. For example, turbine blades erode and clearances open up. In order to achieve the same level of thrust as a new engine, a deteriorated engine must run hotter and/or faster. This shift from nominal operation increases with use, and eventually reaches the point where performance can not be maintained without compromising the safety of the engine or the life of its components. The degradation in performance is simulated in MAPSS by adjusting ten health parameters.

In most turbofan engines, thrust is calculated as a function of regulated and non-regulated variables, since it cannot be directly measured. Although regulated variables are maintained at their set points regardless of engine degradation, non-regulated parameters shift from their nominal values with deterioration. As a result, the closed-loop performance of the current model-based controller suffers as the engine wears. One of the objectives here is to control the transient thrust response of a deteriorated engine, making it behave as close to a new engine as possible.

Gas path analysis is a diagnostic technique that is used to estimate and trend health parameters by examining shifts in component health based upon gas path sensor measurements, i.e. pressures, temperatures, rotor speeds, and the known aero-thermodynamic relationships that exist between them. The health parameters follow an average degradation profile over the life span of the engine $$p_i = a_i(1 - \exp(-b_i t_{\text{eff}})) + c_i t_{\text{eff}} \quad (242)$$

where $a_i$, $b_i$, and $c_i$ are constants for each health parameter and $t_{\text{eff}}$ represents the physical age of the engine in effective flight cycles rather than it chronological age. The initial exponential rise is intended to simulate rub-in and new engine deterioration mechanisms. As the engine ages, the health parameter degradation tends to become more linear.

The component degradation values in percent resulting from health parameter changes are shown in Table IX. They reflect moderate to beyond severe degradation such as what might occur when the engine is due for an overhaul or when the engine is placed in a harsh desert environment.

TABLE IX

DEGRADATION VALUES DUE TO HEALTH PARAMETER CHANGES

| | Flight Cycles | | | | | | | | | |
|---|---|---|---|---|---|---|---|---|---|---|
| | Fan | | LPC | | HPC | | HPT | | LPT | |
| teff | Flow % | % | Flow % | % | Flow % | % | Flow % | % | Flow % | % |
| 0 | 0 | 0 | 0 | 0 | 0 | 0 | 0 | 0 | 0 | 0 |
| 3000 | −2.04 | −1.50 | −2.08 | −1.46 | −3.91 | −2.94 | +1.76 | −2.63 | +0.26 | −0.538 |
| 3750 | −2.443 | −1.838 | −2.56 | −1.748 | −6.448 | −4.555 | −1.96 | −2.925 | +0.3 | −0.673 |
| 4500 | −2.845 | −2.175 | −3.04 | −2.035 | −8.985 | −6.17 | +2.16 | −3.22 | +0.34 | −0.808 |
| 5250 | −3.248 | −2.512 | −3.52 | −2.323 | −11.52 | −7.785 | +2.37 | −3.515 | +0.38 | −0.943 |
| 6000 | −3.65 | −2.85 | −4 | −2.61 | −14.06 | −9.4 | +2.57 | −3.81 | +0.42 | −1.078 |

The level of degradation is characterized by effective cycles $t_{\text{eff}}$ where zero cycles is a new engine with no degradation, 3000 cycles is moderate degradation, 4500 cycles is heavy degradation, and 5250 cycles is severe degradation.

Test operating points were selected to cover a large portion of the entire MAPSS flight envelope and most of the subsonic range. They are shown in Table X. Test point #1 represents ground idle conditions where the pla is stepped from 21 to 35 for takeoff. The rest of the test points represent the majority of subsonic power conditions.

TABLE X

TEST OPERATING POINTS WITHIN THE MAPSS ENVELOPE

| | | | | | Op | | | | | |
|---|---|---|---|---|---|---|---|---|---|---|
| Pt. | 1 | 2 | 3 | 4 | 5 | 6 | 7 | 8 | 9 | 10 |
| alt | 0K | 20K | 20K | 36,089 | 36,089 | 36,089 | 20K | 40K | 40K | 40K |
| xm | 0 | 0.5 | 0.8 | 0.5 | 0.8 | 1.0 | 0.3 | 0.3 | 0.5 | 0.8 |
| pla | 21-35 | 30-35 | 30-35 | 30-35 | 30-35 | 32-37 | 30-35 | 30-35 | 30-35 | 30-35 |

The redesigned low speed regulator in (228) was digitized using Euler integration. MAPSS is a multi-rate simulation package where the engine sample time is fixed at 0.0004 seconds and the controller sample time is fixed at 0.02 seconds. For proof of concept, the new ADRC controller and the supplied nominal controller were simulated at each of the first three operating points in Table X. The results from the nominal controller are used as a reference to compare the performance of the ADRC controller with. The goal here was not to show that one controller is better in performance over the other but merely that they are comparable in performance and ADRC is very simple to design, especially since the exact method of tuning the nominal controller is not known. The new ADRC controller was then simulated at the next three operating points in Table X to show how it is able operate over a substantial range of the low speed regulator.

All simulations were conducted for each of the six levels of degradation in Table IX. As shown in Table XI, they are labeled as Run 1 through Run 6 in each simulation.

TABLE XI

DEGRADATION TEST RUNS

| Run# | 1 | 2 | 3 | 4 | 5 | 6 |
|---|---|---|---|---|---|---|
| $t_{\mathit{eff}}$ | 0 | 3000 | 3750 | 4500 | 5250 | 6000 |

Figure 37:
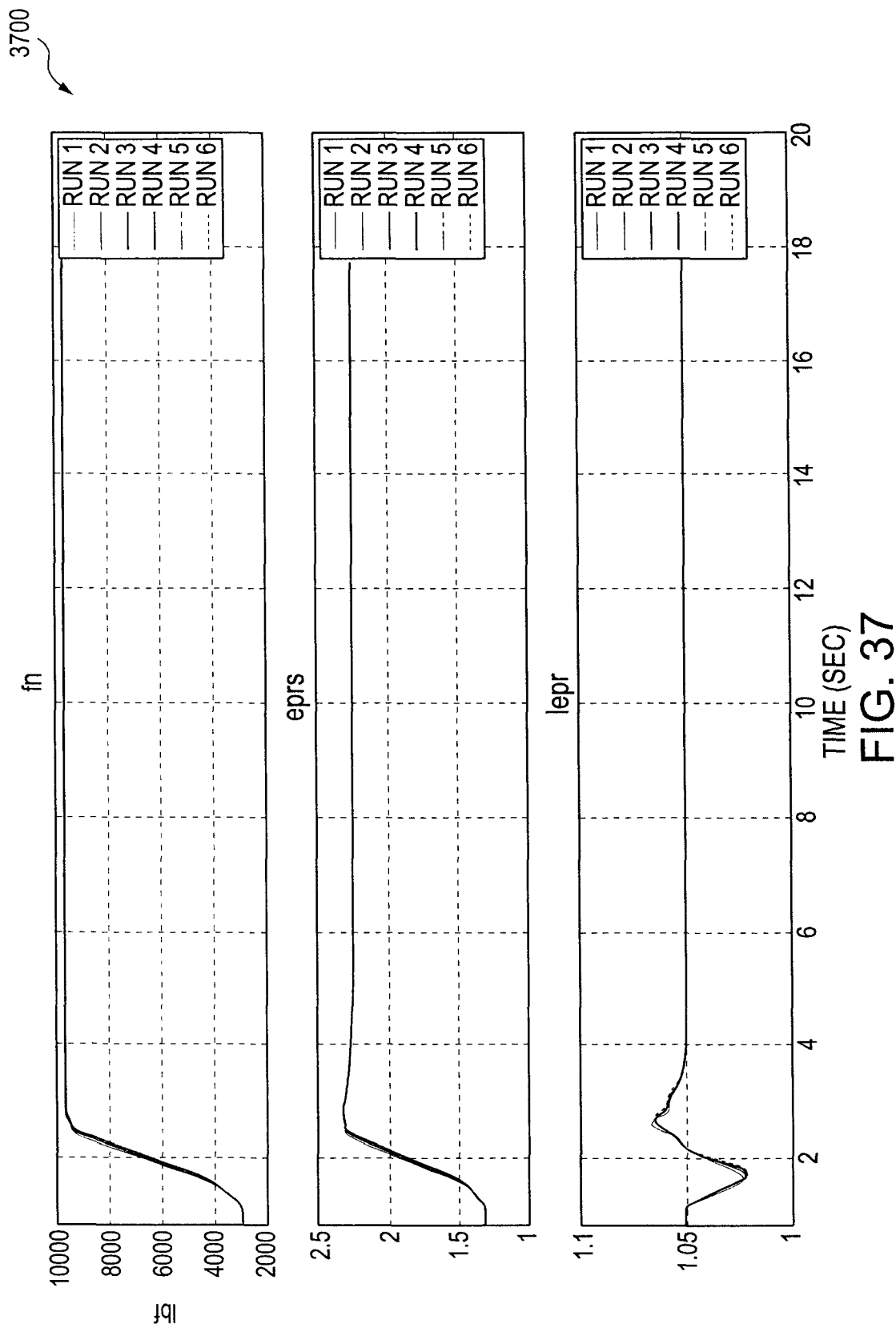
FIG. 37 is a graph that shows the ADRC controller's responses comparing controlled variables at Operating Point #1 for various levels of engine degradation, in accordance with an exemplary embodiment.
Figure 38:
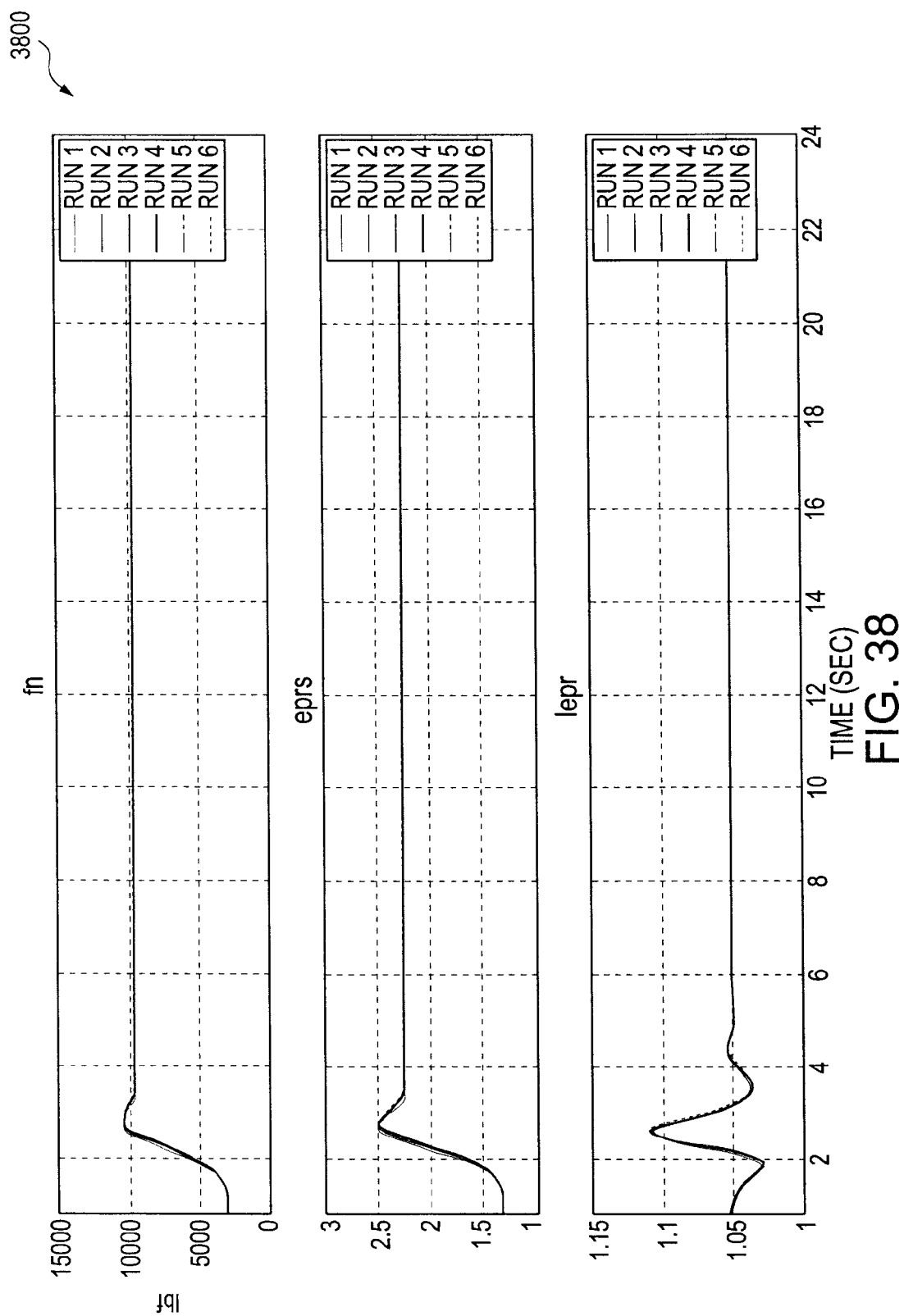
FIG. 38 is a graph that shows the Nominal controller's responses comparing controlled variables at Operating Point #1 for various levels of engine degradation, in accordance with an exemplary embodiment.
Figure 39:
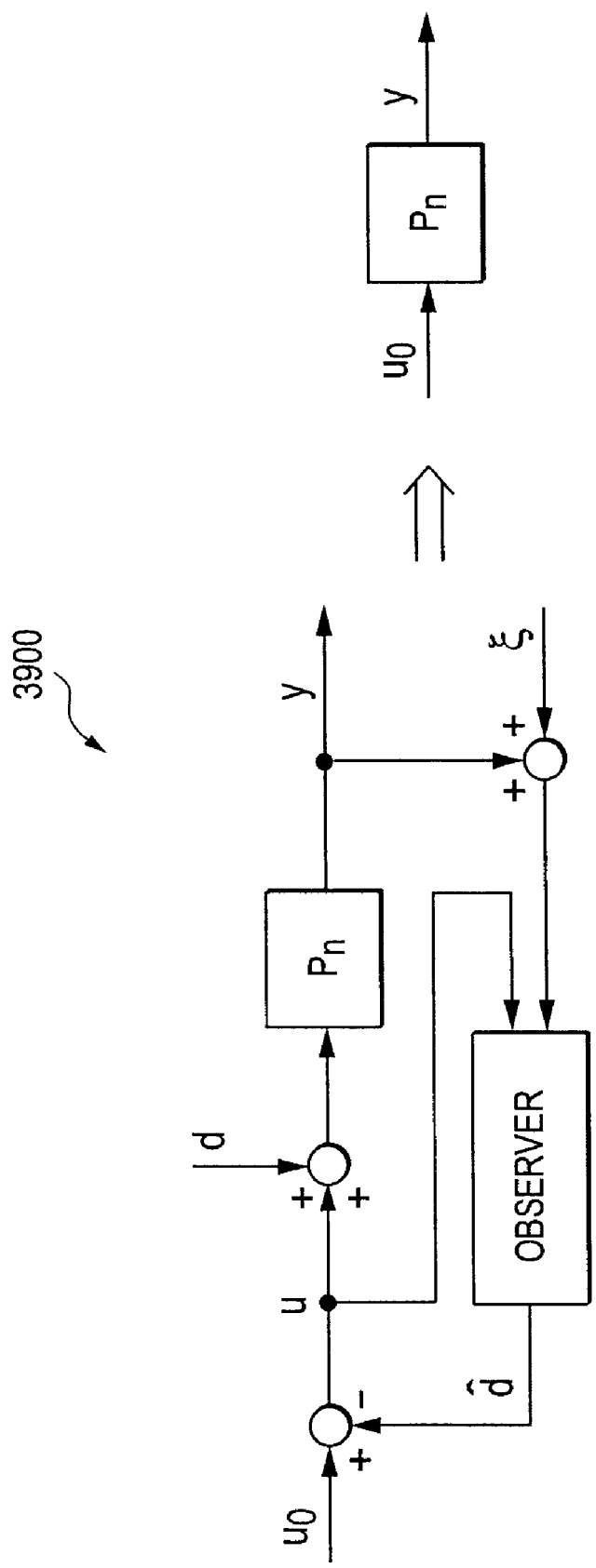
FIG. 39 illustrates a disturbance rejection model.

Although the high speed regulator and the other two fan safety regulators were not tested, similar performance is expected. The results are shown in 3700 of FIG. 37 and in 3800 of FIG. 38 for test point #1. Note that the trajectories at different levels of degradation are virtually indistinguishable from one another. Other test point yielded similar results with no change in the new controller parameters.

Although the ADRC controller responded a bit faster and with less overshoot to the change in demand levels than the nominal controller, the real significance is in the simplicity of design of the new controller and how it was able to control engine thrust without being affected by degradation over a wide range of operation. The design procedure of the nominal controller basically involves running the CLM at several operating points to calculate a set of gains from Bode and Nyquist arrays at each operating point. The eighteen gains are each scheduled by six parameters, amounting to a total of 108 possible adjustments that can be made when configuring a single regulator on an actual engine. During the simulations, these gains change by as much as 200 percent.

In contrast, the five ADRC gains remained constant throughout all simulations.

$$\omega_c = 8, \omega_o = 16, B^{-1} = \mathrm{diag}(0.2, -0.5, -0.5) \tag{243}$$

There was no scheduling. Each gain was quickly tuned on the CLM just as if it would be on an actual engine. The engine was then simulated at multiple operating points to verify the performance of the new controller.

Preliminary results of these simulation tests on a rather complex turbofan model show the power of the dynamic decoupling method proposed here. Mathematical models are often inaccurate when representing nonlinear multivariable systems. Gain scheduling helps in this area, but makes tuning even worse than it was before. Where modern multivariable control schemes are limited, this approach appears well suited for complex nonlinear systems with incomplete model information. The ultimate goal is to offer a degree of tunability to account for variations between engines without sacrificing performance, while being robust enough to withstand slow degradations from aging or damage.

Health Monitoring and Fault Detection using the Extended State Observer

Figure 49:
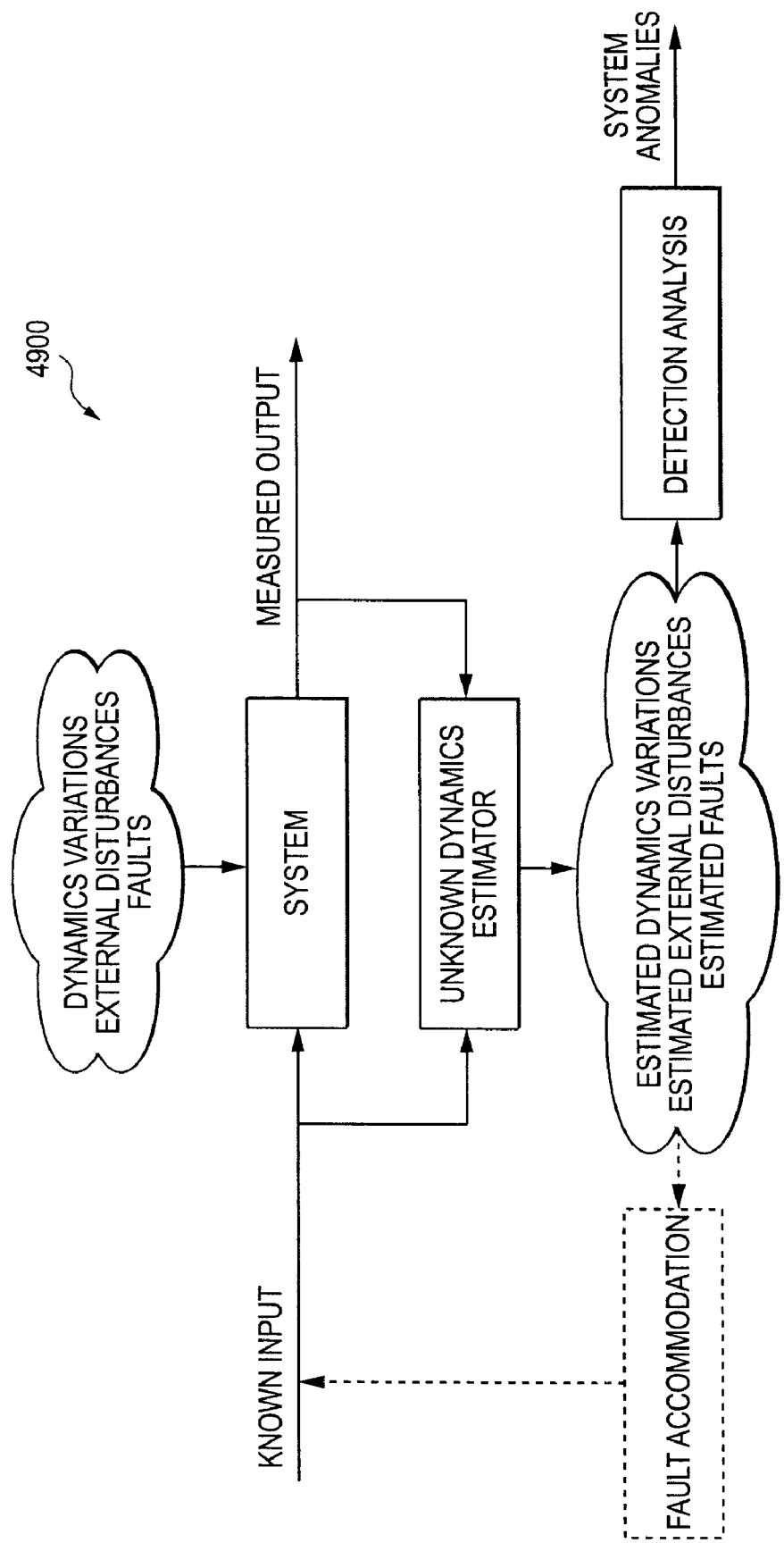
FIG. 49 is a diagram of a dynamic estimation system for fault and health monitoring, in accordance with an exemplary embodiment.

This research combines the unique concept of design model disturbance estimation with health monitoring and fault diagnosis. The tools developed in the previous description can be directly applied to health monitoring with minimal model information. The unique application uses the ESO as a disturbance estimator with minimal plant information to estimate system dynamics and disturbances. The estimated disturbance is then used for health and fault diagnosis. Most dynamic health and fault monitoring estimators require significant model information to work effectively. Since the ESO use a simple design model that works on a wide variety of plants, estimator design can be reduced to single parameter tuning. In 4900 of FIG. 49, the general concept of fault monitoring is illustrated.

Decomposing Disturbances for Fault Diagnosis

The following gives a more detailed explanation of the concept of using the ESO for health and fault monitoring. A wide range of input, u, output, y, systems can be described by the differential equation in Han's canonical model form $$y^{(n)} = f(t, y, \ldots, y^{(n-1)}, w) + bu. \tag{244}$$

Figure 50:
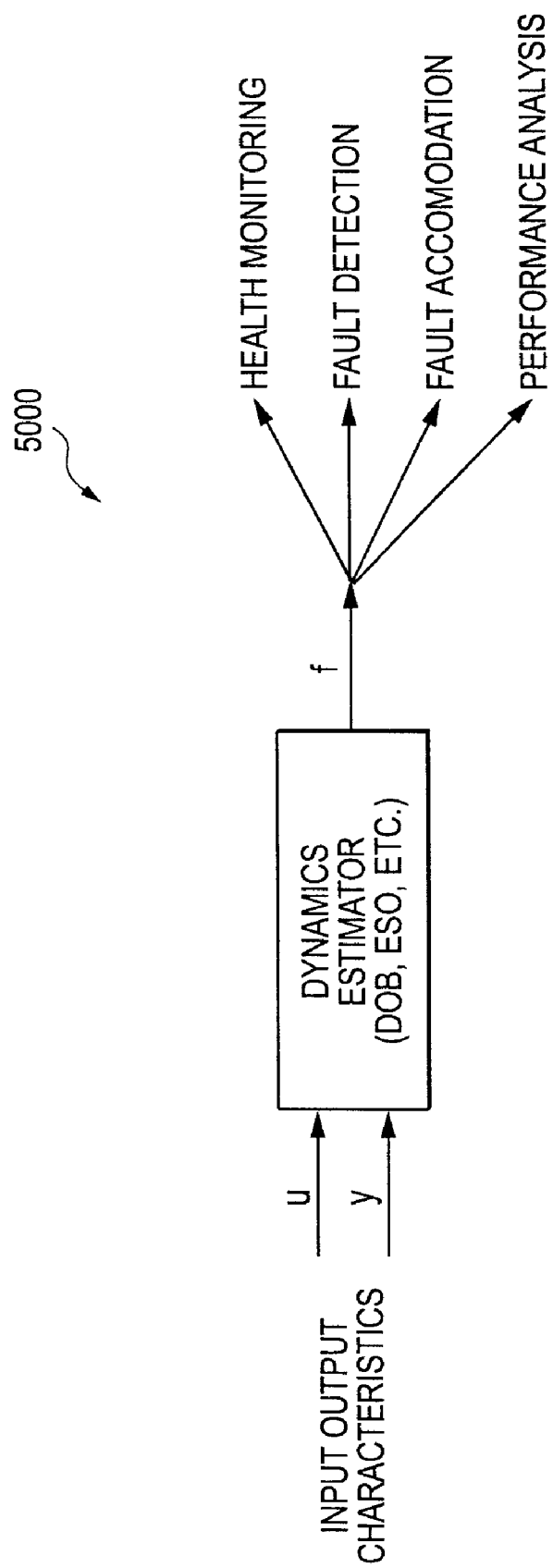
FIG. 50 illustrates the input-output characteristics for system diagnostics, in accordance with an exemplary embodiment.

Here $y^{(n)}$ represents the $n^{th}$ derivative of y, where $f$ is a lumped nonlinear time varying function of the plant dynamics as well as the external disturbance w. Based on the input output data, detail 5000 of FIG. 50 illustrates the concept of generating the unknown dynamics of $f$ from the input output characteristics. Once estimated, $f$ can be analyzed for health diagnosis, fault detection and performance analysis.

Figure 51:
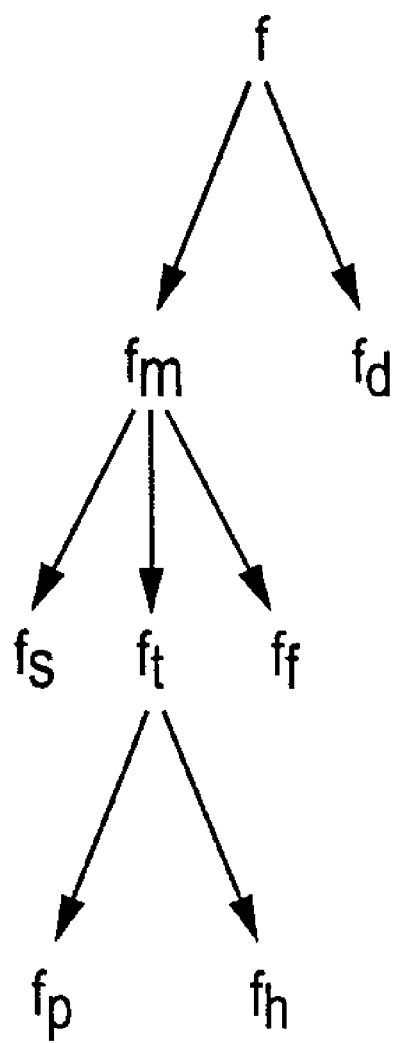
FIG. 51 shows a structure of disturbances, health degradation and faults, in accordance with an exemplary embodiment.

The unknown portion, $f$, contains modeling inaccuracies, $f_m$, effects of faults $f_f$, and external disturbances $f_d$. Detail 5100 of FIG. 51 illustrates how $f$ can encapsulate a number of effects related to health monitoring and fault detection where $f$ is lumped unknown dynamics, $f_m$ is unmodeled dynamics, $f_d$ is unmodeled external disturbances, $f_s$ is static nominal plant inaccuracies, $f_t$ is time varying plant degradations, $f_f$ is faults due to large model structural changes, $f_p$ is time varying model parameters and $f_h$ is health degradation.

For the most part, literature has approached the unknown plant effects that compose $f$ separately. In each case, assumptions are made that the other effects are negligible. Likewise, an overarching framework to integrate the problem of control, fault diagnosis and health monitoring and accommodation is an open problem for research.

Disturbance Estimation for Control Health Diagnosis

Recently large saving has been provided by six sigma techniques to actively monitor the health of a control loop performance by (C. McAnarney and G. Buckbee, "Taking it to the boardroom: Use performance supervision information for higher-level management decisions," In Tech. ISA, Jul. 31, 2006). Using the disturbance estimation concept for health diagnostics in combination with closed loop control is an effective means to provide health diagnosis without extensive model information.

Once the model is formulated in the input, u, output, y, and disturbance, $f$, formulation, the control problem can be reformulated.

Canceling the unknown disturbance and dynamics begins with estimating $f$. The main idea is to use input output data and minimal dynamic information to estimate $\hat{f}$ and cancel it.

$$\hat{f} \approx f \tag{245}$$

Once $f$ is estimated, the disturbance is rejected to behave like the forced design model plant, with a new input, $u_0$.

$$\text{find } u \text{ s.t. } y^{(n)} = f_n(\bar{y}, u_0, t). \tag{246}$$

At this point, the unknown disturbances and plant dynamics have been removed and a conventional controller based on the design model can be designed so the output, y, follows the reference, r.

$$\text{find } u_0 \text{ s.t. } y \to r. \tag{247}$$

Figure 52:
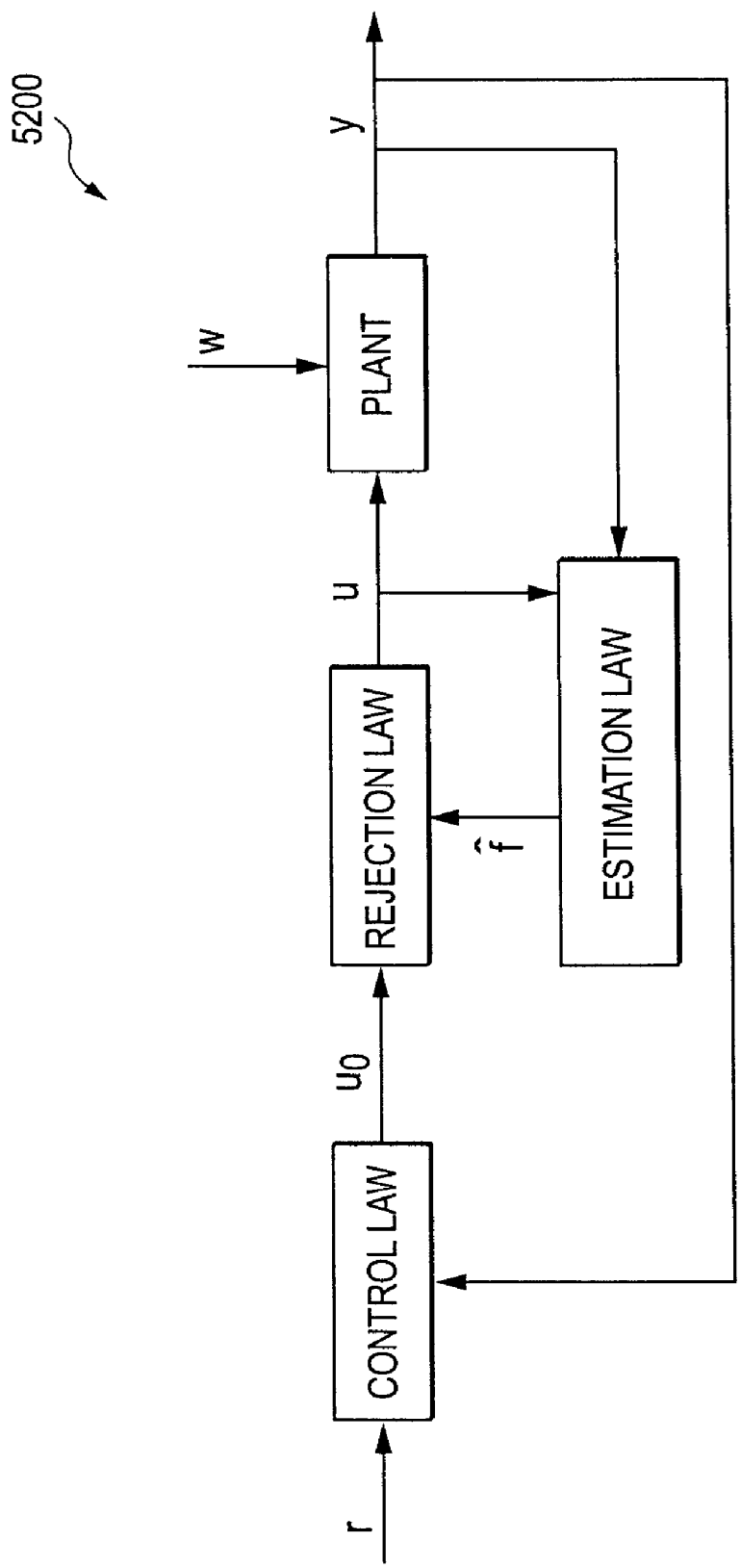
FIG. 52 is a control design broken into the estimation law, rejection law and nominal control law, in accordance with an exemplary embodiment.

This overview of concepts suggests that there are three independent mathematical expressions that solve the control problem: 1) the estimation law (245), 2) the rejection law (246), and 3) the nominal control law (247). This division is illustrated in 5200 of FIG. 52.

Most control paradigms include the estimation and rejection laws lumped together in the control law. Since $f$ is the key to this control paradigm, this research investigates the active estimation of $f$ for health and fault monitoring.

Health Monitoring by Disturbance Estimation

The general methodology to apply the Extended State Observer to the health monitoring problem follows:

1. Determine the appropriate coupled input and outputs. For single input and single output systems this step is not required. However, for effective estimation of multi-input multi-output systems, each input needs to be pared with an output that is dynamically linked in some manner. Cross coupling between separate input-output pairs is included in the disturbance estimate of each pair. This way each input-output pair can be considered independently.
2. Determine the order of each input output coupling. The order can be determined from intuition about the physical process or by trial and error.
3. Build a matching Extended State Observer to estimate states and disturbances
4. Select tuning parameters for stable output tracking.
5. Determine nominal conditions for the estimated disturbance, $f$.
6. Monitor the estimated disturbance for variations from the nominal conditions.
7. If model information is known, specific fault information can be extracted through the estimation of $f$. Since the dynamic information is estimated in $f$, this can usually be composed of an algebraic equation.

The systems, methods, and objects described herein may be stored, for example, on a computer readable media. Media can include, but are not limited to, an ASIC, a CD, a DVD, a RAM, a ROM, a PROM, a disk, a carrier wave, a memory stick, and the like. Thus, an example computer readable medium can store computer executable instructions for one or more of the claimed methods.

What has been described above includes several examples. It is, of course, not possible to describe every conceivable combination of components or methodologies for purposes of describing the systems, methods, computer readable media and so on employed in scaling and parameterizing controllers. However, one of ordinary skill in the art may recognize that further combinations and permutations are possible. Accordingly, this application is intended to embrace alterations, modifications, and variations that fall within the scope of the appended claims. Furthermore, the preceding description is not meant to limit the scope of the invention. Rather, the scope of the invention is to be determined only by the appended claims and their equivalents.

All documents cited herein are, in relevant part, incorporated herein by reference; the citation of any document is not to be construed as an admission that it is prior art with respect to the present invention.

While the systems, methods and so on herein have been illustrated by describing examples, and while the examples have been described in considerable detail, it is not the intention of the applicants to restrict or in any way limit the scope of the appended claims to such detail. Additional advantages and modifications will be readily apparent to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

The invention claimed is:

1. A computer-implemented method for controlling a velocity within a dynamic system, comprising:
   specifying a velocity value that is defined as $v(t)=f(t)+bu(t)$, where f(t) represents the combined effects of internal dynamics and external disturbance of the plant, u(t) is a control signal, and b is a constant to an approximate value;
   converting the velocity value into a first order state space model;
   estimating the value of $f(t)$ by a linear extended state observer, which is a function of a single performance parameter;
   canceling the effect of $f(t)$ on the velocity by the estimate from the linear extended state observer.

2. The method according to claim 1, further comprising:
   assigning eigenvalues of the observer as a function of a single tuning parameter;
   reducing the velocity value to an approximate integral plant, $$\dot{v}(t) = (f(t) - z_2(t)) + u_o(t) = u_o(t), \text{ and}$$

controlling the approximate integral plant via $u_o(t) = k_p(r(t) - z_1(t))$.

3. The method according to claim 2, further comprising:
   creating an approximate closed-loop transfer function with no finite zeros;
   solving each of the controller gains to correspond to the single tuning parameter by a model transfer function;
   setting each of the controller gains to correspond to the single tuning parameter.

4. The method according to claim 1, wherein the dynamic system is a web processing system.

5. The method according to claim 4, wherein the velocity value is at least one of a carriage roller velocity, an exit-side roller velocity, and a process-side roller velocity.

6. A method of monitoring the health of a system comprising:
 receiving sensor data from a sensor operably connected to the system to measure an output (y);
 storing an input (u) applied to the system that is coupled to the output (y);
 processing the input (u) and the output (y) using an extended state observer, the extended state observer designed to estimate at least one state and a disturbance (f) associated with a model that couples the input (u) with the output (y); and
 comparing the disturbance (f) against a nominal disturbance to create a variance.

7. A method of claim 6, further comprising a disturbance rejection controller that is adapted to reject the disturbance (f).

8. A method of claim 7, wherein the disturbance rejection controller rejects the disturbance such that the disturbance and plant dynamics associated with the system are removed from the system.

9. A method of claim 8, wherein a controller is applied to the system such that the output (y) follows a reference (r).

10. A method of claim 6, further comprising:
 modeling a fault in the system associated with a characteristic variance; and
 determining the fault by comparing the variance with the disturbance.

11. A method of 10, further comprising:
 rejecting the disturbance from the system by feeding the disturbance into a disturbance rejection controller to create a new command signal adapted to reject the disturbance.

12. A method of claim 6, wherein the disturbance (f) comprises, unmodeled dynamics ($f_m$), unmodeled external disturbances ($f_d$), status nominal plant inaccuracies ($f_s$), time varying plant degradations ($f_t$), faults due to large modal structural changes ($f_f$), time varying model parameters ($f_p$), and health degradation ($f_h$).

13. A health monitoring system for a plant comprising:
 a computer adapted to receive a signal from a sensor operably connected to the plant;
 an output (y) of the plant that is determined from the signal;
 an input (u) is determined from a control signal applied to the plant;
 an extended state observer adapted to estimate a state and a disturbance (f) associated with the input (u) and the output (y);
 a monitor adapted to compare the disturbance (f) with a nominal disturbance; and
 a model of specific fault information that is matched to the monitor to determine a specific fault.

14. A system of claim 13, further comprising:
 a disturbance rejection controller that is adapted to generate a rejection signal that removes unknown disturbances and plant dynamics.

15. A system of claim 14, further comprising:
 a controller wherein the controller outputs a new input (uo) such that the output (y) follows a reference (r); and,
 a control signal applied to the plant via an output from the computer comprising the sum of the new input (uo) and the rejection signal.

16. A computer-implemented method to generalize an extended state observer, comprising:
 representing a plant with a continuous-time differential equation of an nth order plant, $y^{(n)}=f(y, \dot{y}, \ldots, y^{(n-1)}, w, t)+bu$, where y(n) denotes the nth derivative of y, u is a control signal, and b is an estimate of a value;
 constructing an n+h order state space model of the nth order plant using h-cascaded integrators to represent a disturbance f and its h derivatives;
 discretizing the state space model by applying one of Euler, zero order hold, or first order hold methods;
 creating a predictive discrete estimator from the discretized state space model;
 creating a current discrete estimator from the discretized state space model;
 implementing the current discrete estimator in a computer component that receives a signal from a sensor that is operably connected with the plant; and
 processing the signal using the discrete estimator to estimate the value of the disturbance f and its h derivatives.

17. The method according to claim 16, further comprising:
 discretely parameterizing estimator gains, such that implementation of the current discrete estimator is based upon a single tuning variable.

18. The method of claim 16, wherein the plant has more than one input and more than one output.

19. A method to enhance performance of an active disturbance rejection controller by providing transient tracking control, comprising:
 representing a plant with a continuous-time differential equation of an nth order plant, $y^{(n)}=f(y, \dot{y}, \ldots, y^{(n-1)}, w, t)+bu$ y(II)=f(y,:/, . . . ,y(II-I), w, f)+bu, where yen) denotes the nth derivative of y, u is a control signal, and b is a known value;
 constructing an extended state observer to estimate generalized disturbance, output y, and n−1 derivatives of the output;
 applying a disturbance rejection control law to cancel the generalized disturbance using an estimated disturbance value from the extended state observer;
 reducing the plant to n cascaded integrators;
 applying a point-to-point control law to the reduced plant to form a desired closed-loop transfer function;
 adding an inverse of the closed-loop transfer function to a reference input of the controller to form a new closed loop transfer function equal to one, or its relative order equal to zero;
 implementing the extended state observer, the disturbance rejection control law, and the point-to-point control law in a computer component that receives a signal from a sensor that is operably connected with the nth order plant;
 processing the signal using the extended state observer, the disturbance rejection control law and, the point-to-point control law to estimate a control signal u; and,
 applying a control command representing the control signal u to the nth order plant.

20. The method according to claim 19, further comprising:
 applying a tracking control law comprised of feed forward terms directly to the reduced plant to form a desired closed loop transfer function equal to one, or its relative order equal to zero.

21. The method of claim 19, wherein the plant has more than one input value and more than one output value.

22. A computer-implemented method to discretely implement an extended state observer, comprising:

representing a plant with a continuous-time differential equation of an nth order plant, $y^{(n)}=(y,\dot{y},w,t)+bu$ where f is a function of an internal system dynamics, an external disturbance w, and b is a constant;

constructing a n+1 order state space model of the nth order plant;

discretizing the state space model by applying one of Euler, zero order hold, or first order hold methods; and creating a predictive discrete estimator from the discretized state space model;

creating a current discrete estimator from the discretized state space model;

implementing the current discrete estimator in a computer component that receives a signal from a sensor that is operably connected with the plant; and processing the signal using the current discrete estimator to estimate the value of the function $f$.

23. The method according to claim 22, further comprising:

discretely parameterizing estimator gains, such that implementation of the current discrete estimator is based upon a single tuning variable.

24. A method for designing a system to control a multiple-input, multiple-output system, comprising:

discretizing a system model to describe one or more distinct states, where each input has a distinct output and disturbance;

constructing an extended state estimator from the discretized system model;

implementing the extended state estimator in a computer component that receives a signal from a sensor that is operably connected to the system;

determining one or more correction terms as a function of a single tuning parameter; and utilizing the correction terms with the extended state estimator and the signal to estimate system states and extended states of one or more orders.

25. The system according to claim 24, wherein the system is at least one of a chemical process, a mechanical process, or an electrical process.

26. A method to provide health monitoring to a system, comprising:

determining appropriate coupled control inputs and control outputs;

determining order of each input/output coupling;

building a matching extended state observer to estimate states and a disturbance;

adjusting a value of at least one tuning parameter that provides stable output tracking;

determining at least one nominal condition for an estimated disturbance;

implementing the matching extended state observer in a computer component that receives a signal from a sensor that is operably connected to the system;

processing the signal using the matching extended state observer to estimate the disturbance;

monitoring a variation between the estimated disturbance and the at least one nominal condition; and extracting fault information from the variation.

27. A method for controlling a turbofan, comprising:

creating a model of a portion of a turbofan system as a nonlinear input-output vector function;

approximating a general disturbance of the modeled system;

reducing the system to a second model that distinguishes between an instantaneous input and one or more dynamic variables to be estimated in real time;

representing the system by one or more state vectors, wherein an extended state is assigned to track the general disturbance;

determining a disturbance rejection control law;

implementing the disturbance rejection control law on a computer component that receives a signal from a sensor that is operably connected to the turbofan;

utilizing the disturbance rejection control law to decouple the system and reduce it to one or more parallel integrators;

controlling the simplified parallel integrator system; and generating a control signal that is applied to the turbofan.

28. A method of adding disturbance information into the linear extended state observer is described, comprising:

representing a plant with a continuous-time differential equation of an nth order plant, where the nth derivative of the output y(t) equals a generalized disturbance $f(t)$ plus an input bu(t) where b is a constant;

constructing a state space model of the plant;

creating an extended state observer based on the state space model, having correction terms that are a function of a single parameter; and adding a term to the extended state observer that is composed of the derivative of $f(t)$ if it is known or partially known.

* * * * *